US010736452B2

(12) United States Patent
Mullet et al.

(10) Patent No.: US 10,736,452 B2
(45) Date of Patent: Aug. 11, 2020

(54) DECORATIVE ROTATABLE DRIVE ELEMENT FOR MOVING A WINDOW COVERING

(71) Applicant: Current Products Corp., Pensacola, FL (US)

(72) Inventors: Willis Jay Mullet, Gulf Breeze, FL (US); Daniel T. Matthews, Pensacola, FL (US); Michael D. Fox, Pensacola, FL (US); Harry Edward Asbury, Holt, FL (US); Richard Scott Hand, Pace, FL (US)

(73) Assignee: CURRENT PRODUCTS CORP., Pensacola, FL (US)

( * ) Notice: Subject to any disclaimer, the term of this patent is extended or adjusted under 35 U.S.C. 154(b) by 214 days.

(21) Appl. No.: 15/491,602

(22) Filed: Apr. 19, 2017

(65) Prior Publication Data

US 2017/0238747 A1  Aug. 24, 2017

Related U.S. Application Data

(63) Continuation-in-part of application No. 15/439,071, filed on Feb. 22, 2017, which is a continuation of
(Continued)

(51) Int. Cl.
*A47H 5/06* (2006.01)
*A47H 1/02* (2006.01)
(Continued)

(52) U.S. Cl.
CPC ............... *A47H 5/06* (2013.01); *A47H 1/02* (2013.01); *A47H 1/142* (2013.01); *A47H 13/02* (2013.01);
(Continued)

(58) Field of Classification Search
CPC .. E06B 9/72; A47H 1/02; A47H 13/02; A47H 2001/0215; A47H 5/06
See application file for complete search history.

(56) References Cited

U.S. PATENT DOCUMENTS

| 785,517 A | * | 3/1905 | Paeth et al. | B66B 13/08 49/100 |
| 1,823,909 A | * | 9/1931 | Meier | A47H 5/06 160/343 |

(Continued)

*Primary Examiner* — Katherine W Mitchell
*Assistant Examiner* — Jeremy C Ramsey
(74) *Attorney, Agent, or Firm* — Christopher A. Proskey; BrownWinick Law Firm

(57) ABSTRACT

A motorized drapery system having an elongated rotating drive element that has a non-circular cross-sectional shape such as square, rectangular, trapezoidal, cross shaped or any other non-circular shape that is twisted. In one arrangement the drive element is twisted in one direction along its entire length. In another arrangement the drive element is twisted in one direction in a first section and twisted in an opposite direction in a second section thereby providing a center opening/center closing drapery. A plurality of rings are positioned around the drive element including at least one driver ring that includes a feature that connects to the drive element and is configured to facilitate movement along the drive element, and a plurality of idler rings that are configured to slide along the drive element. A curtain is connected to the rings and opens and closes as the rings move along the drive element.

36 Claims, 57 Drawing Sheets

Related U.S. Application Data application No. 14/719,438, filed on May 22, 2015, now Pat. No. 9,615,687, which is a continuation of application No. 14/029,210, filed on Sep. 17, 2013, now Pat. No. 9,095,908.

(60) Provisional application No. 61/702,093, filed on Sep. 17, 2012.

(51) Int. Cl.

| | | |
|---|---|---|
| *A47H 1/142* | (2006.01) | |
| *A47H 13/02* | (2006.01) | |
| *B23B 3/00* | (2006.01) | |
| *B23Q 1/76* | (2006.01) | |
| *A47H 23/06* | (2006.01) | |
| *B23B 29/26* | (2006.01) | |
| *B23B 5/08* | (2006.01) | |
| *A47H 5/02* | (2006.01) | |

(52) U.S. Cl.
CPC ............... *A47H 23/06* (2013.01); *B23B 3/00* (2013.01); *B23B 5/08* (2013.01); *B23B 29/26* (2013.01); *B23Q 1/766* (2013.01); *A47H 2001/0215* (2013.01); *A47H 2005/025* (2013.01); *B23B 2215/72* (2013.01); *B23B 2220/12* (2013.01); *B23B 2220/445* (2013.01); *B23B 2260/024* (2013.01); *Y10T 29/49826* (2015.01); *Y10T 82/10* (2015.01)

(56) References Cited

U.S. PATENT DOCUMENTS

| | | | | |
|---|---|---|---|---|
| 3,656,358 | A * | 4/1972 | Kopp | F16H 25/2009 411/280 |
| 3,774,665 | A * | 11/1973 | Bourne | A47H 5/06 16/87.6 R |
| 4,759,398 | A * | 7/1988 | Renee | E06B 9/326 160/177 R |
| 8,251,119 | B2 * | 8/2012 | Toti | E06B 9/322 160/168.1 R |
| 2007/0273309 | A1 * | 11/2007 | Carmen | E06B 9/40 318/16 |
| 2010/0269988 | A1 * | 10/2010 | Mullet | E06B 9/62 160/310 |

* cited by examiner

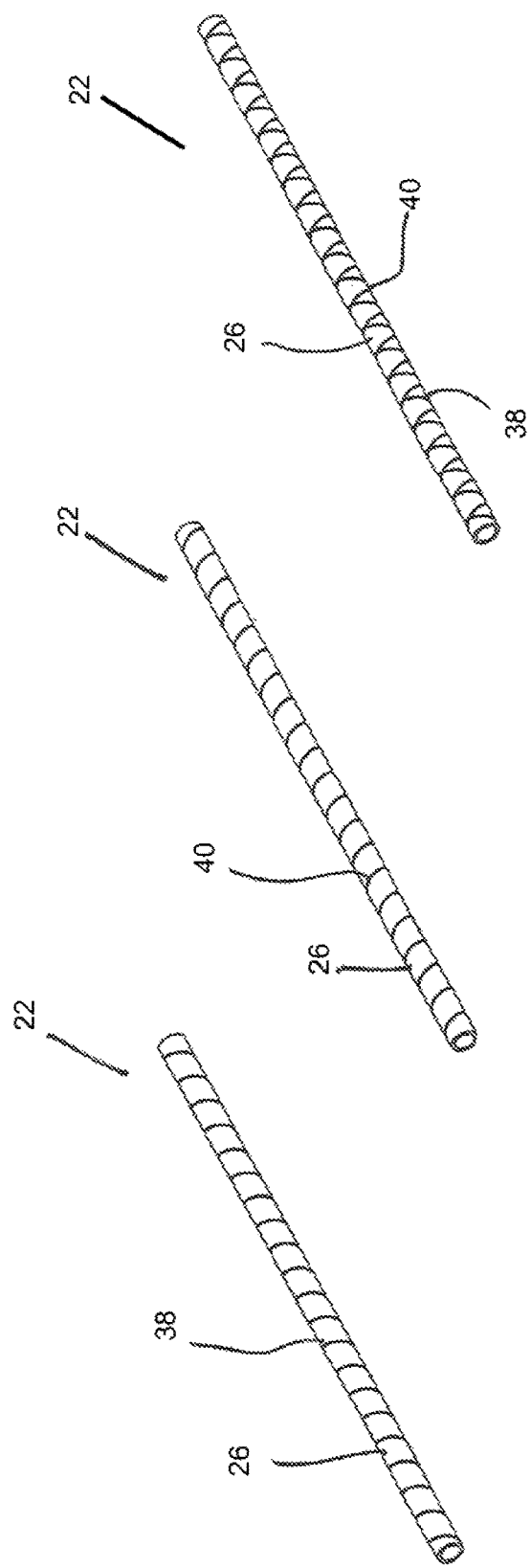

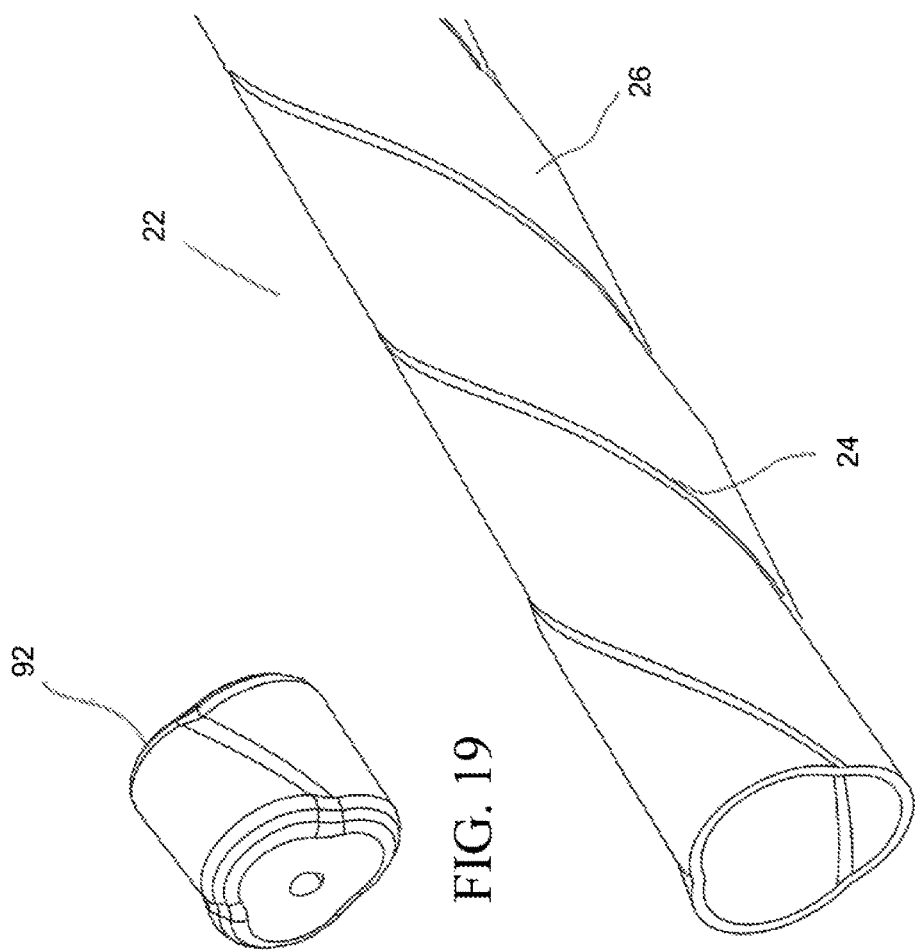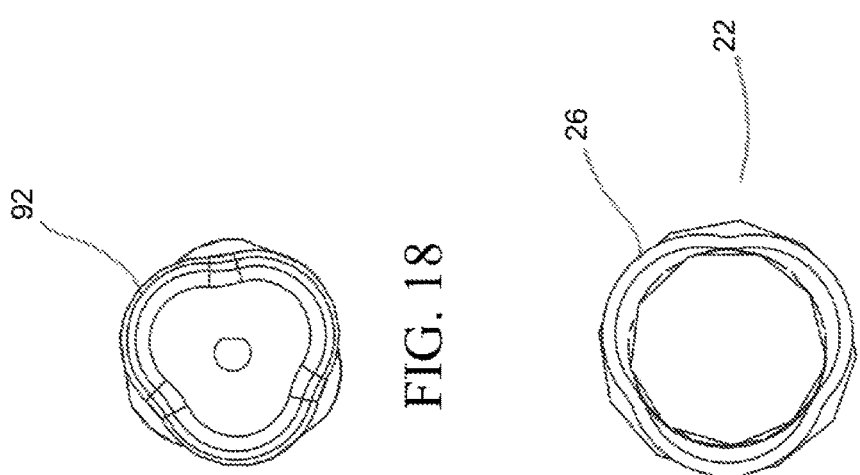

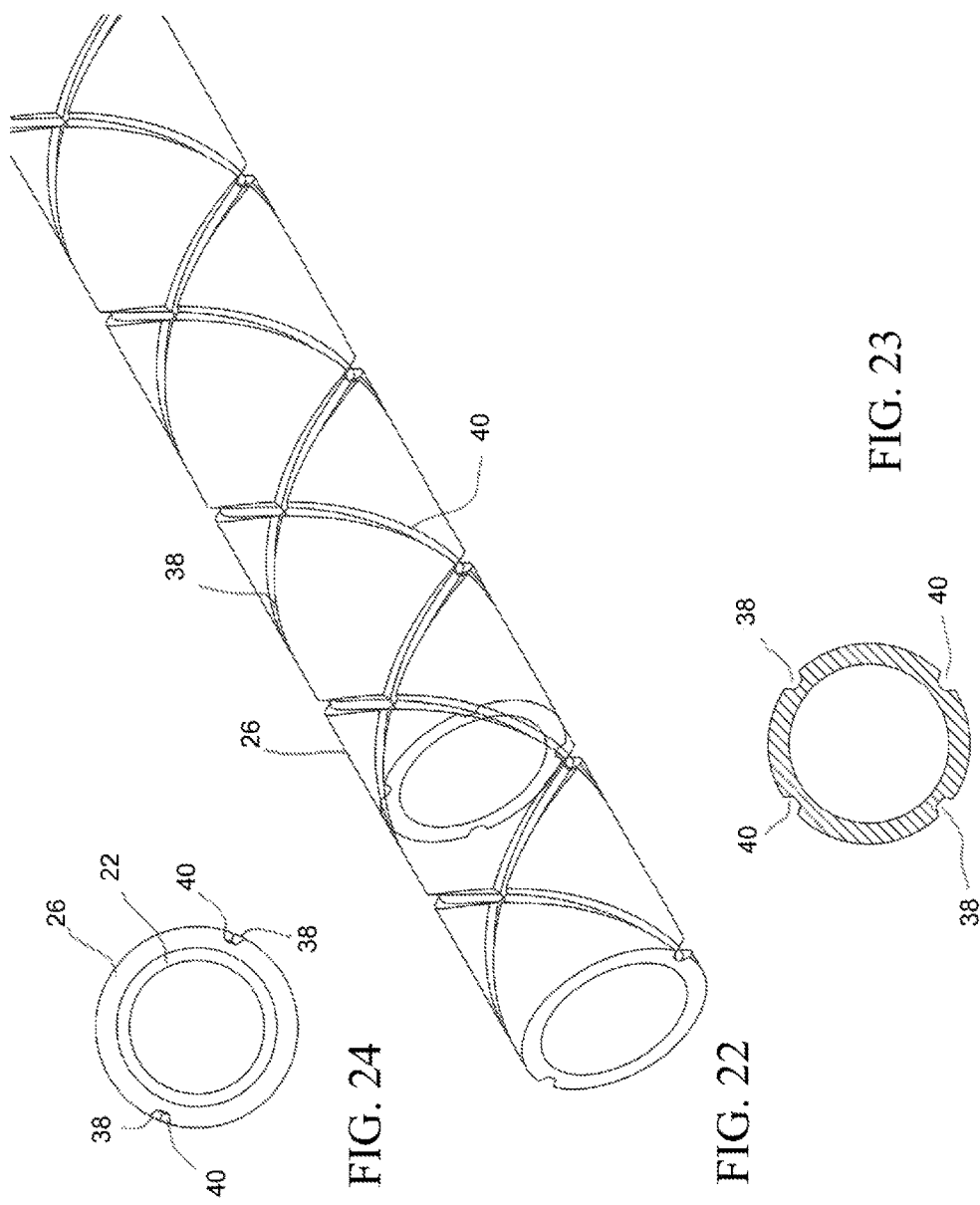

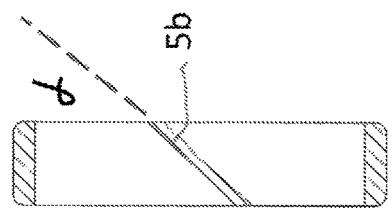
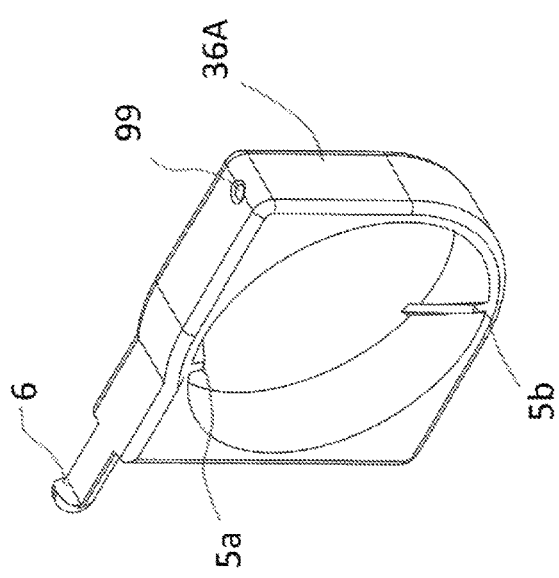
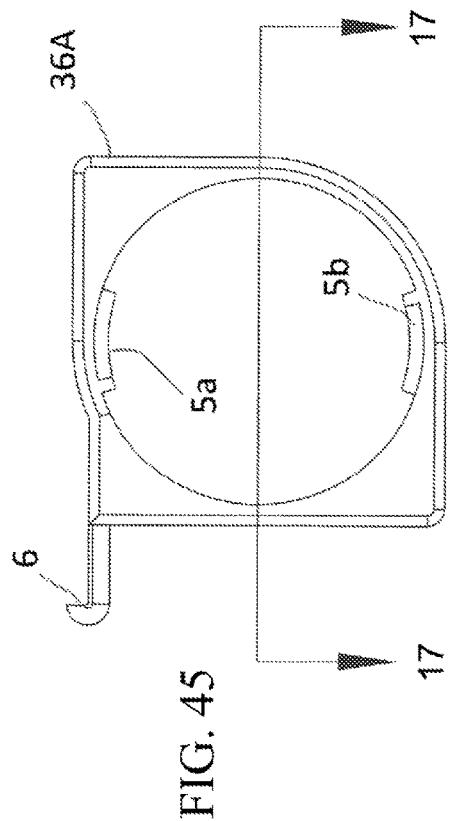

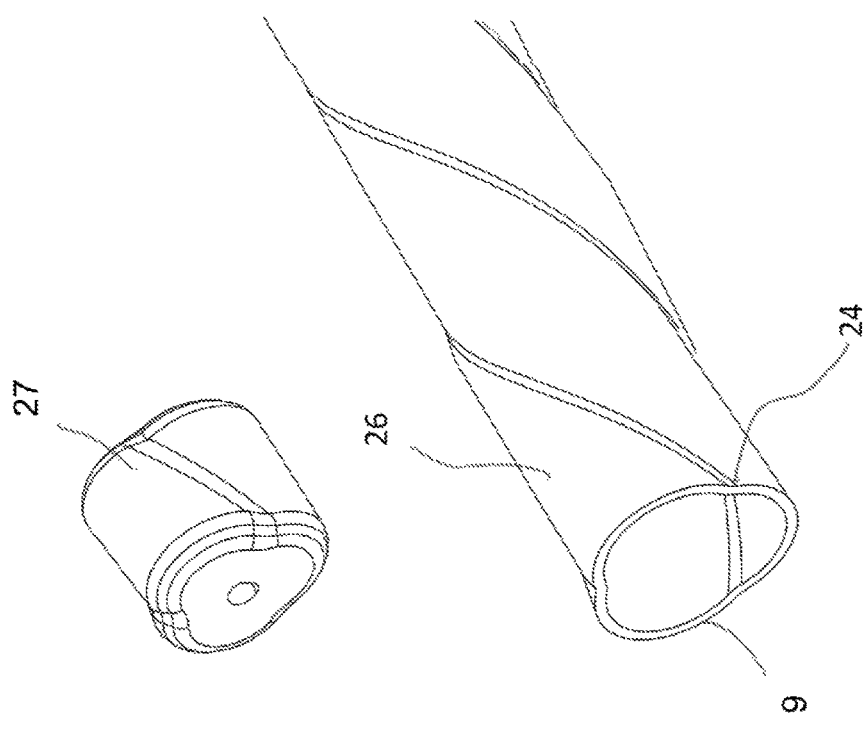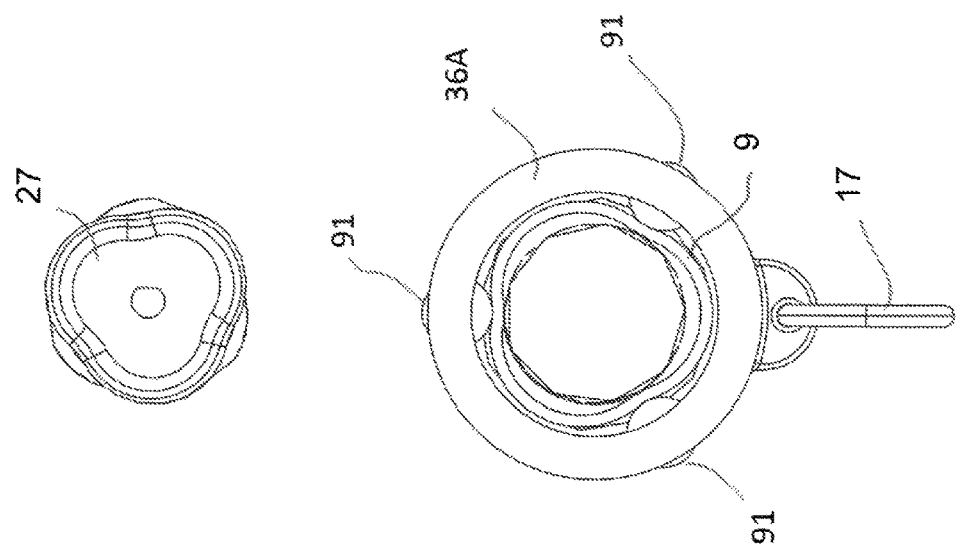
FIG. 60

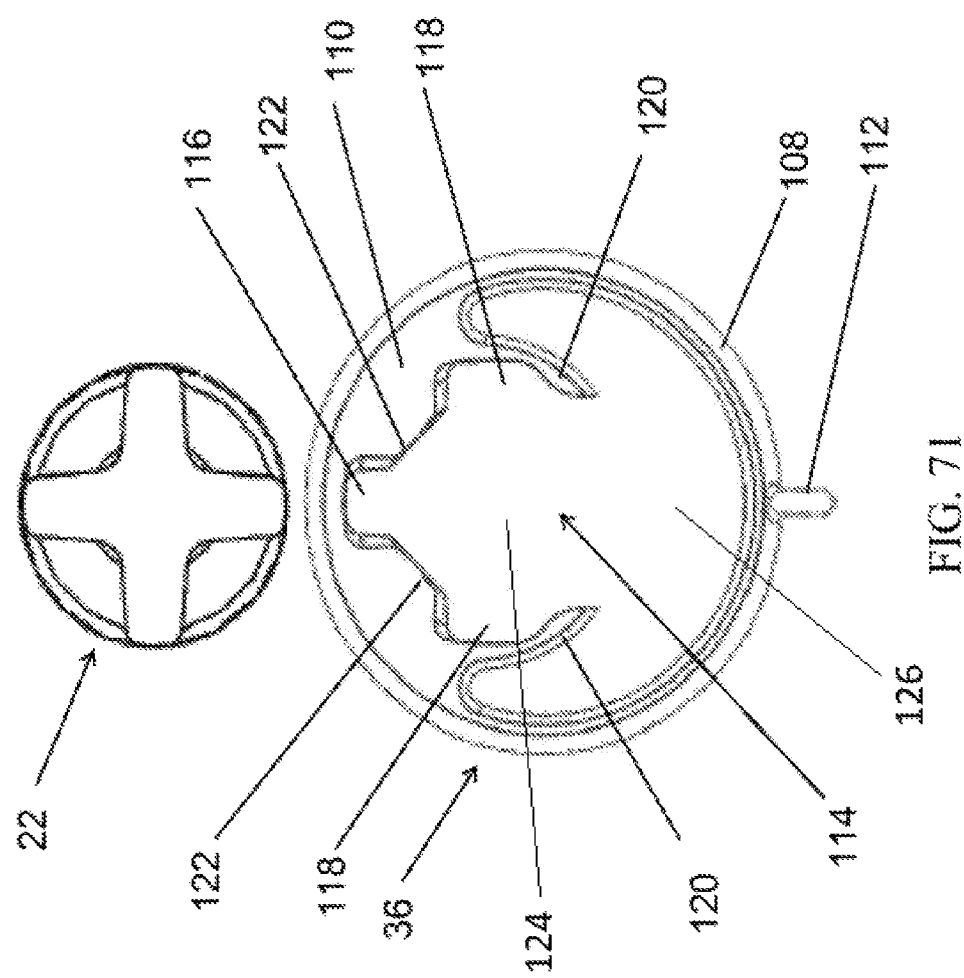

DECORATIVE ROTATABLE DRIVE ELEMENT FOR MOVING A WINDOW COVERING

CROSS-REFERENCE TO RELATED APPLICATION

The present application is a continuation-in-part of U.S. application Ser. No. 15/439,071, which was filed on Feb. 22, 2017, which is a continuation of U.S. application Ser. No. 14/719,438, which was filed on May 22, 2015, which is a continuation of U.S. application Ser. No. 14/029,210, which was filed Sep. 17, 2013, which claims the benefit of U.S. Provisional Patent Application No. 61/702,093, which was filed Sep. 17, 2012, which is hereby incorporated by reference herein in its entirety, including any figures, tables, or drawings.

FIELD OF THE DISCLOSURE

Embodiments of the present disclosure relate generally to a window covering assembly used to cover windows. Specific embodiments of the disclosure relate to a window covering assembly with a rotatable drive element that has a structure formed into or on the outer surface of the rotatable drive element such that a window covering moves axially along the rotatable drive element when the rotatable drive element rotates. Further specific embodiments relate to a window covering assembly in which two different curtains are operated by the same rotating drive element such that the user is able to independently move each curtain.

BACKGROUND OF THE DISCLOSURE

Window coverings, such as curtains, are frequently used to provide privacy and to limit the amount of light that is permitted to pass through a window and into a room.

There are numerous types of window coverings known in the art. Curtains can be composed of panel(s) of fabric. For example, a curtain may be a single panel curtain that opens and closes from left to right. There is also a center closing curtain that is composed of two fabric panels that meet in the center of the window to close and cover the window.

Many different types of fabrics may be used depending on the user's needs and preferences. For example, sometimes it is necessary not only to cover but to also fully blackout the window such that no light passes through. In this instance, a blackout curtain composed of opaque fabric that completely darkens the window may be useful. There may also be other situations, however, where some light is desired and some visibility is desired. A sheer curtain composed of a translucent fabric may be useful in this instance.

The curtain panels are attached to and suspended from a transverse curtain rod that is hung above the window. The panels are usually joined to the curtain rod by hooks or rings. The curtains are able to be moved manually across the curtain rod(s) as desired by a pull rod or the like to either cover or uncover the window.

There are various mechanisms, both electrical and manual, to mechanically move a curtain back and forth across an opening. Typical designs use a curtain guide track where the curtains are suspended. Some curtain assemblies use a series of pulleys, cables, and belts to move the curtain. In some cases these mechanisms are motorized. In these cases, the number of components used adds complexity to the assembly and also increases the cost of the assembly.

Many different types of fabrics may be used depending on the user's needs and preferences. For example, sometimes it is preferred to not only cover but to also fully blackout the window such that no light passes through. In this instance, a blackout curtain composed of opaque fabric that completely darkens the window may be useful. There may also be other situations, however, where some light is desired and some visibility is desired. A sheer curtain composed of a translucent fabric may be useful in this instance.

A sheer curtain is often hung with a blackout curtain on the same window to accommodate different preferences for light and visibility at different times. For example, a blackout curtain may be used to block out unwanted early morning sun. The blackout curtain may then be opened to allow the sun to filter through the sheer curtain later in the day. When a blackout curtain is hung with a sheer curtain, utility bills may also be lowered by using the different curtains to keep a home cool or warm, depending on the weather.

Hanging two different curtains, however, requires the installation of two different curtain guide tracks, one guide track for each curtain. If two curtains are hung from the same curtain guide track, there is not the ability to move one curtain without moving the other curtain and it prevents both curtains from being in the deployed position simultaneously.

Therefore, it would be advantageous to have a simple curtain assembly that will move a curtain from the deployed position to the stored position with the minimum number of components that can be motorized as well as manually operated. It would further be advantageous to have a dual curtain assembly that will move two separate curtains.

SUMMARY OF THE DISCLOSURE

Embodiments of the present disclosure relate to a window covering assembly. For convenience, various embodiments will be described with respect to curtains with the understanding that the description applies to other window coverings as well. Embodiments of the curtain assembly include a drive element wherein at least one guide structure is formed on or into the outer surface of the drive element; a drive attachment element having a corresponding structure that communicates with the at least one guide structure to move the drive attachment element axially along the drive element when the drive element is rotated; and a rotation assembly for rotating the drive element. In some embodiments of the disclosure, the guide structure forms a helical pattern on the rotatable drive element and the corresponding structure is a tooth that is moved by the groove when the drive element is rotated. The guide structure can also be a ridge or other structure that can cause the corresponding structure to move axially along the drive element when the drive rotates.

In specific embodiments the drive element can be a tube.

In specific embodiments according to the present disclosure, the curtain assembly includes a rotatable drive element having a clockwise helical guide structure and a counter clockwise helical guide structure formed on, or into, the outer surface of the drive element; a first drive attachment element having a structure that communicates with the clockwise helical guide structure to move the drive attachment element axially along the drive element when the drive element is rotated; and a second drive attachment element having a structure that communicates with the counterclockwise helical guide structure to move the drive attachment element axially along the drive element when the drive element is rotated; and a rotation assembly for rotating the drive element.

In accordance with some embodiments of the present disclosure, a dual curtain assembly is provided. A specific embodiment of dual curtain assembly includes a rotatable drive element having at least one guide structure formed on, or into, the outer surface of the drive element; at least two drive attachment elements having a corresponding at least two structures that communicate with the at least one guide structure to move the at least two drive attachment elements axially along the drive element when the drive tube is rotated Further specific embodiments can also incorporate a rotation assembly for rotating the drive element. The rotation assembly can be manual or motorized.

In accordance with some embodiments of the disclosure, a dual curtain assembly includes a drive element having at least one guide structure formed on, or into, the outer surface of the drive element; at least one outer drive attachment element having a corresponding at least one outer structure that communicates with the at least one guide structure to move the at least one drive attachment element axially along the drive element when the drive element is rotated; at least one inner drive attachment element having a corresponding at least one feature that communicates with the at least one guide structure to move the at least one inner drive attachment element axially along the drive element when the drive element is rotated; and a rotation assembly for rotating the drive element.

In accordance with yet other embodiments of the disclosure, applicable, for example, to a center closing curtain system, the curtain assembly may include a drive element having at least one guide structure formed on, or into, the outer surface of the drive element; a left outer drive attachment element having a corresponding left outer structure that communicates with the at least one guide structure to move the left outer drive attachment element axially along the drive element when the drive element rotates; a right outer drive attachment element having a right outer structure that communicates with the at least one guide structure to move the right outer drive attachment element axially along the drive element when the drive element rotates; a left inner drive attachment element having a corresponding left inner structure that communicates with the at least one guide structure to move the left inner drive attachment element axially along the drive element when the drive element is rotated; a right inner drive attachment element having a corresponding right inner structure that communicates with the at least one guide structure to move the right inner drive attachment element axially along the drive element when the drive element is rotated; and a rotation assembly for rotating the drive element, wherein the rotation of the drive element moves the left and right outer drive attachment elements axially along the drive element when the drive element is rotated and independently moves the left and right inner drive attachment elements along the drive element when the drive element is rotated.

These features and aspects of the disclosure as well as its advantages are understood by referring to the following description, appended claims, and accompanying drawings, in which:

FIG. 7 is an enlarged perspective view of one embodiment of the curtain assembly showing the rotatable drive element with a clockwise helical groove.

FIG. 8 is an enlarged perspective view of one embodiment of the curtain assembly showing the rotatable drive element with a counter clockwise helical groove.

FIG. 9 is an enlarged perspective view of one embodiment of the curtain assembly showing the rotatable drive element with a clockwise helical groove and a counter clockwise helical groove.

Figure 17:
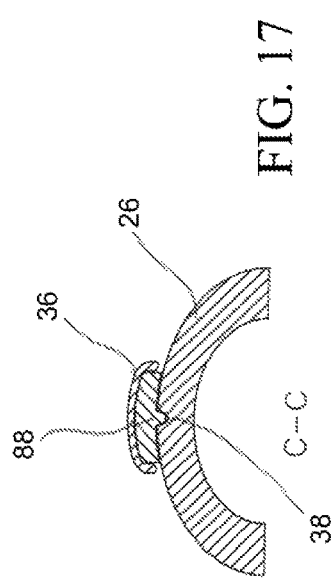

FIG. 17 is a section view of the tube 26 and the drive attachment element 36 showing the engagement of the first drive tooth 88 in the first helical groove 38.

FIG. 18 is an enlarged end view of a motor drive adapter according to one embodiment of the curtain assembly.

FIG. 19 is an enlarged perspective view of a motor drive adapter according to one embodiment of the curtain assembly.

FIG. 20 is an enlarged perspective view of the rotatable drive element according to one embodiment.

FIG. 21 is an enlarged end view of the rotatable drive element according to one embodiment.

FIG. 22 is an enlarged perspective view of the preferred tube embodiment with the position a section was taken to reflect the two clockwise helical grooves 38 and two counter clockwise grooves 40 in the tube 26.

FIG. 23 is an end view of the drive element assembly of the preferred embodiment showing the starting points of the clockwise helical grooves 38 and the counter clockwise grooves 40.

FIG. 24 is the cross section view taken from FIG. 22.

Figure 25:
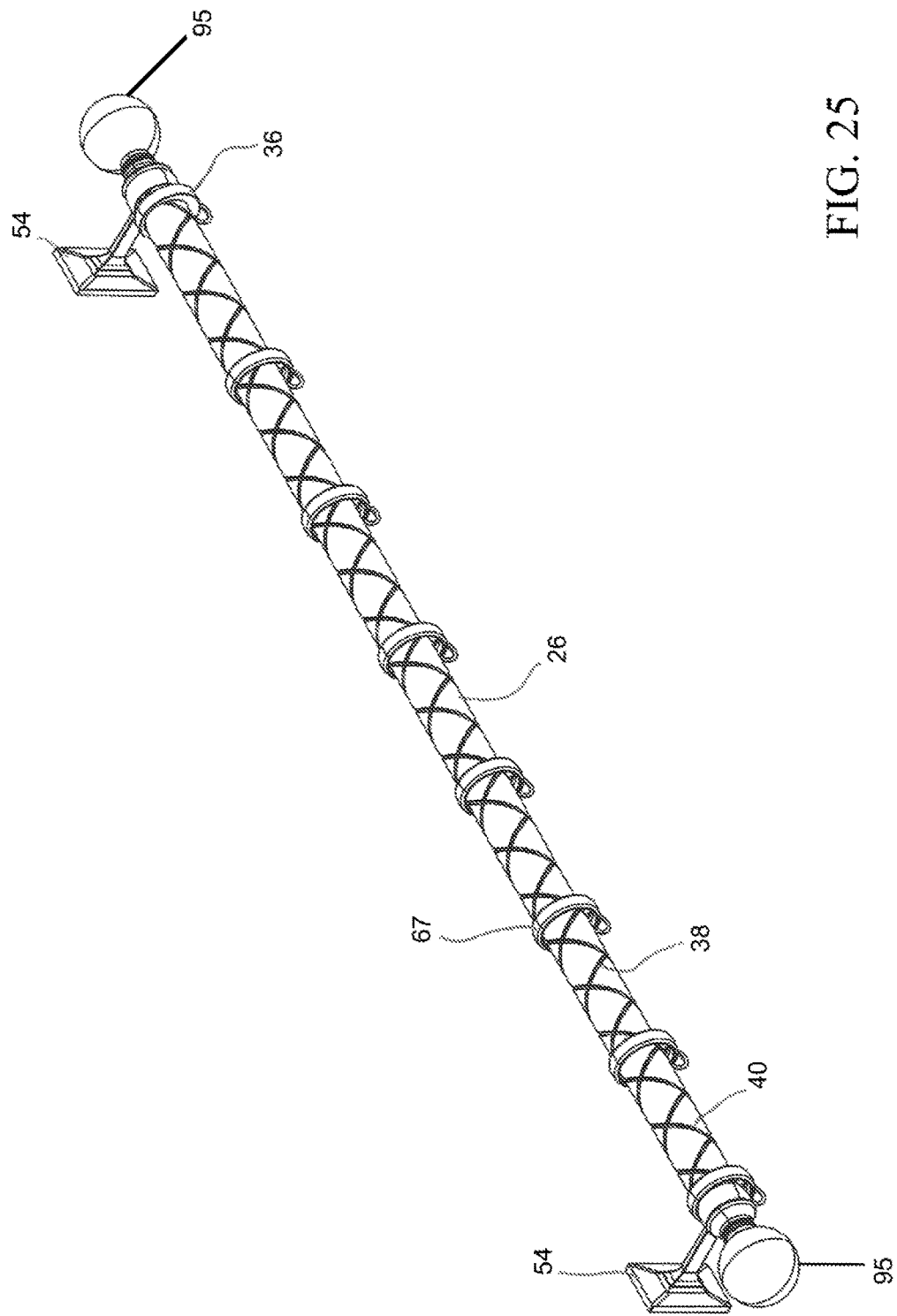

FIG. 25 is the preferred embodiment curtain assembly.

Figure 26:
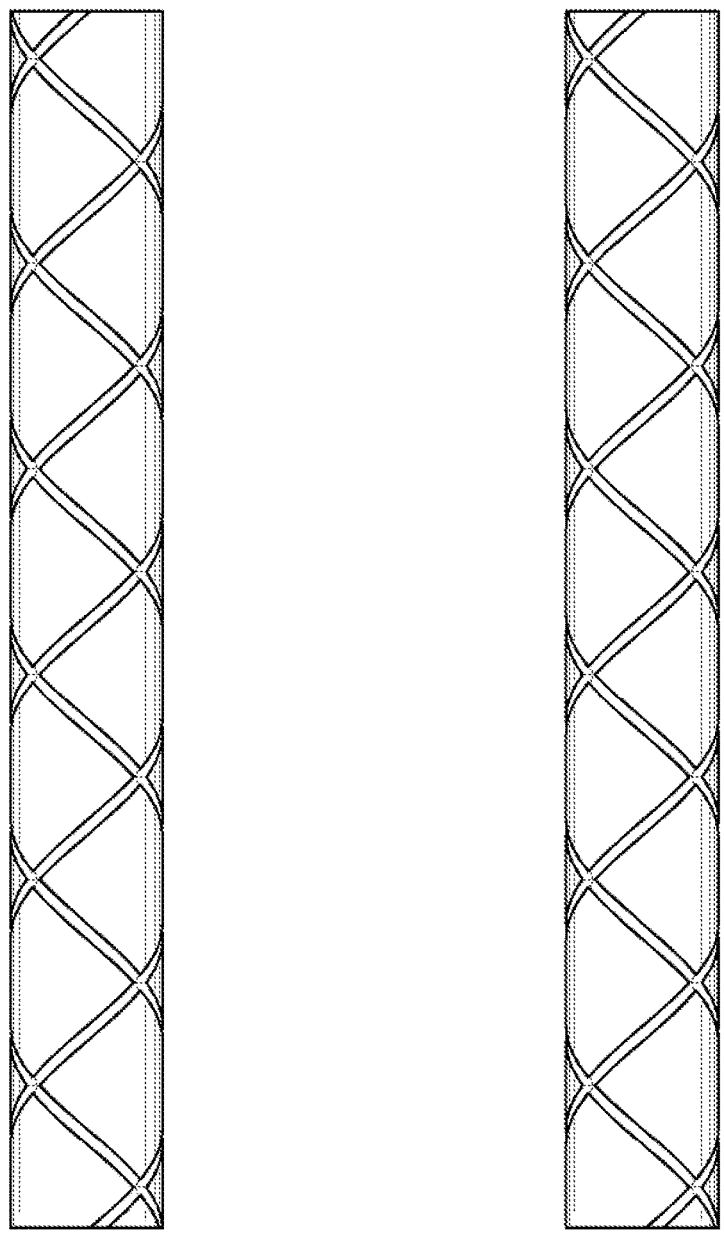

FIG. 26 is a drawing of the functional relationship of the helical grooves 38 and 40 to the midpoint of the drive element to assure the drive attachment elements meet in the midpoint of the drive element on center close draperies.

Figure 27:
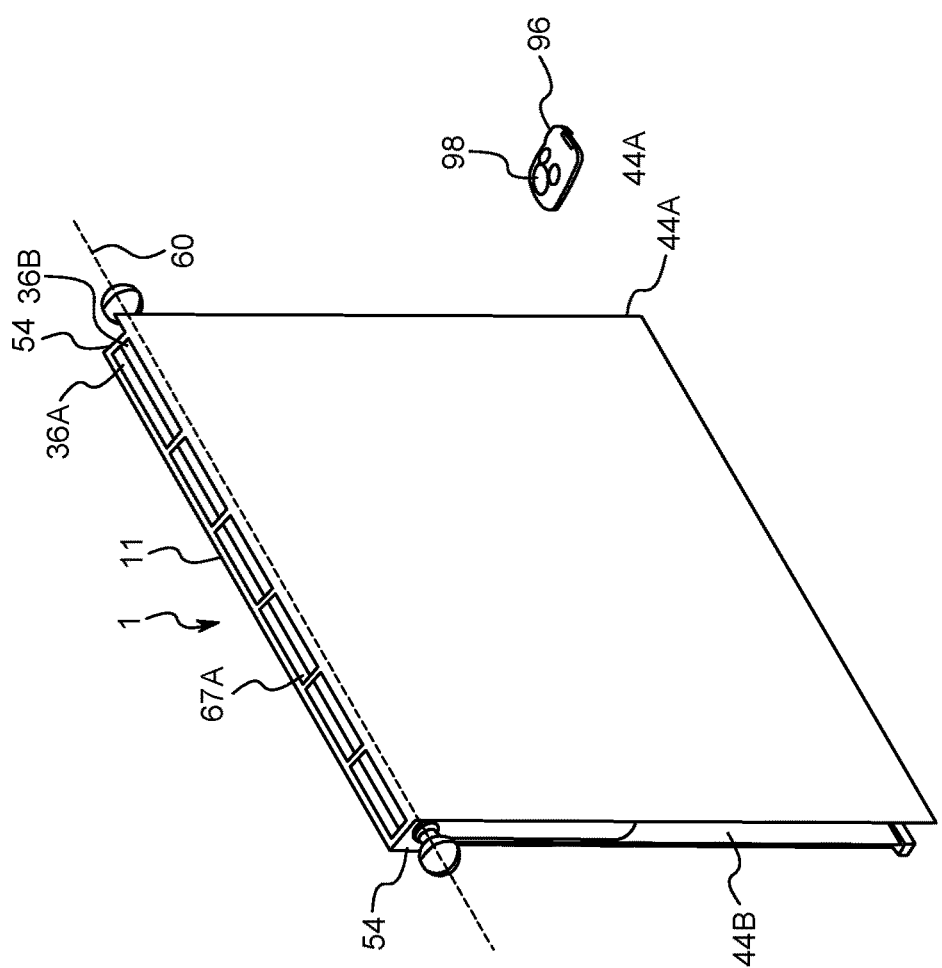

FIG. 27 is a perspective view of one embodiment of the curtain assembly when the outer curtain is a blackout curtain in the deployed position and the inner curtain is a sheer curtain in the deployed position.

Figure 28:
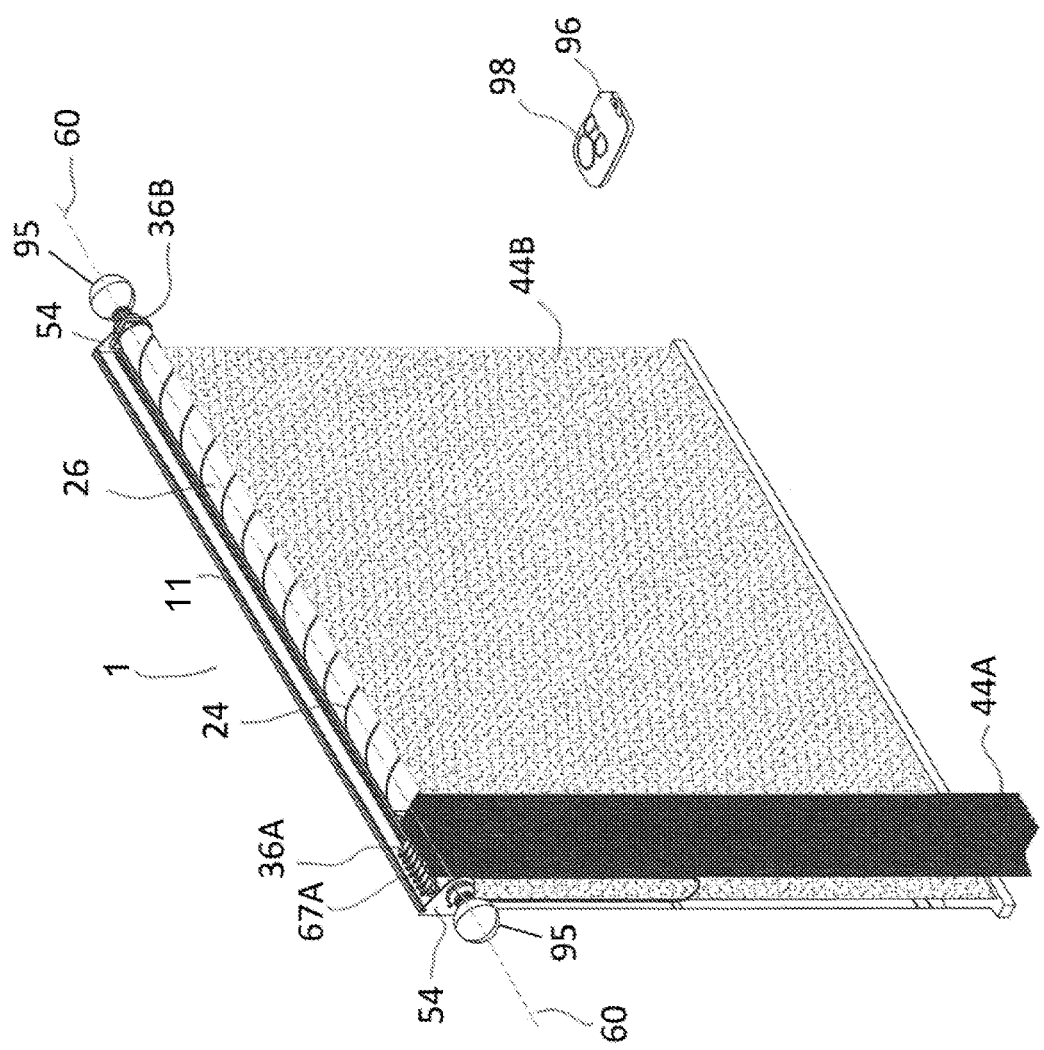

FIG. 28 is a perspective view of one embodiment of the curtain assembly when the outer curtain is a blackout curtain in the stored position and the inner curtain is a sheer curtain in the deployed position.

Figure 29:
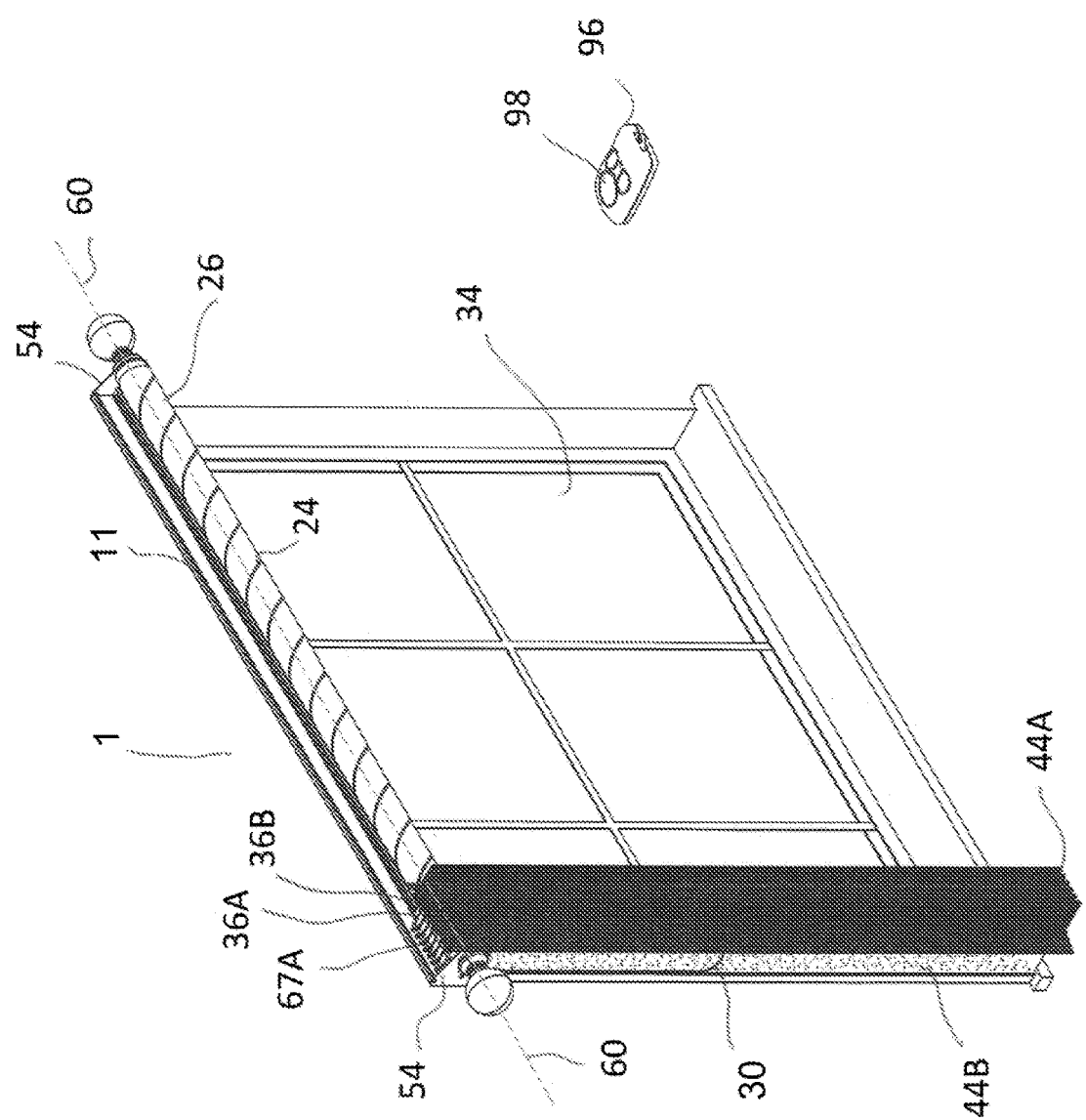

FIG. 29 is a perspective view of the embodiment of the curtain assembly when both the outer and inner curtains are in the stored position.

Figure 6:
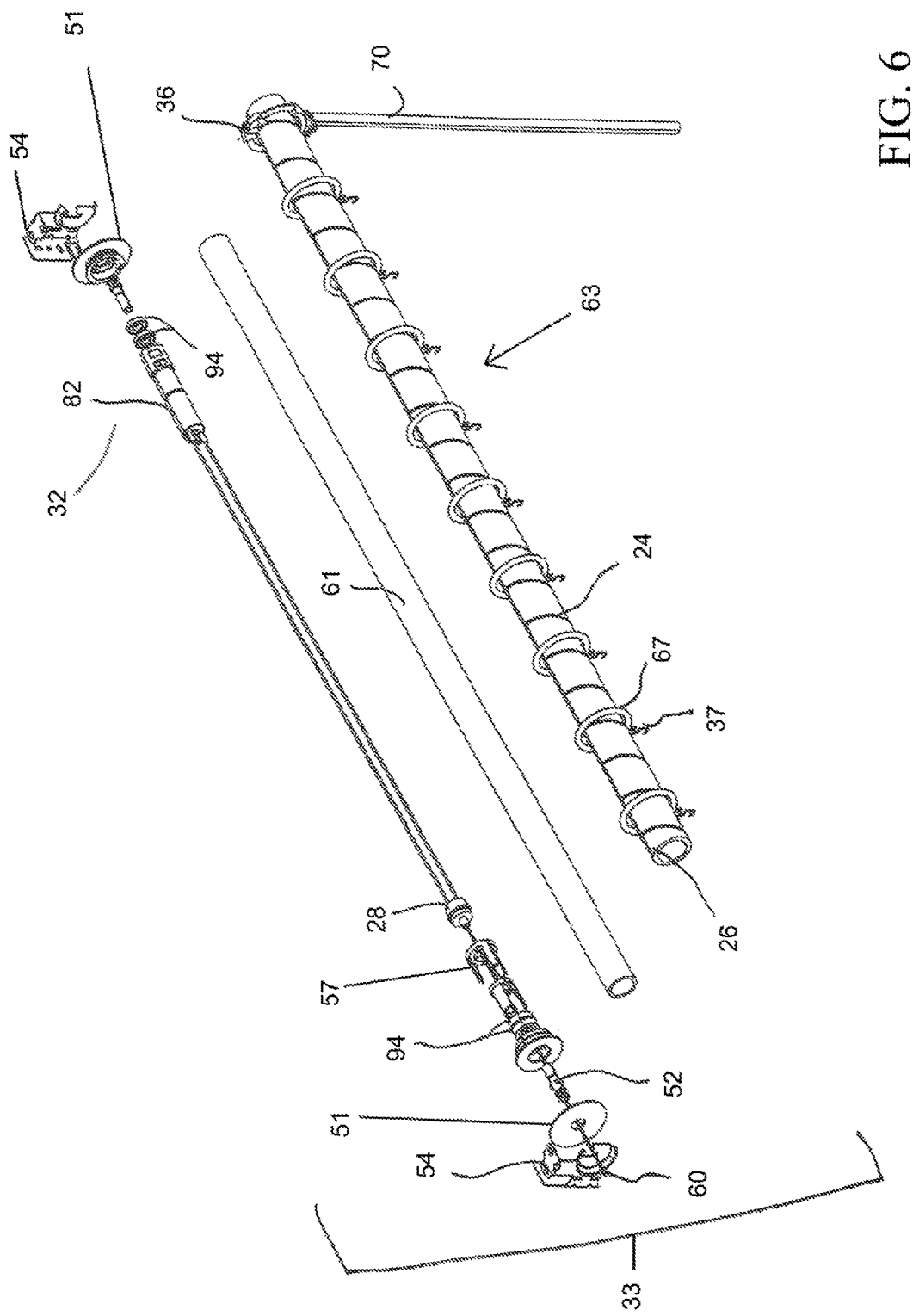
FIG. 6 is an enlarged perspective view of the components of the rotatable drive element according to one embodiment of the curtain assembly in which the power supply to the motor is external to the drive element.
Figure 30:
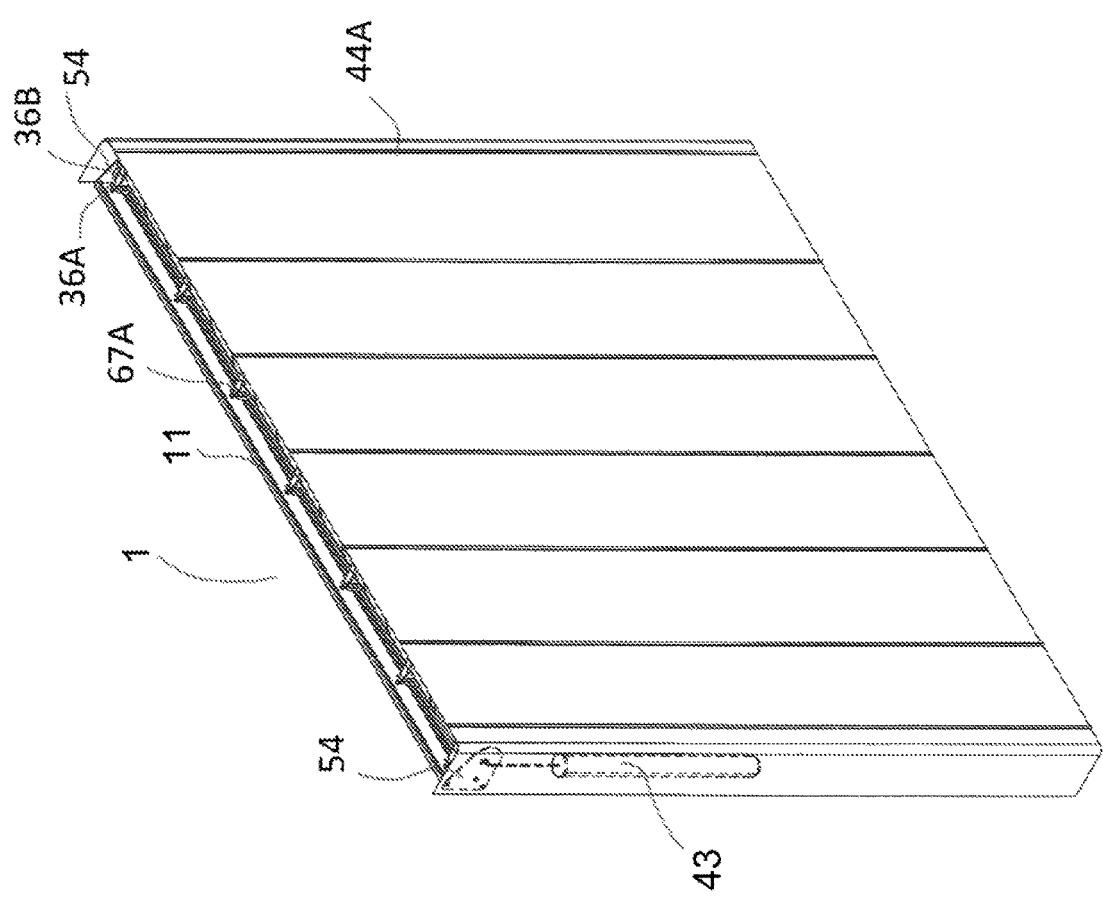

FIG. 30 is a perspective view of the preferred embodiment with the outer curtain is a blackout curtain with a portion cut away to show the position of the external battery pack from FIG. 6.

Figure 31:
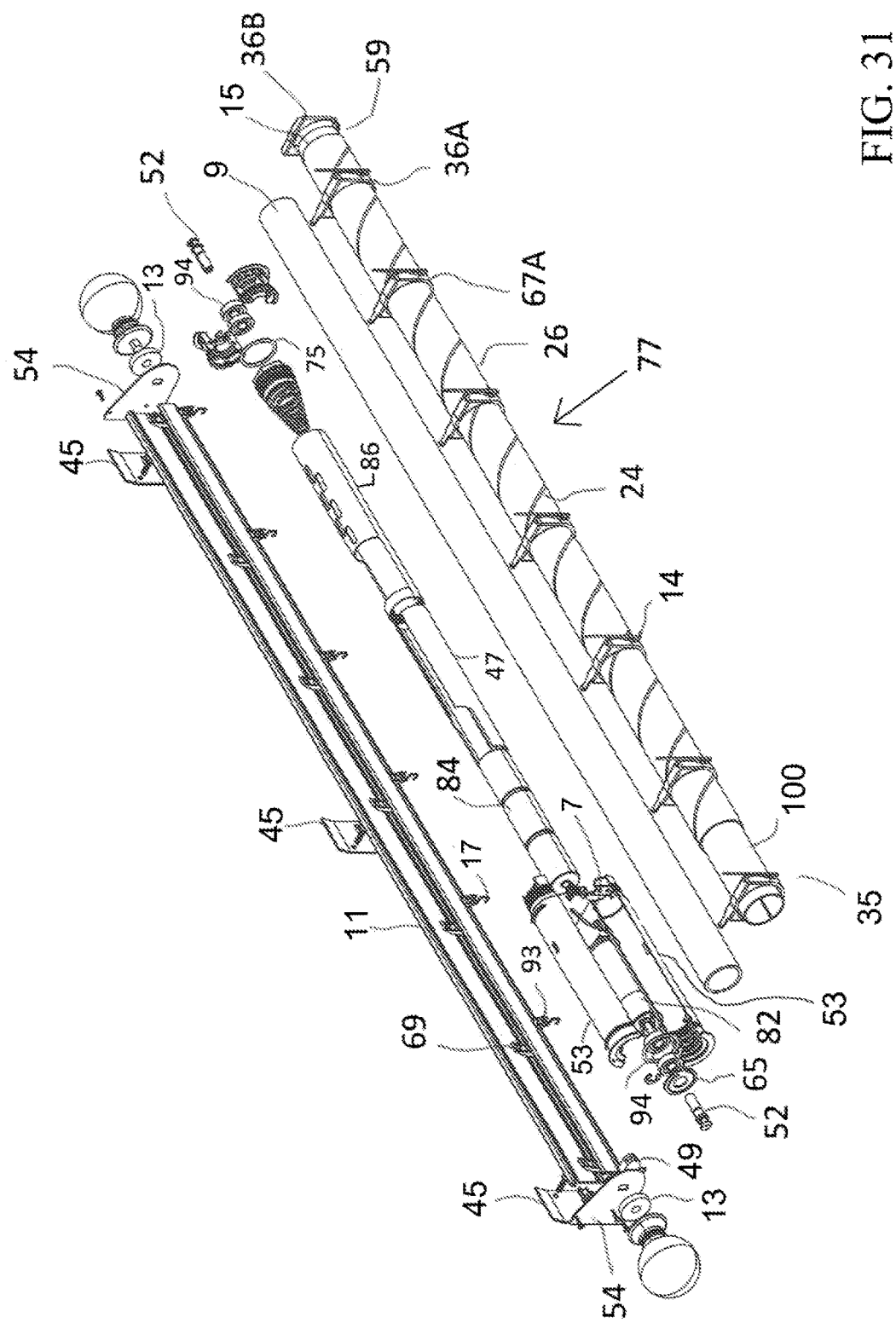

FIG. 31 is an enlarged perspective view of the components of the rotatable drive element according to one embodiment of the curtain assembly showing an internal battery power supply.

Figure 32:
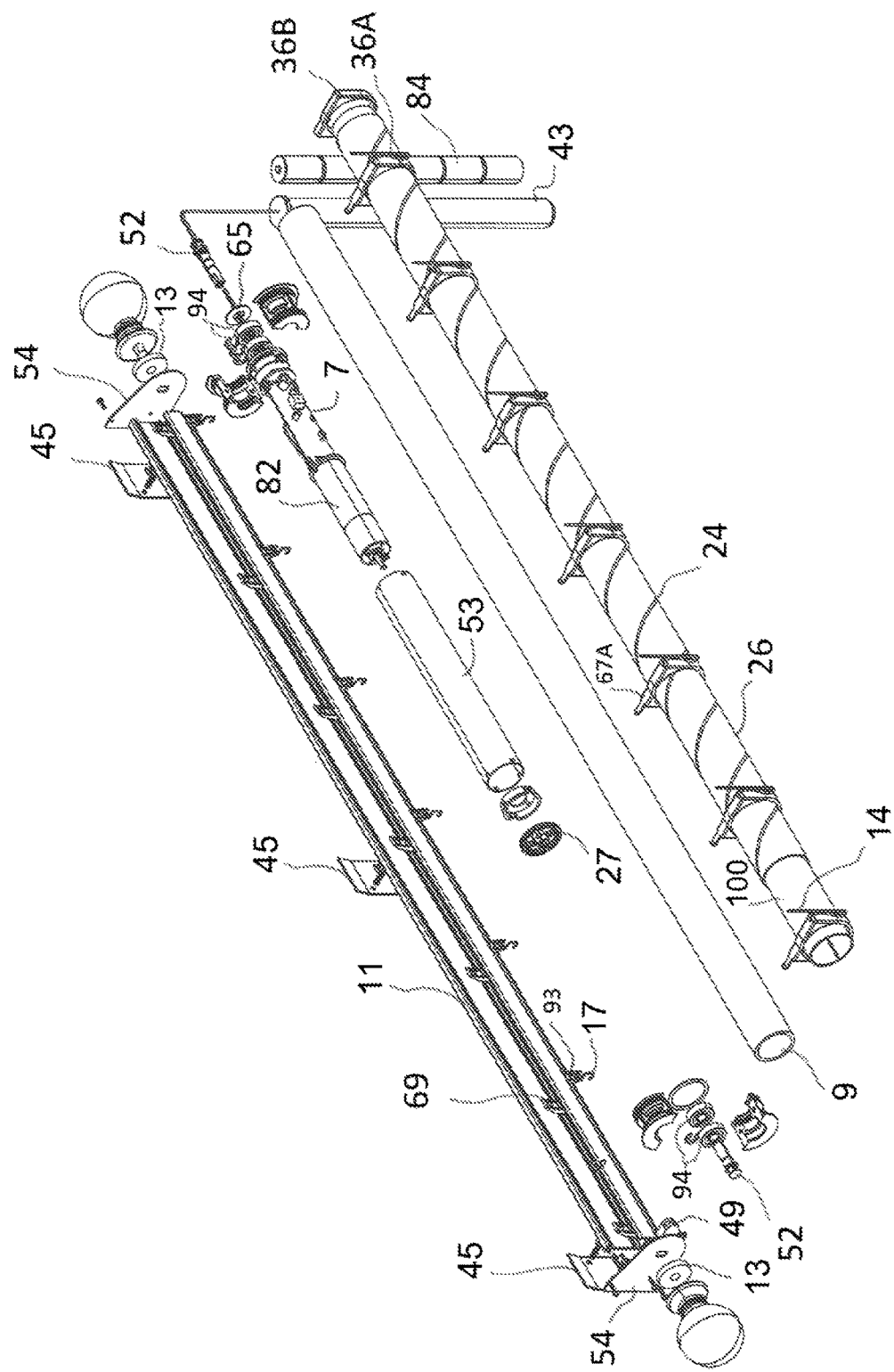

FIG. 32 is an enlarged perspective view of the components of the rotatable drive element according to one embodiment of the curtain assembly show an external power supply.

Figure 33:
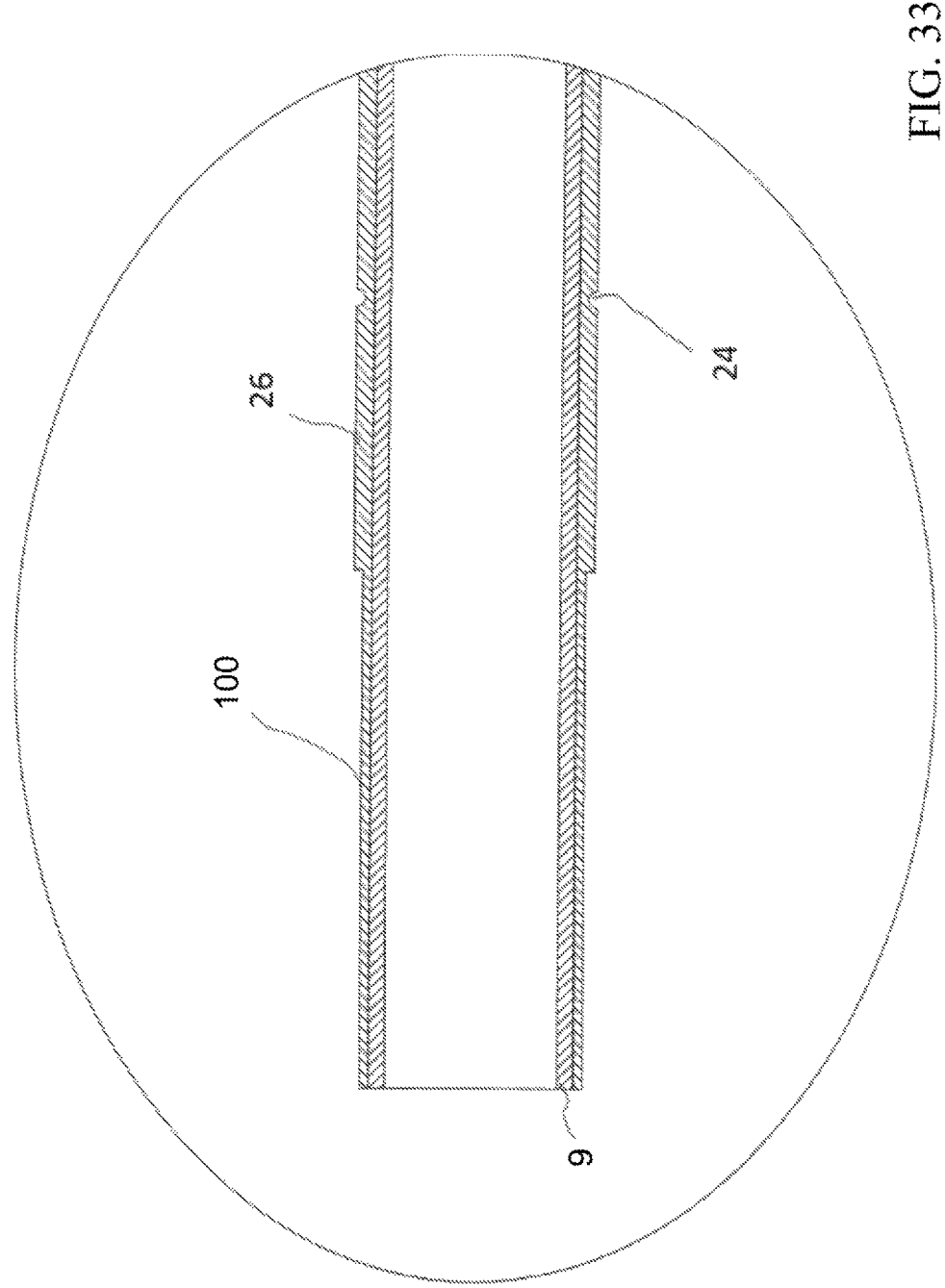

FIG. 33 is a cross-sectional view of the drive section of the rotatable drive element showing the helical groove and a non-driving groove according to one embodiment of the curtain assembly.

Figure 34:
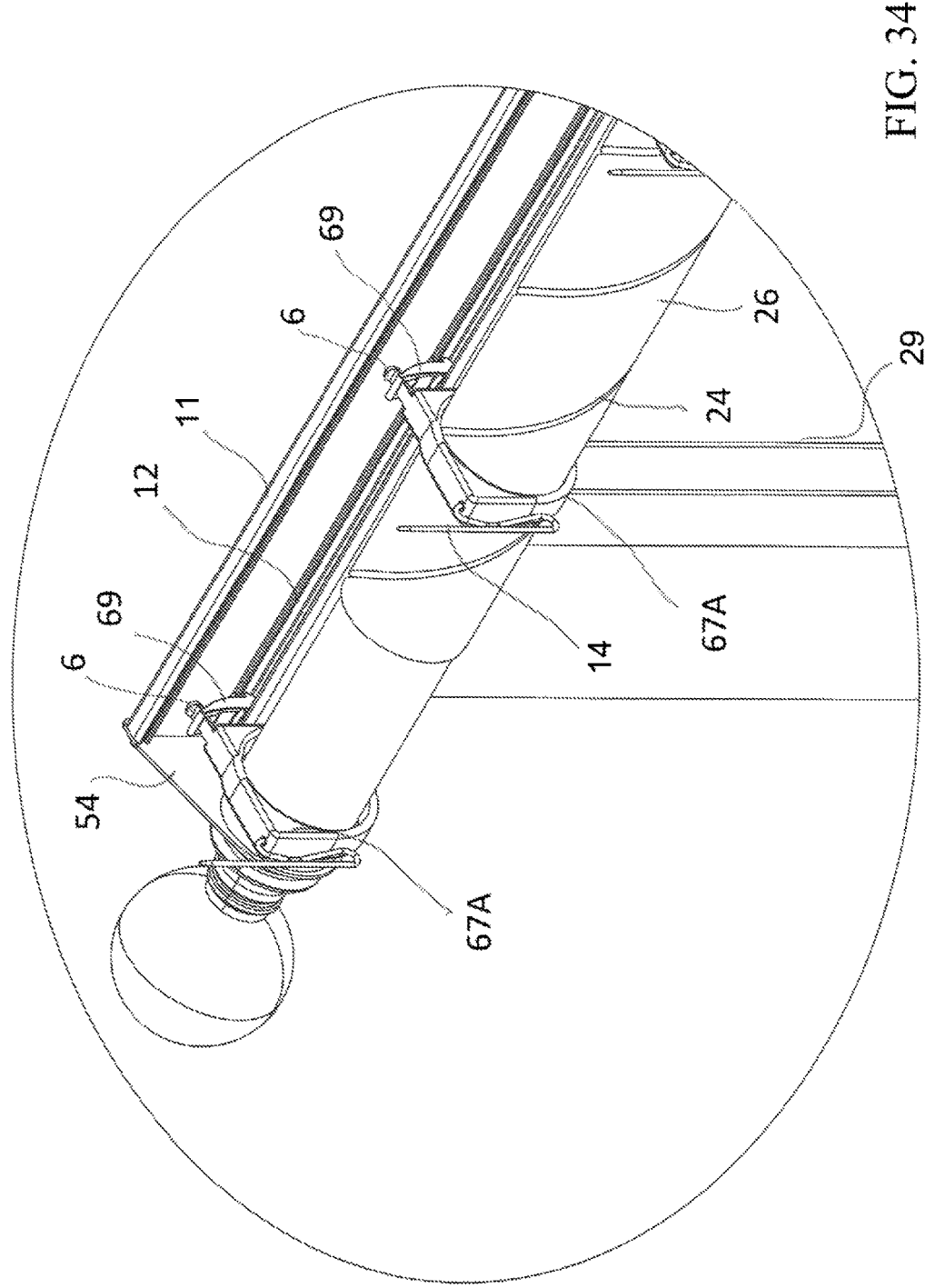

FIG. 34 is an enlarged perspective view of one embodiment of the curtain assembly non-driving groove.

Figure 35:
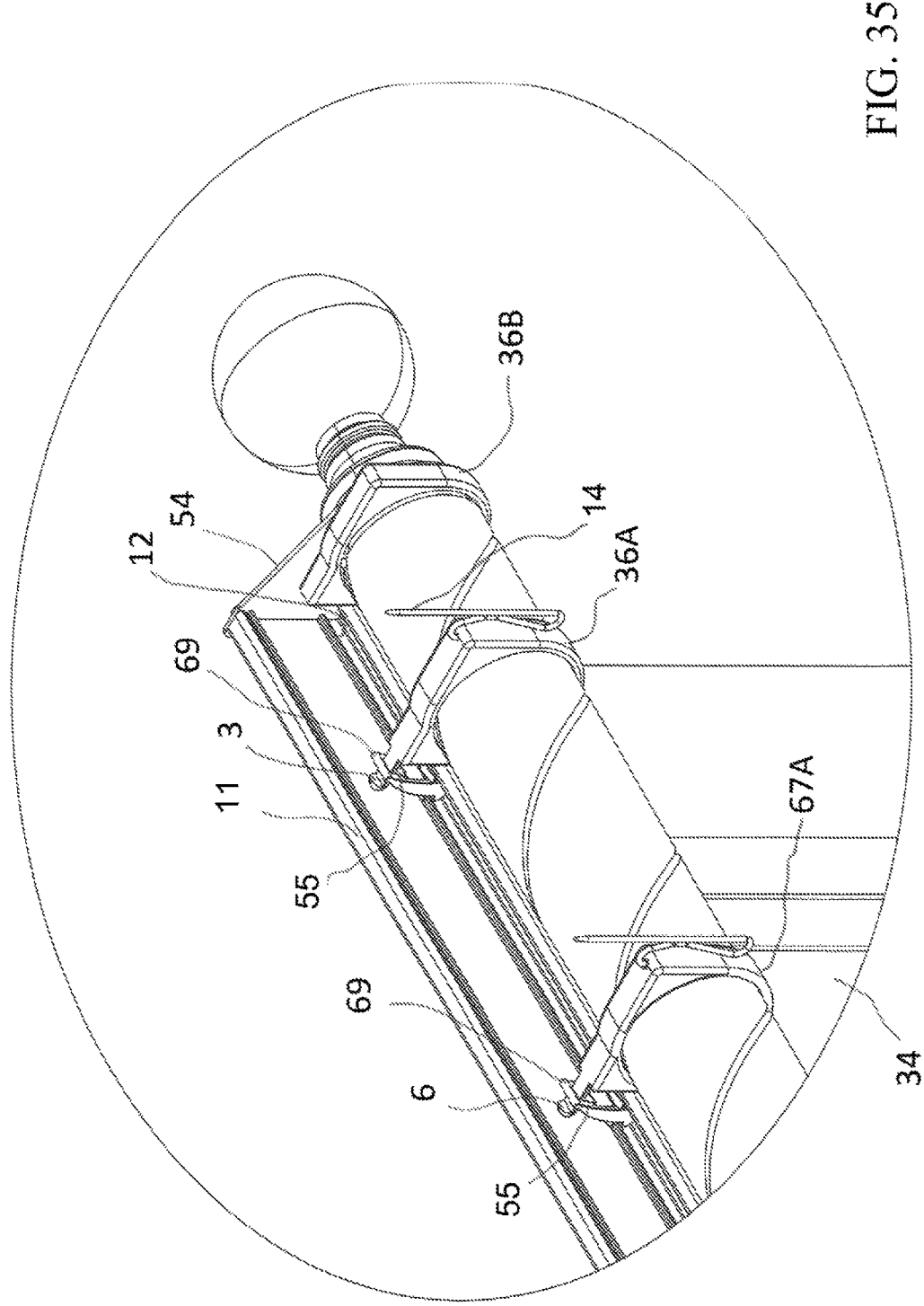

FIG. 35 is an enlarged perspective view of one distal end of the rotatable drive element showing the inner drive attachment element and the inner driver stall area according to the same embodiment of the curtain assembly shown in FIG. 34.

Figure 36:
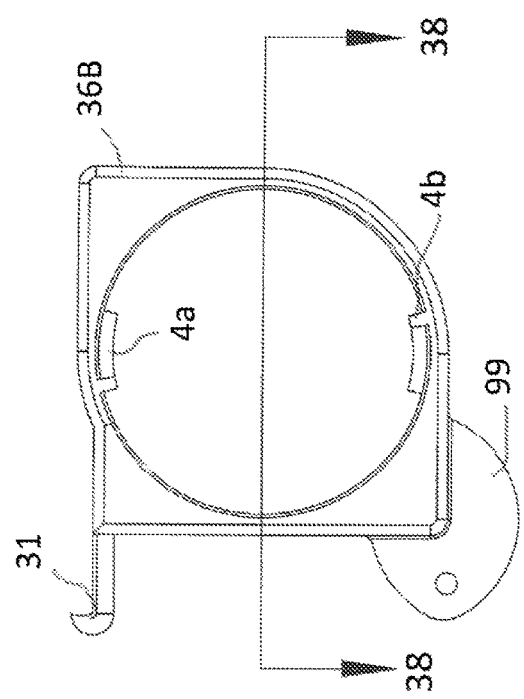

FIG. 36 is an enlarged side view of the inner drive attachment element according to one embodiment of the curtain assembly.

Figure 37:
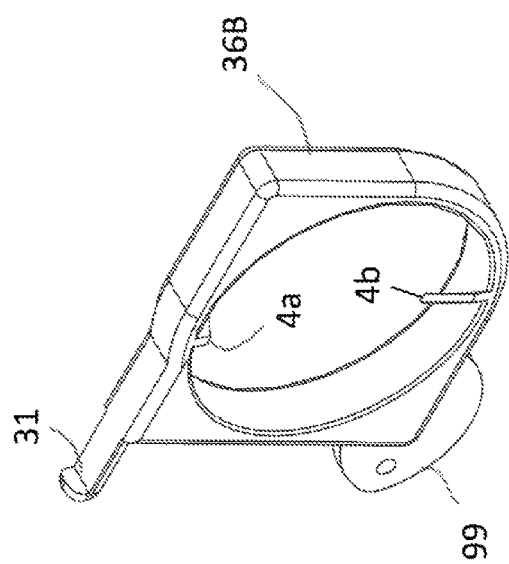

FIG. 37 is an enlarged perspective view of the inner drive attachment element according to one embodiment of the curtain assembly.

Figure 38:
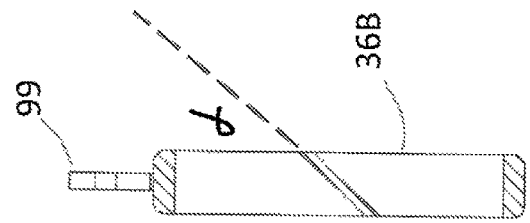

FIG. 38 is an enlarged sectioned view of the inner drive attachment element according to one embodiment of the curtain assembly.

Figure 39:
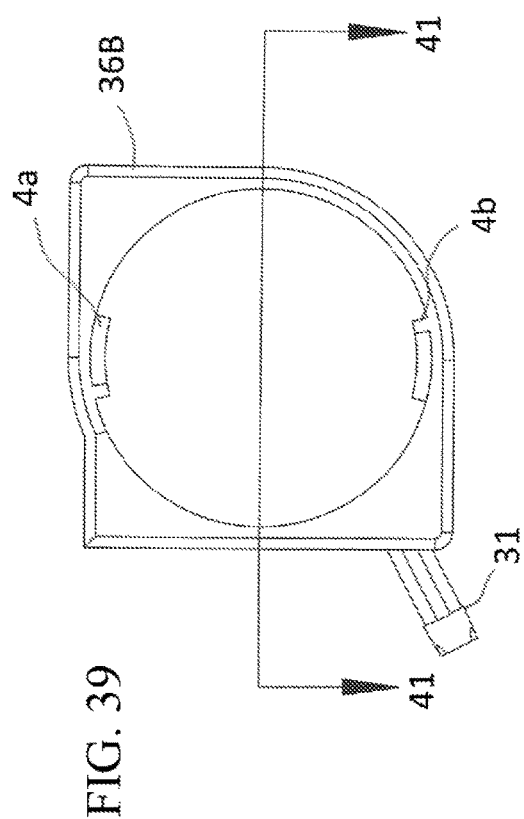

FIG. 39 is an enlarged side view of the inner drive attachment element according to one embodiment of the curtain assembly.

Figure 40:
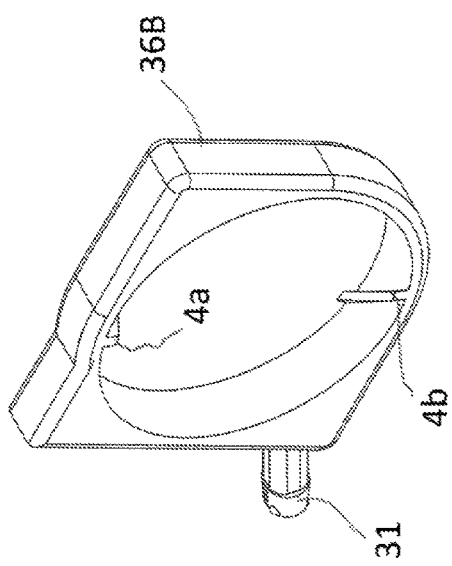

FIG. 40 is an enlarged perspective view of the inner drive attachment element according to one embodiment of the curtain assembly.

Figure 41:
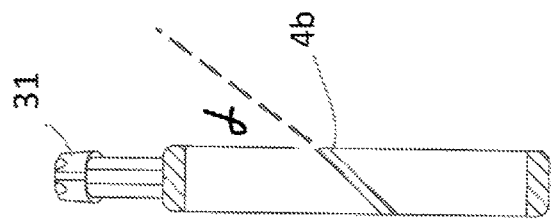
Figure 42:
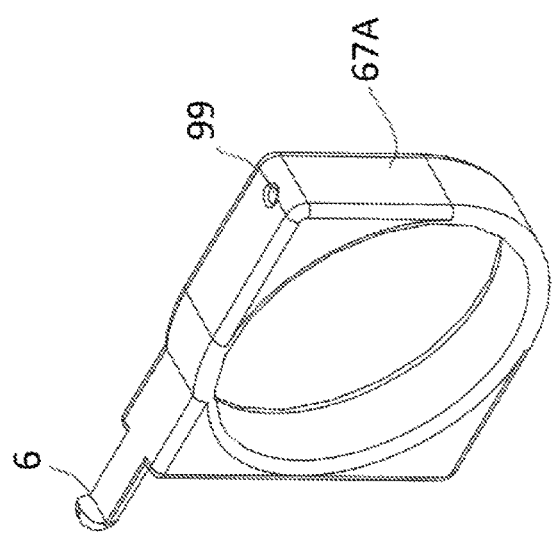

FIG. 41 is an enlarged sectioned view of the inner drive attachment element according to one embodiment of the curtain assembly FIG. 42 is an enlarged perspective view of an outer idler attachment element according to one embodiment of the curtain assembly.

Figure 43:
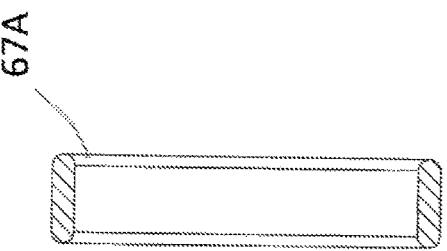

FIG. 43 is an enlarged sectioned view of an outer idler attachment element according to one embodiment of the curtain assembly.

Figure 44:
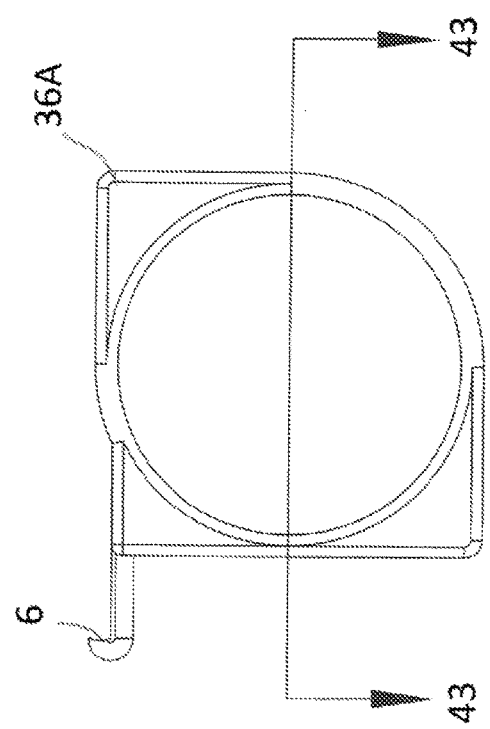

FIG. 44 is an enlarged side view of an outer idler attachment element according to one embodiment of the curtain assembly.

FIG. 45 is an enlarged side view of an outer drive attachment element according to one embodiment of the curtain assembly FIG. 46 is an enlarged sectioned view of an outer drive attachment element according to one embodiment of the curtain assembly.

FIG. 47 is an enlarged perspective view of an outer drive attachment element according to one embodiment of the curtain assembly.

Figure 48:
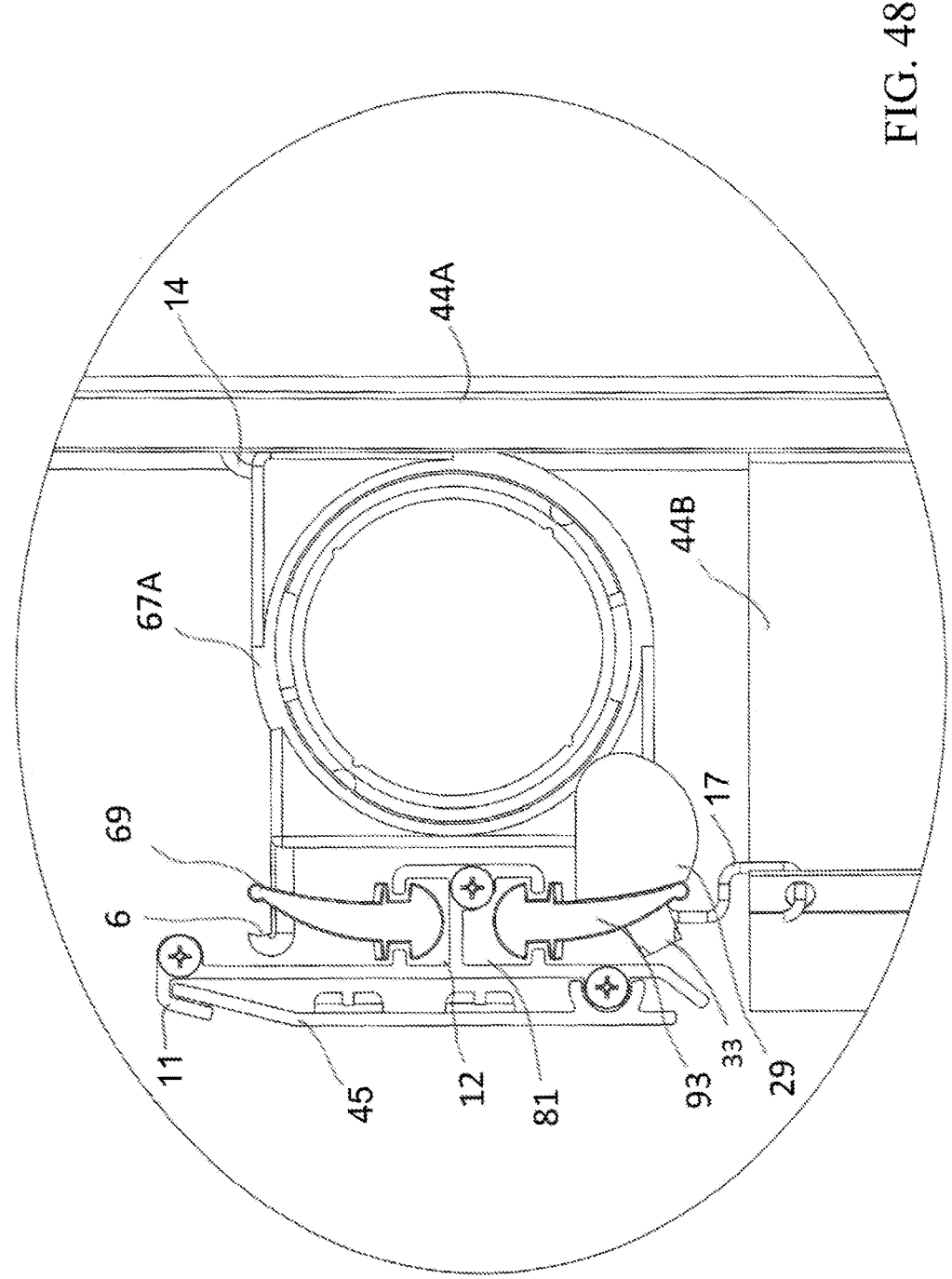

FIG. 48 is an end view of the curtain assembly showing the guide track, guides, attachment elements, and the position of the inter-curtain engager.

Figure 49:
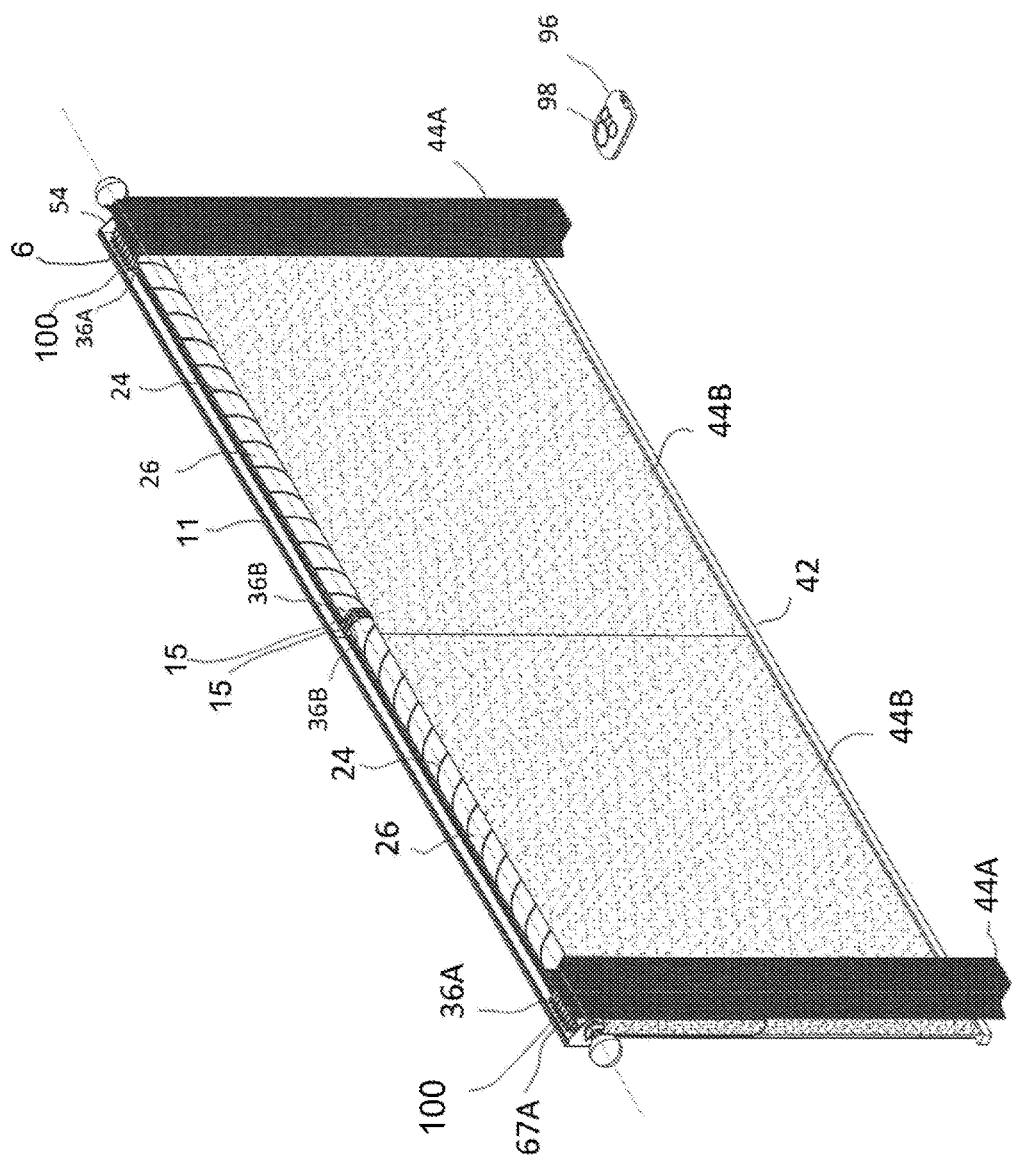
Figure 50:
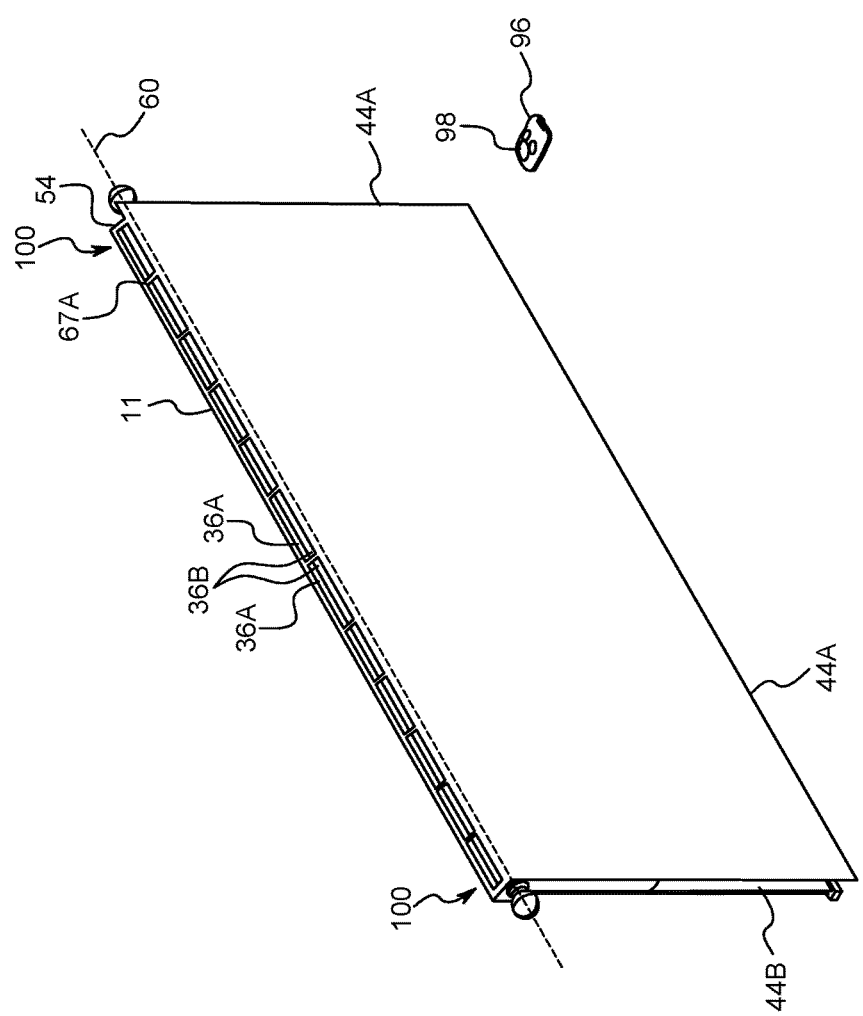

FIG. 49 is a is a perspective view of a curtain assembly according to one embodiment when the outer curtains are center closing blackout curtains in the stored position and the inner curtains are center closing sheer curtains in the deployed position FIG. 50 is a perspective view of a curtain assembly according to one embodiment when the outer curtains are center closing blackout curtains in the deployed position and the inner curtains are center closing sheer curtains in the stored position.

Figure 51:
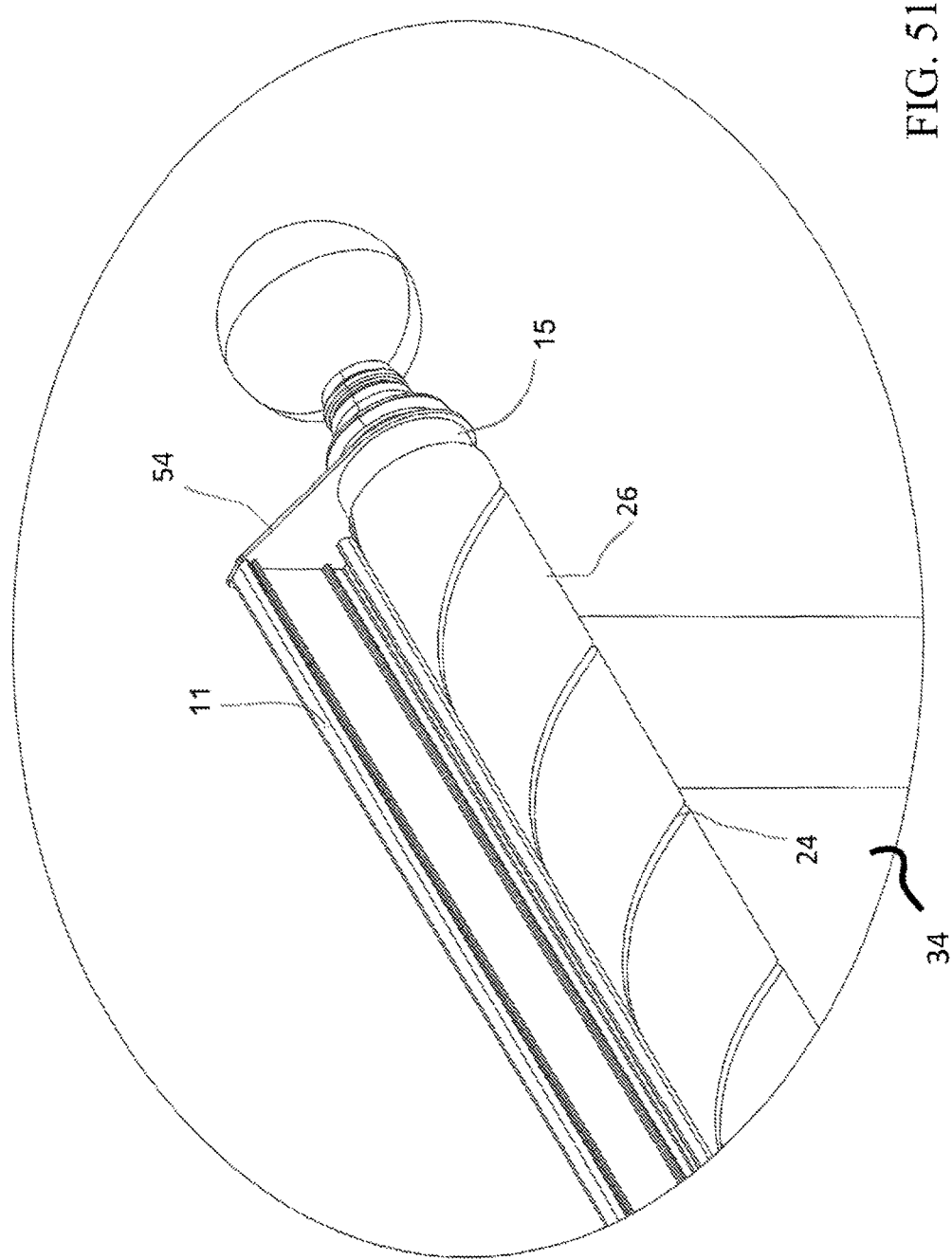

FIG. 51 is a perspective view of the tube end with the inner driver stall area.

Figure 52:
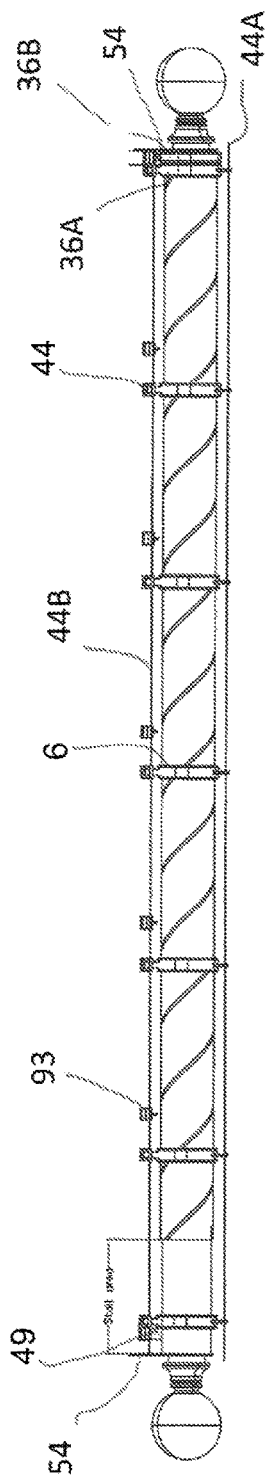

FIG. 52 is a top view of the curtain assembly with the guide track removed to see the position of the guides and attachment elements with the inner and outer curtains deployed and the outer drive attachment element can stop the tube from rotation when it stalls against the inner attachment element in the stall area.

Figure 53:
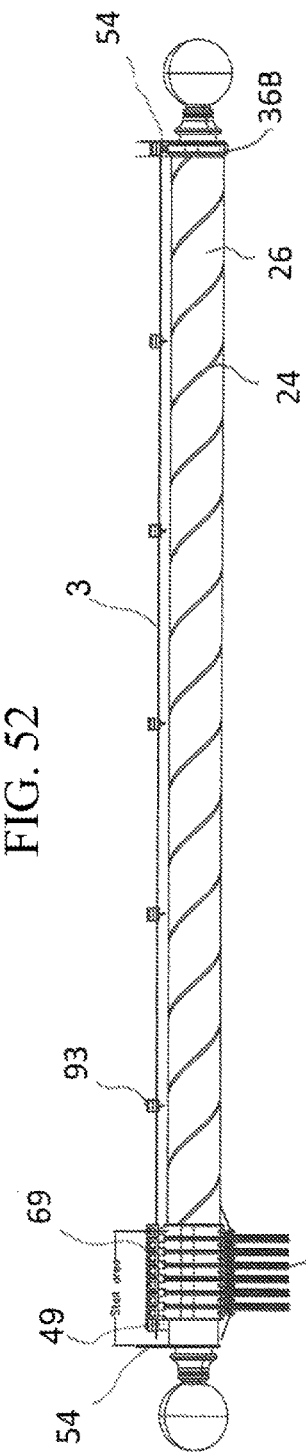

FIG. 53 is a top view of the curtain assembly with the guide track removed to see the position of the guides and attachment elements with the inner curtains deployed and the inter-curtain engager is in the engage-outer-drive-attachment-element position and the inner drive attachment element is in the stall area.

Figure 54:
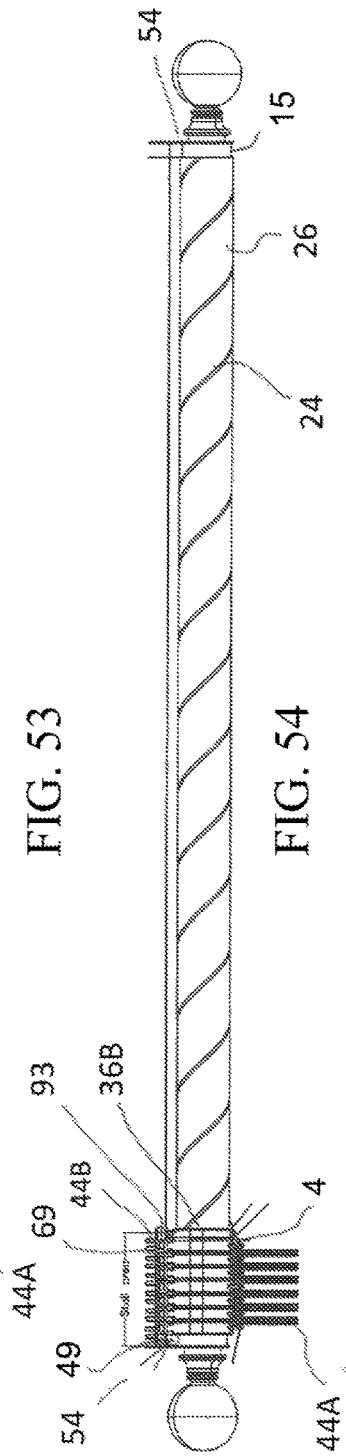

FIG. 54 is a top view of the curtain assembly with the guide track removed to see the position of the guides and attachment elements with the inner and outer curtains in the stored position and the outer simple attachment elements and the outer drive attachment element are in the non-driving or stall area. The inner curtain drive attachment element can stop the tube from rotation when it contacts the outer curtain drive attachment element.

Figure 55:
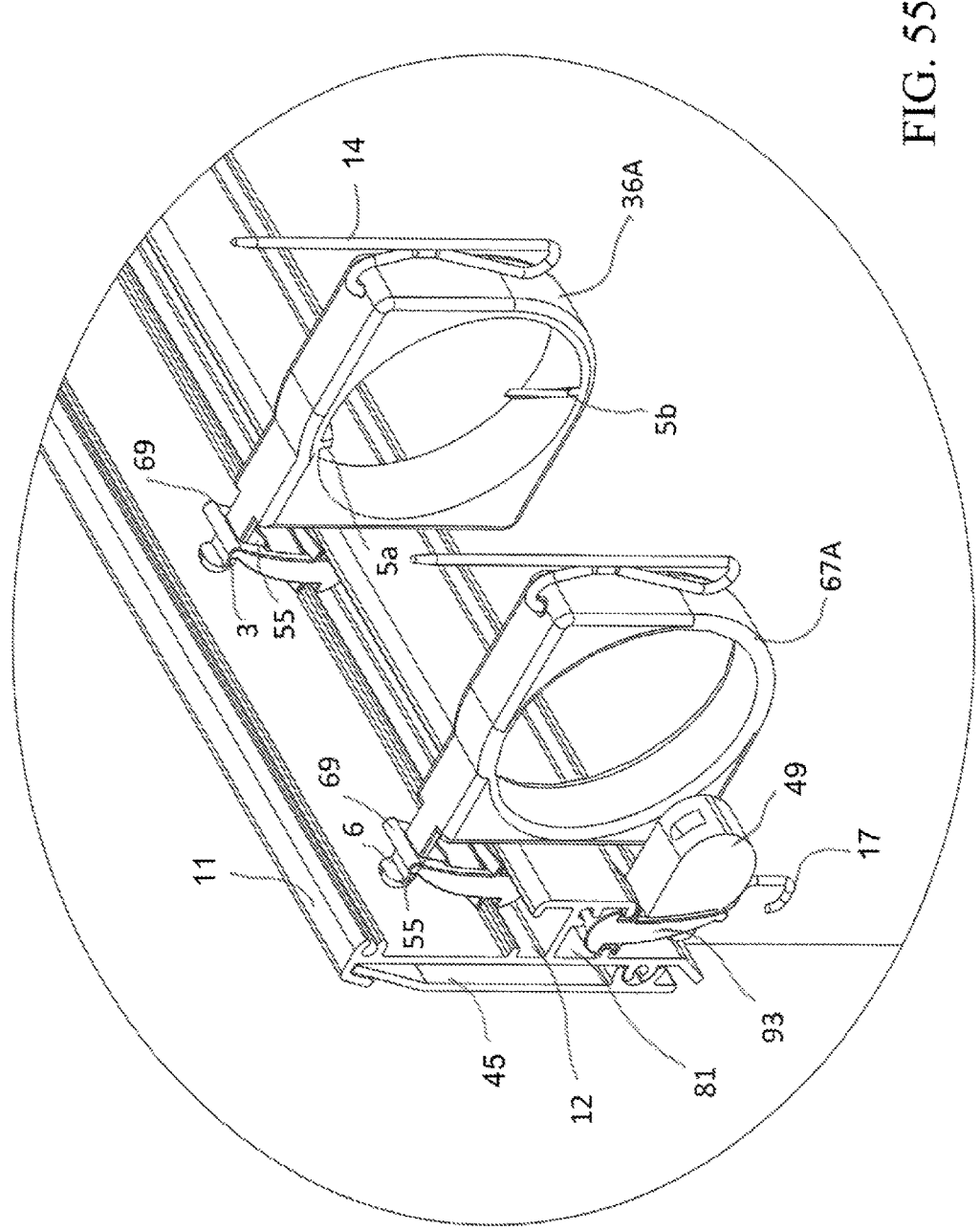

FIG. 55 is a perspective view of the area where the outer attachments are stored with the tube, inner and outer curtains removed to show the position of the inter-curtain engager and the carrier tracks.

Figure 56:
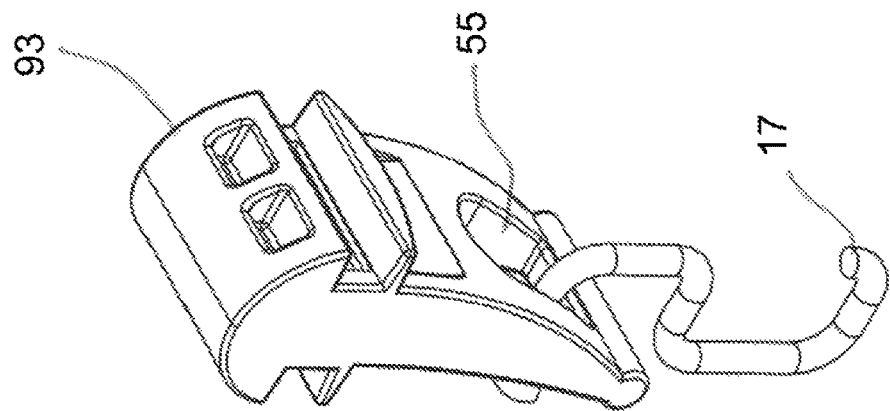

FIG. 56 is a perspective view of the inner curtain carrier and S-hook.

Figure 57:
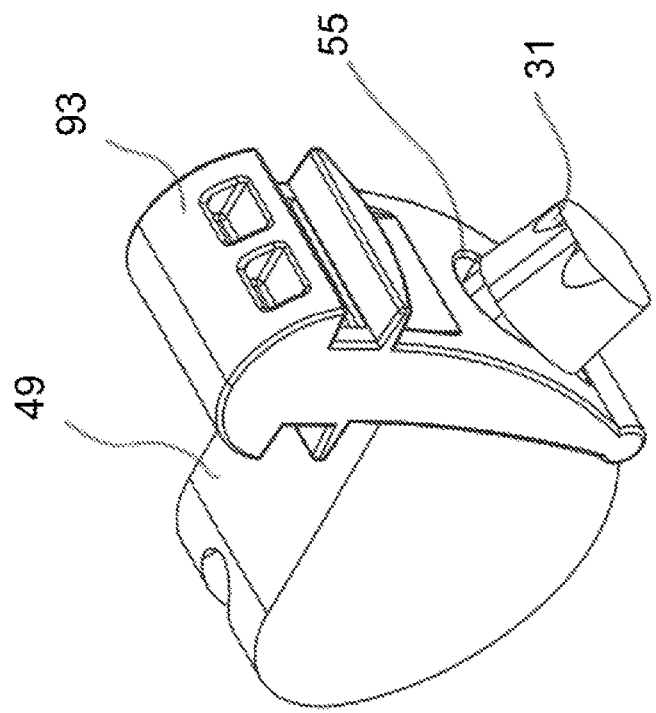

FIG. 57 is a perspective view of the inner curtain carrier with the inner curtain engager.

Figure 58:
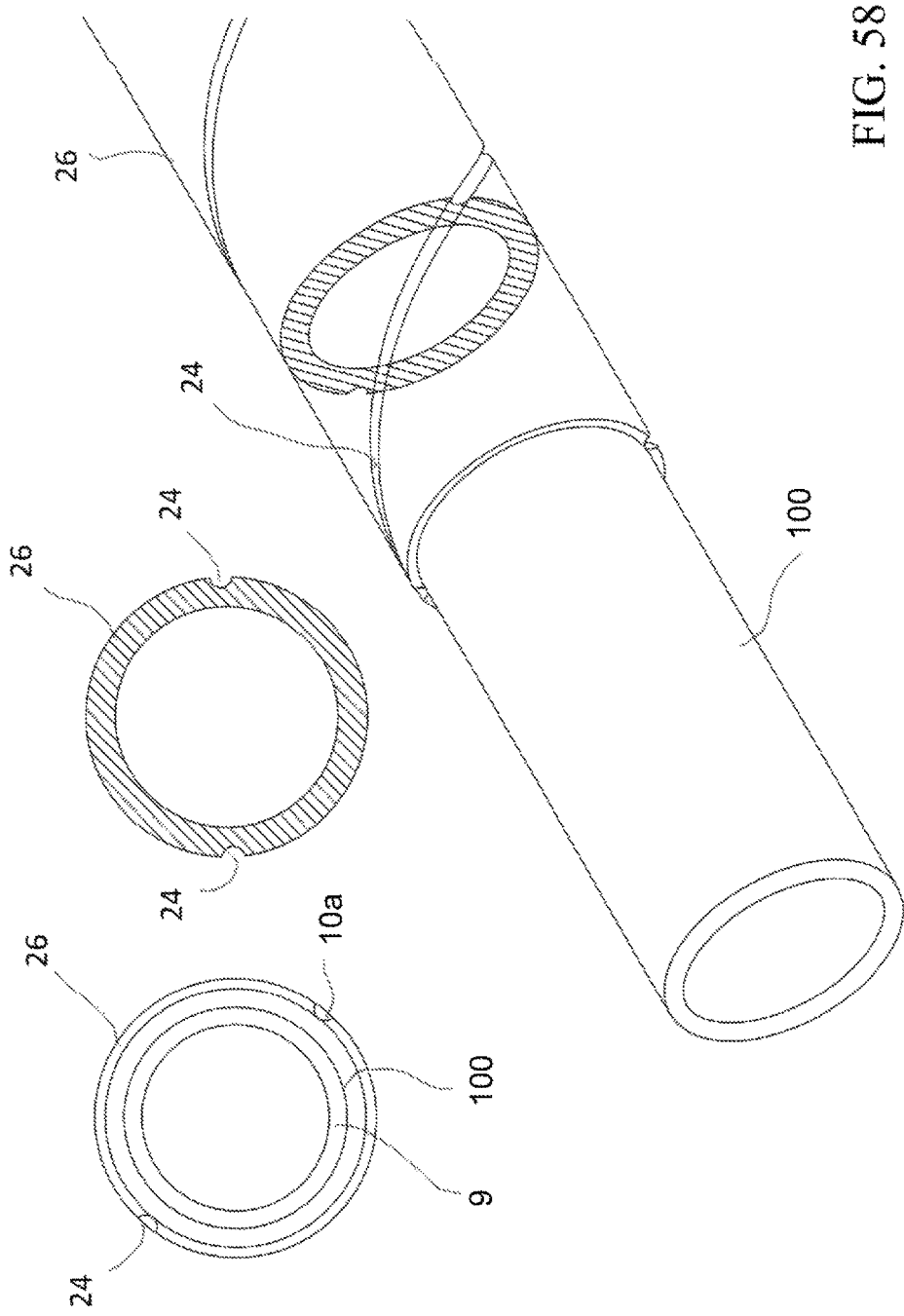

FIG. 58 is three views of the preferred tube embodiment with an outer driver stall area and two helical grooves spaced 180 degrees apart.

Figure 59:
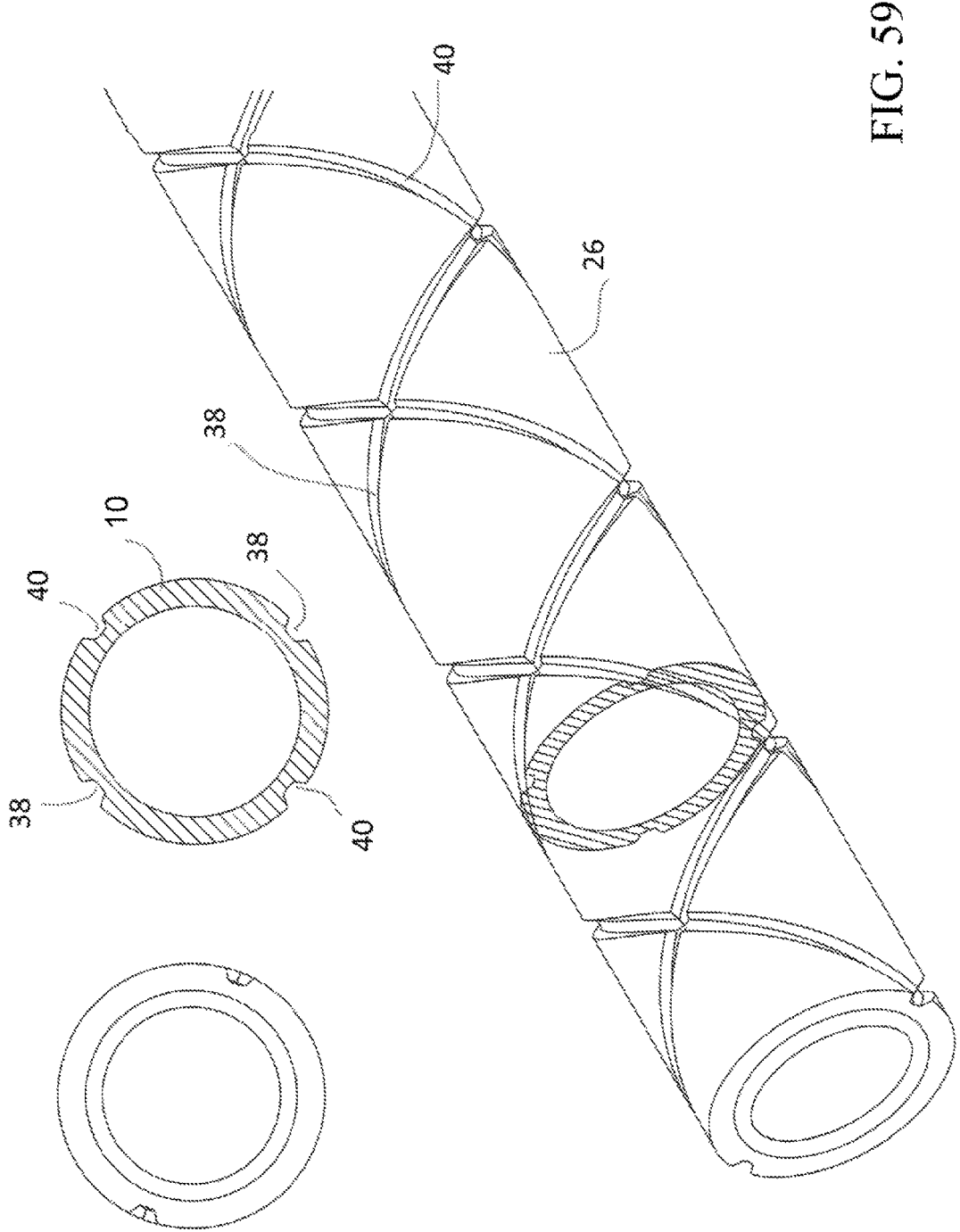

FIG. 59 is another tube embodiment with four helical grooves, two are counter clockwise spaced 180 degrees apart and two are clockwise spaced 180 degrees apart.

FIG. 60 is another embodiment of a tri-lobed tube, drive element, and internal tube driver.

Figure 61:
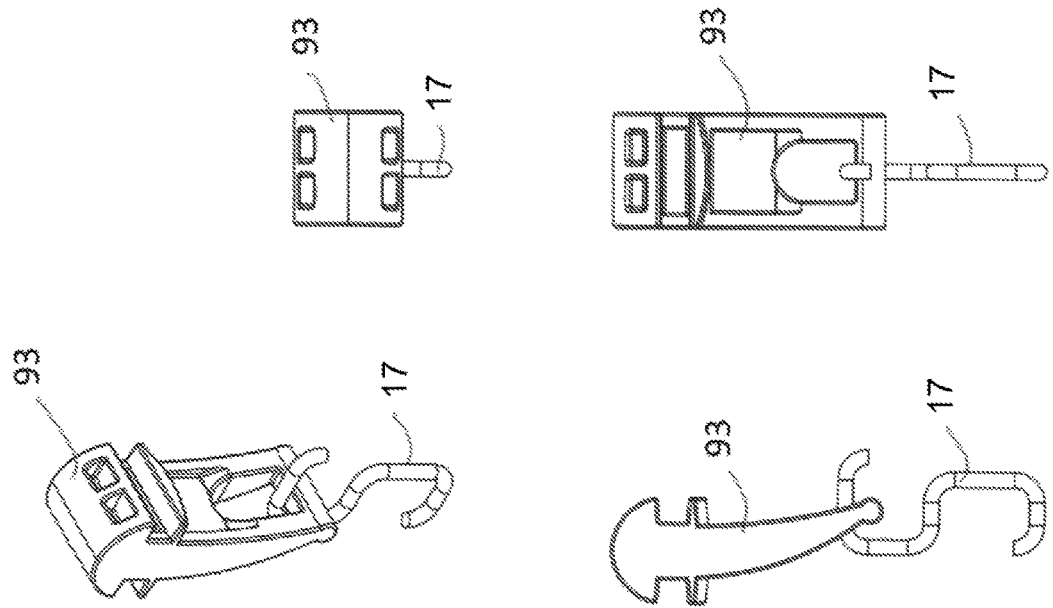

FIG. 61 shows four views of the inner curtain carrier and S-hook.

Figure 62:
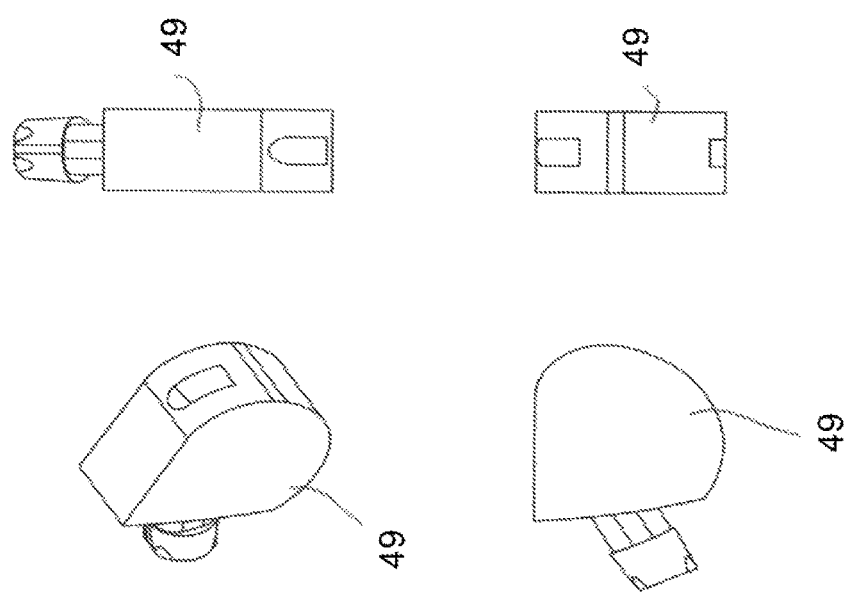
Figure 63A:
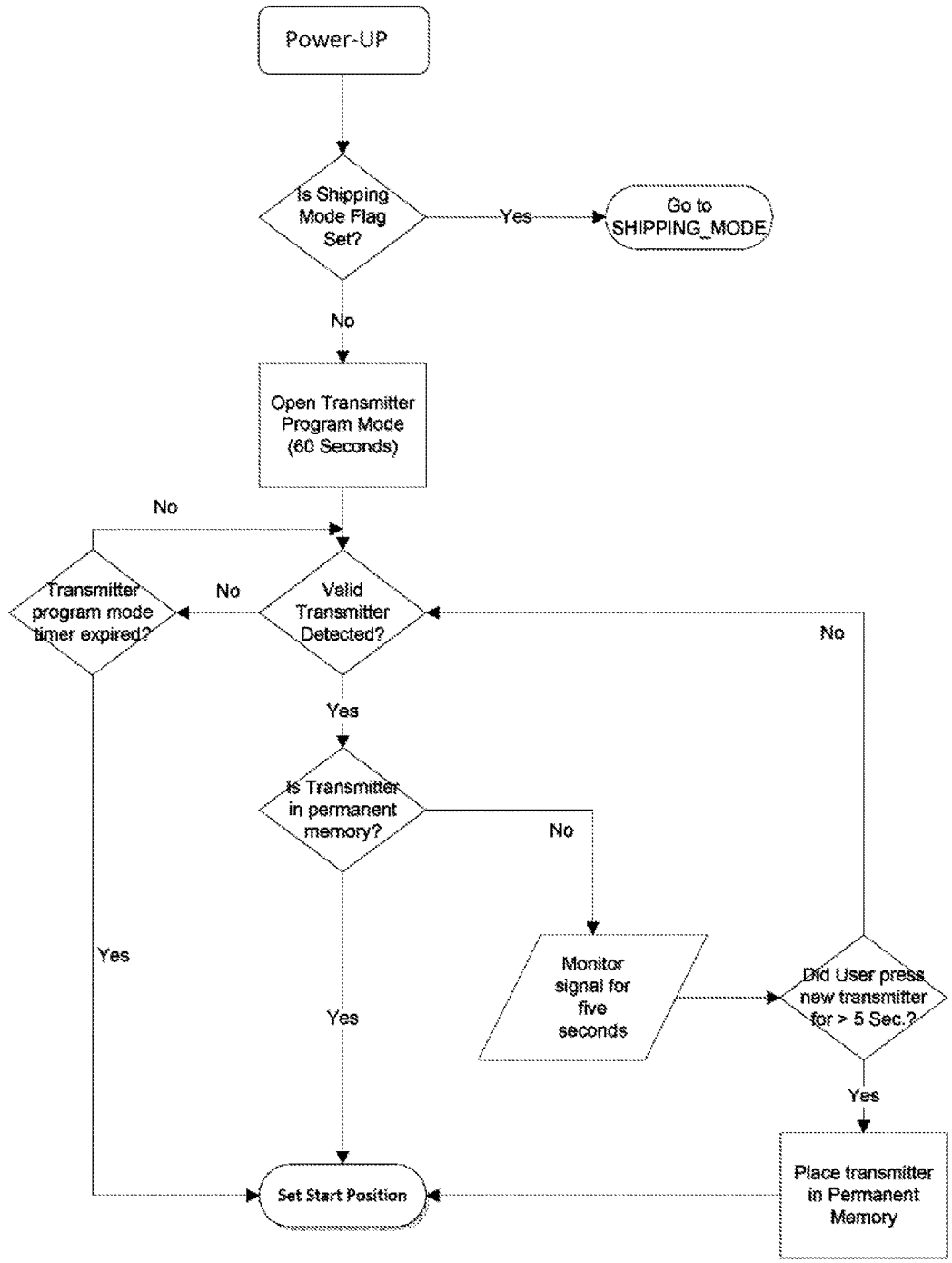
Figure 63B:
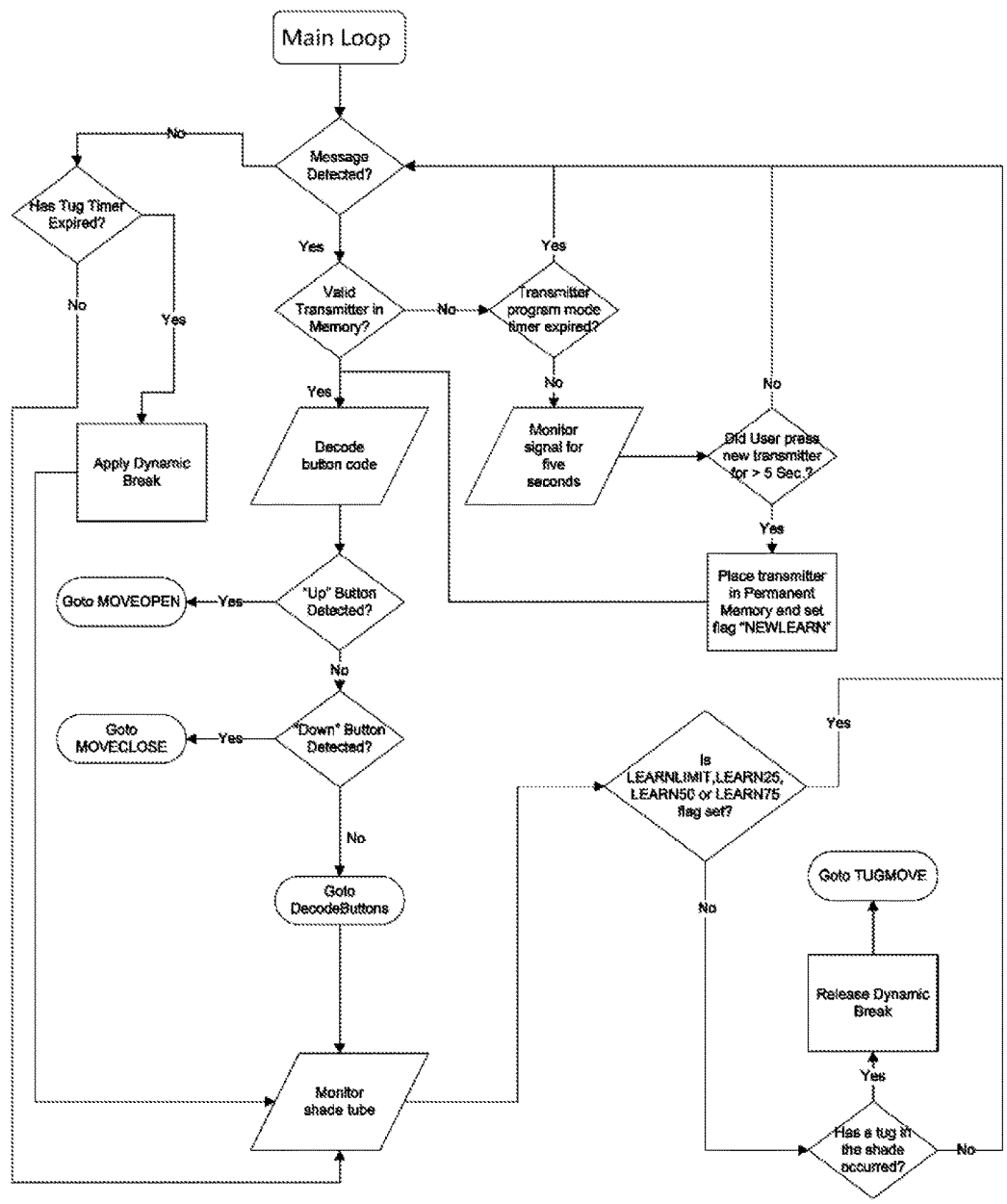
Figure 63C:
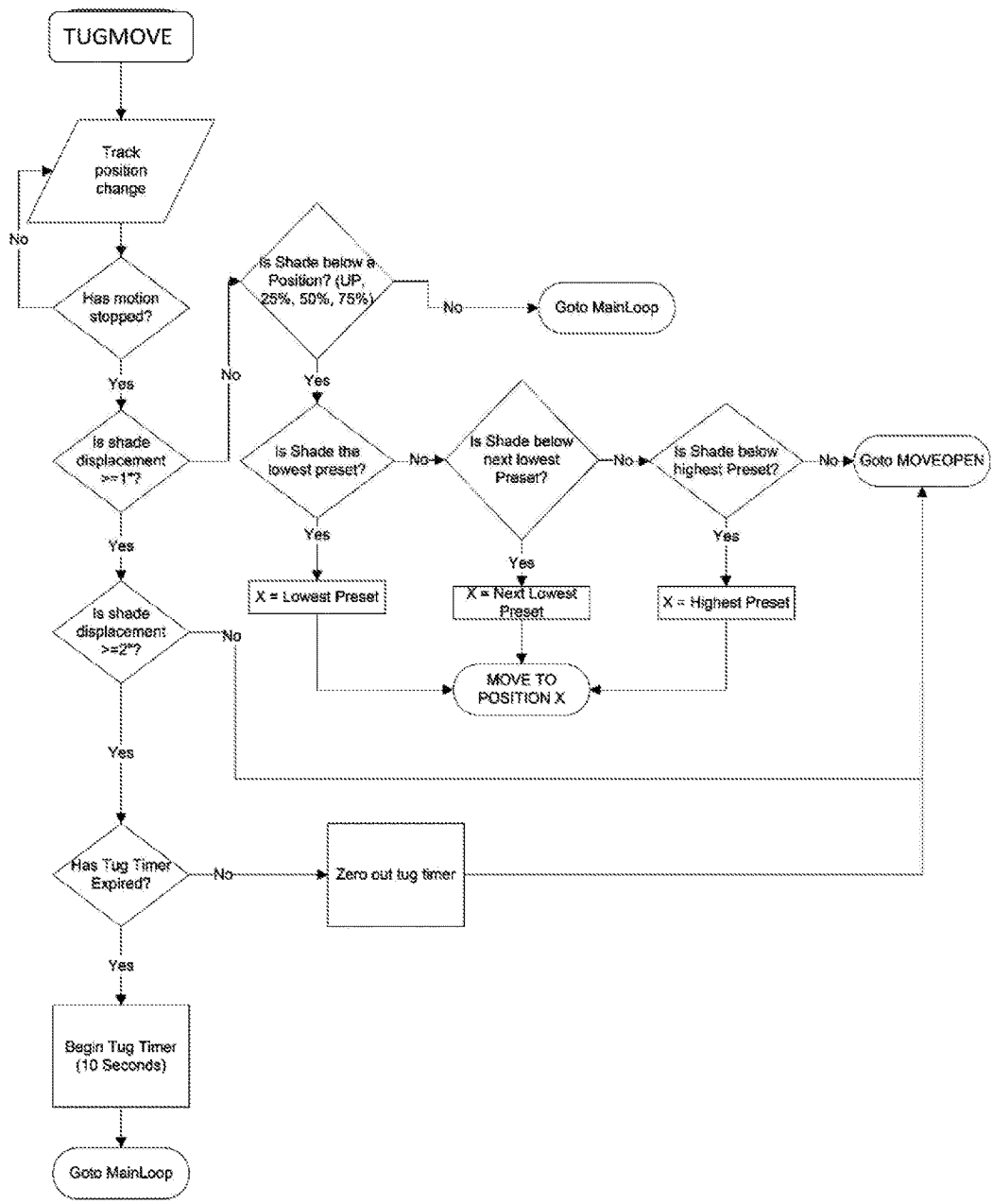
Figure 63D:
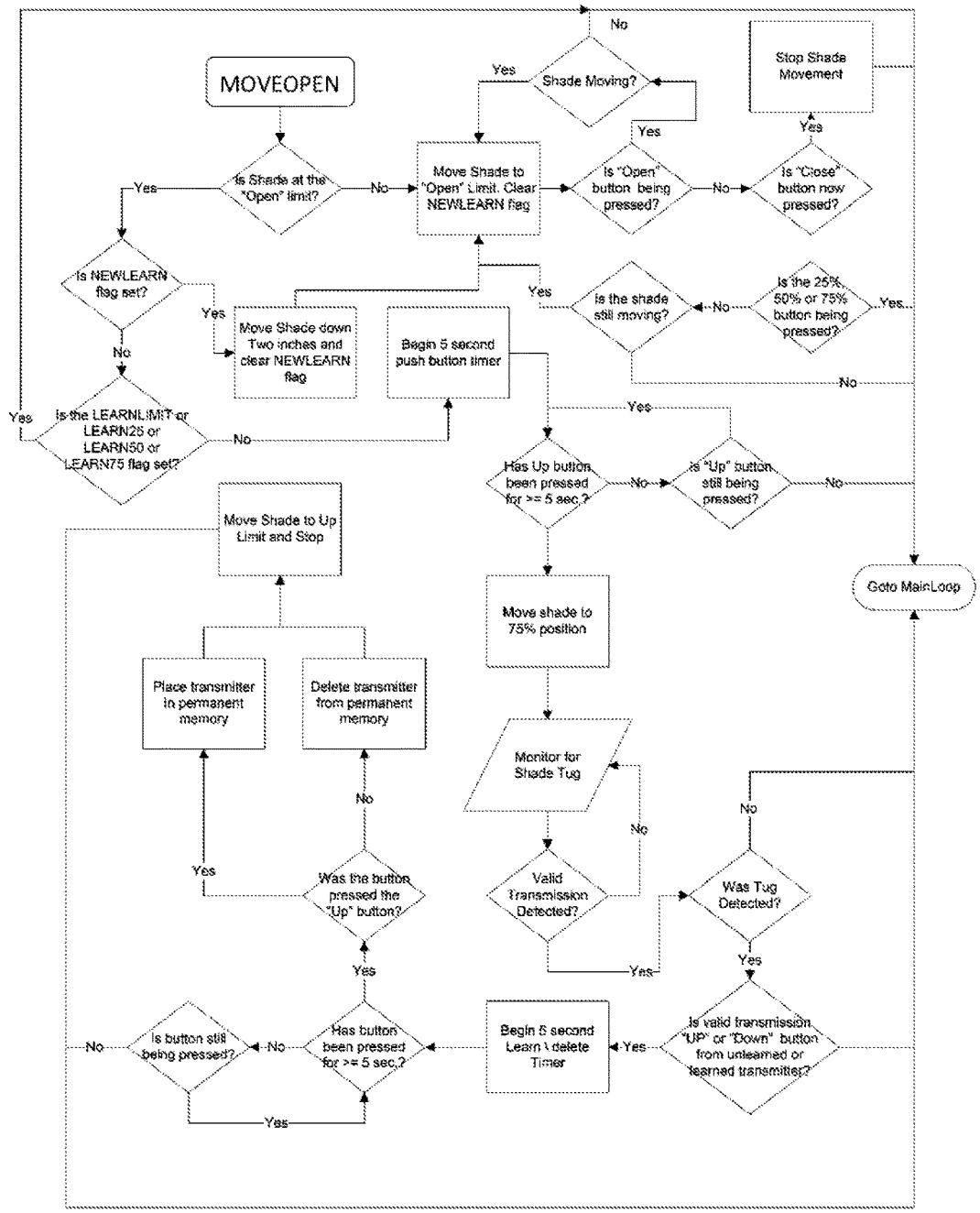
Figure 63E:
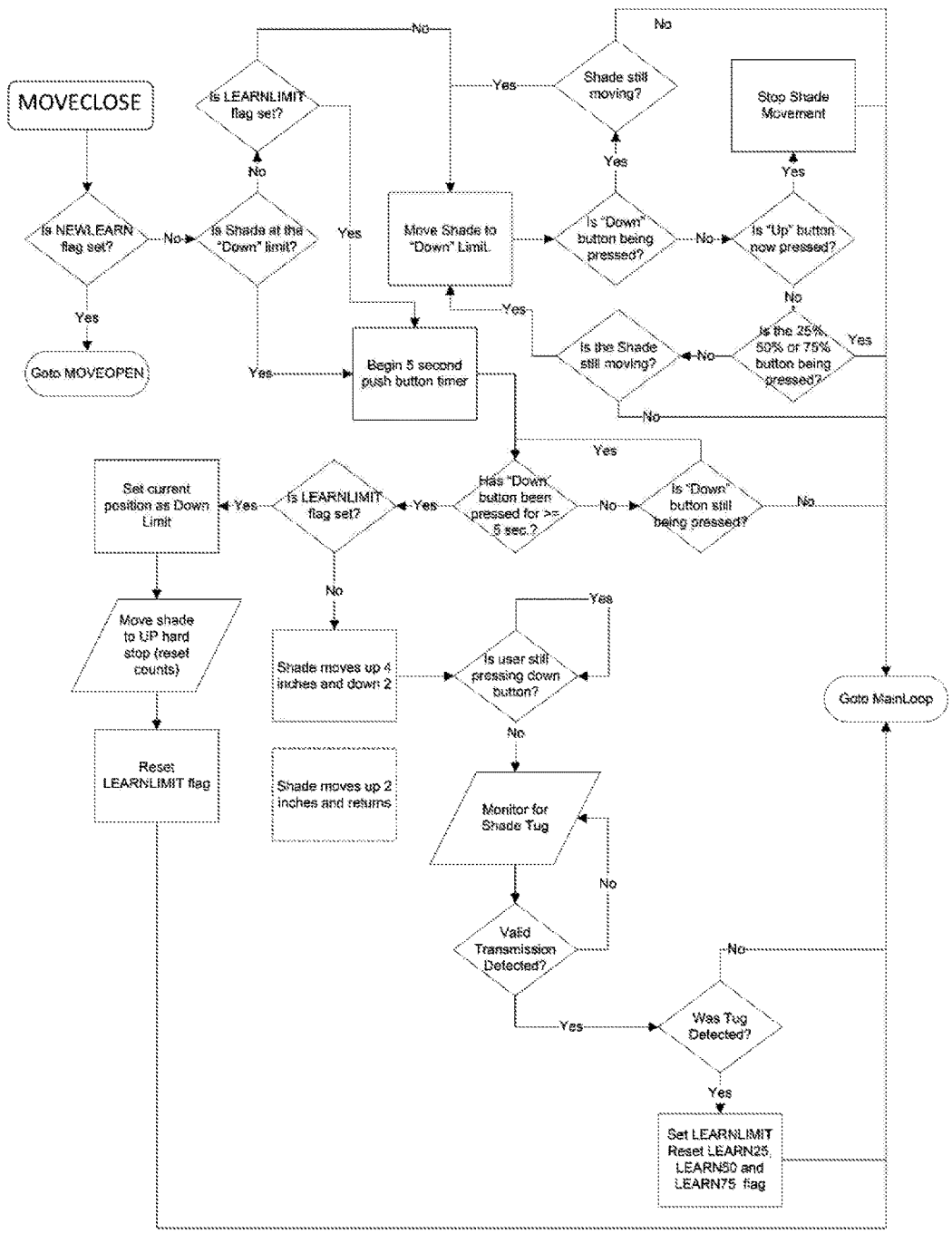
Figure 63F:
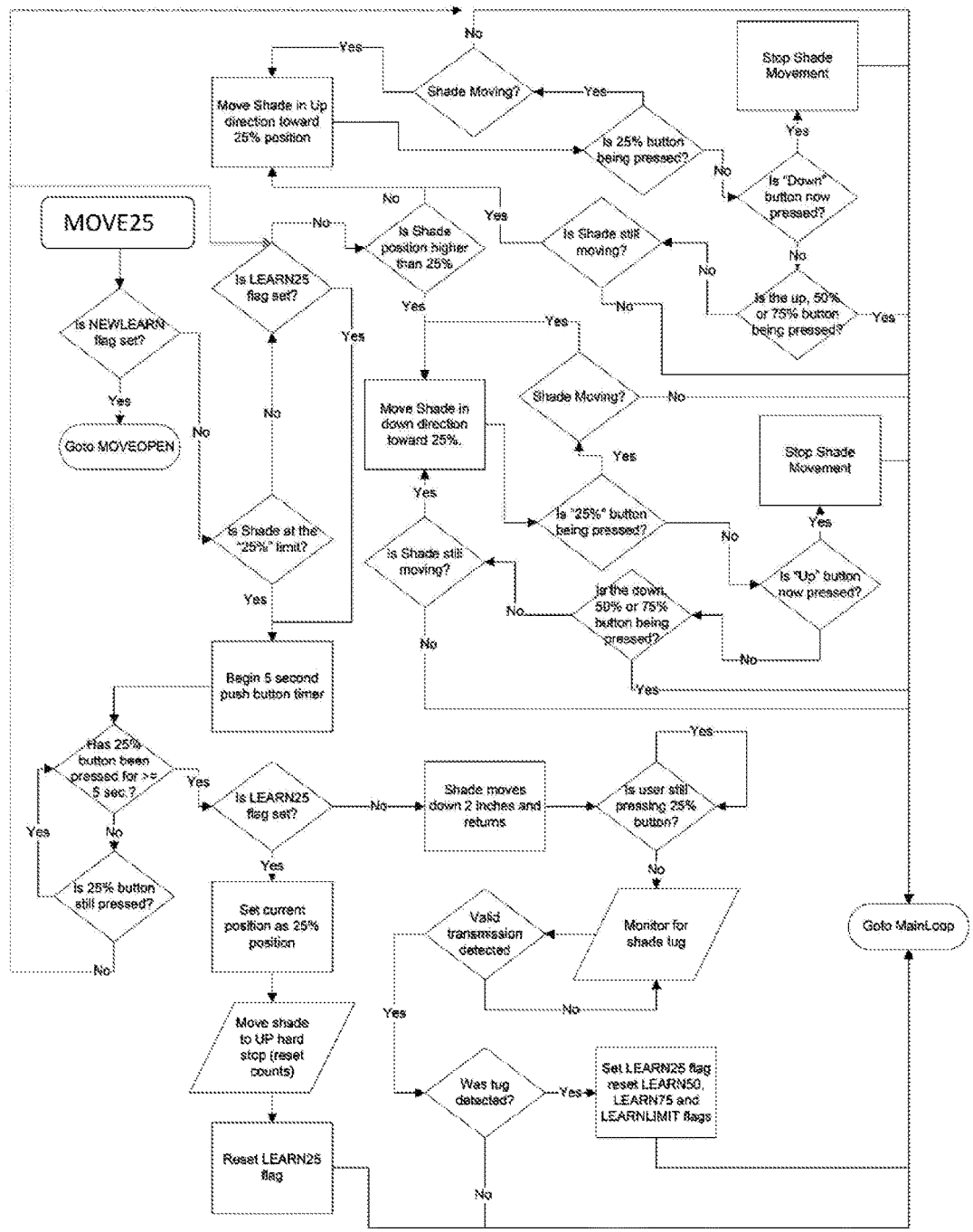
Figure 63G:
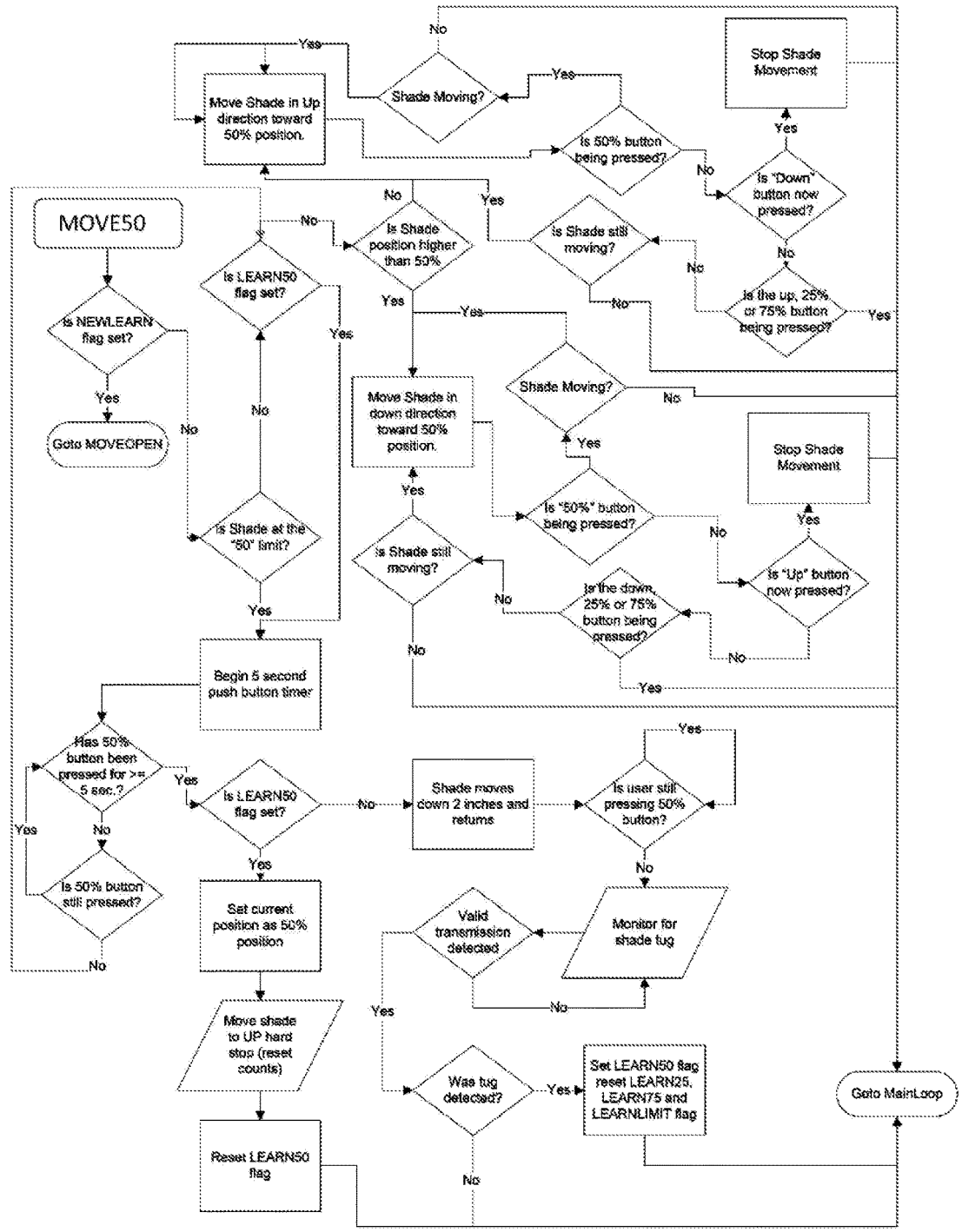
Figure 63H:
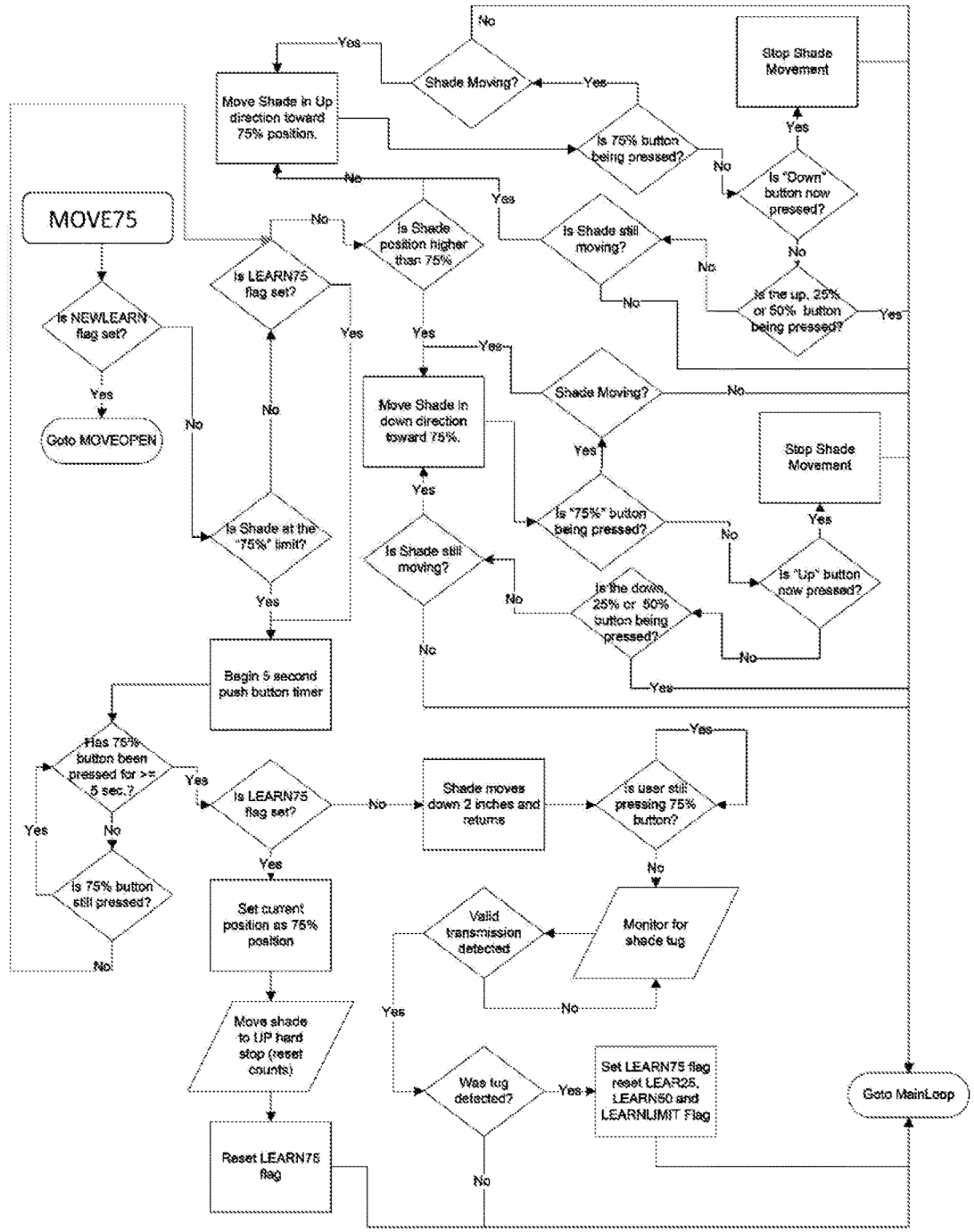
Figure 63I:
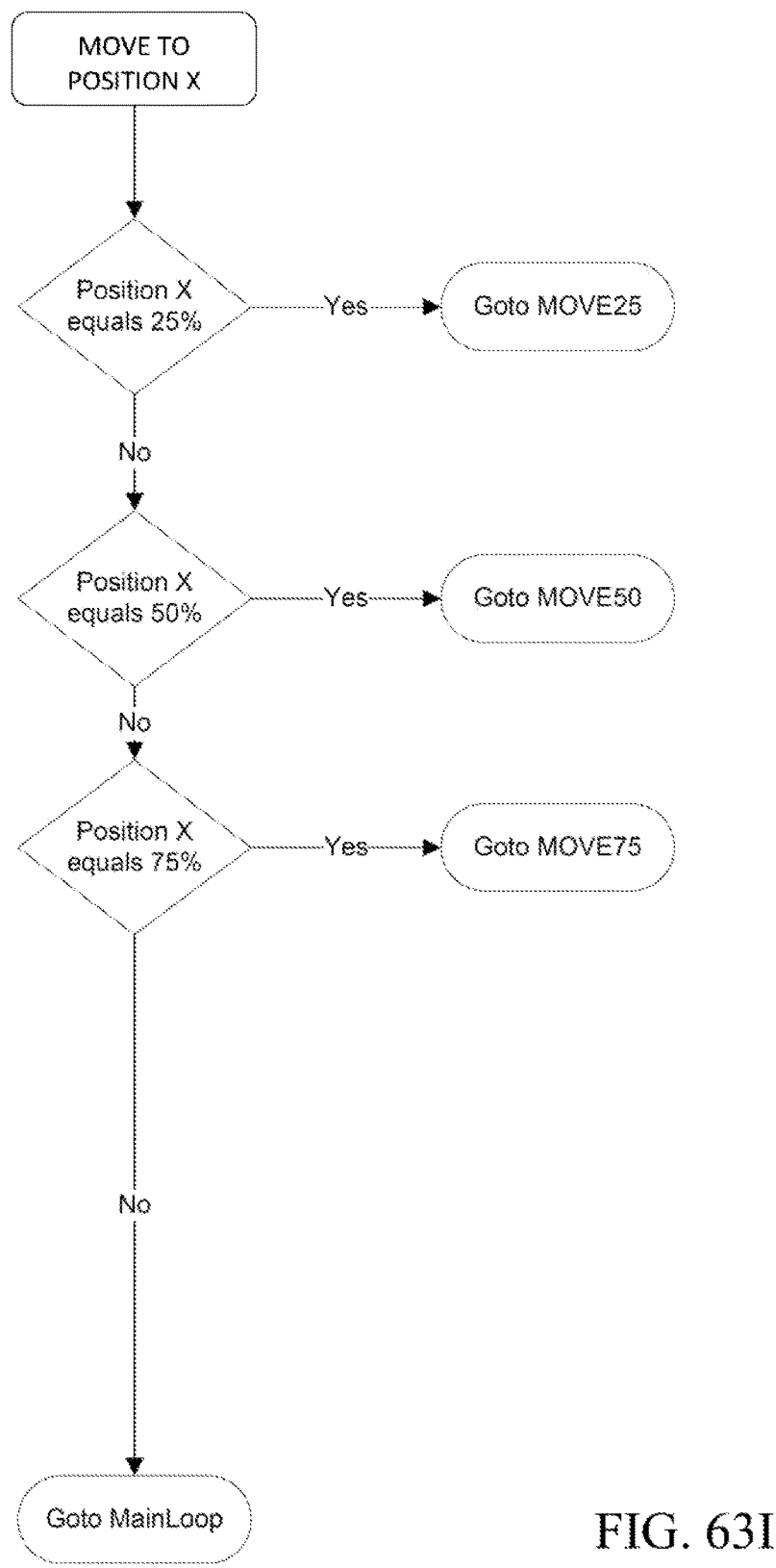
Figure 63J:
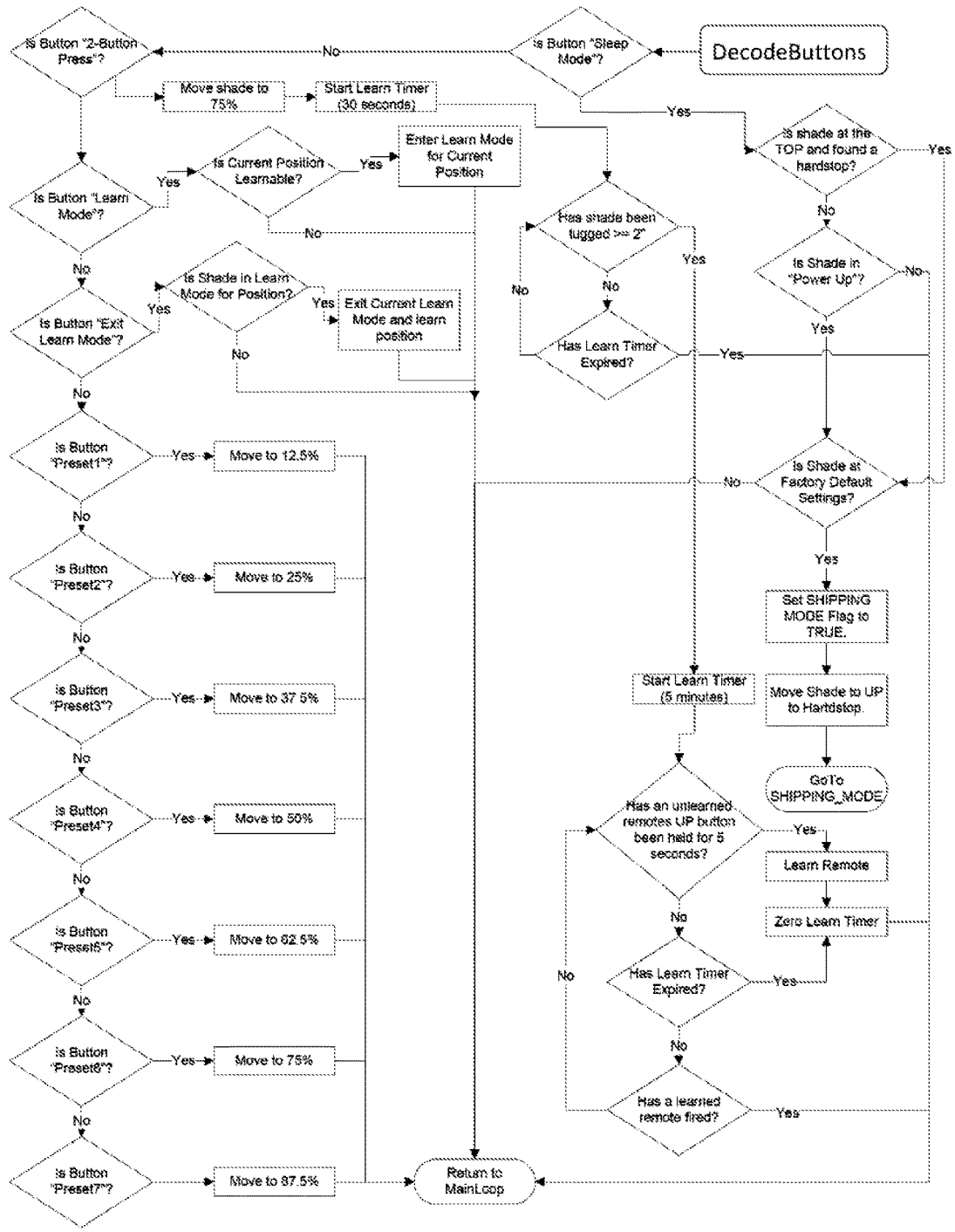
Figure 63K:
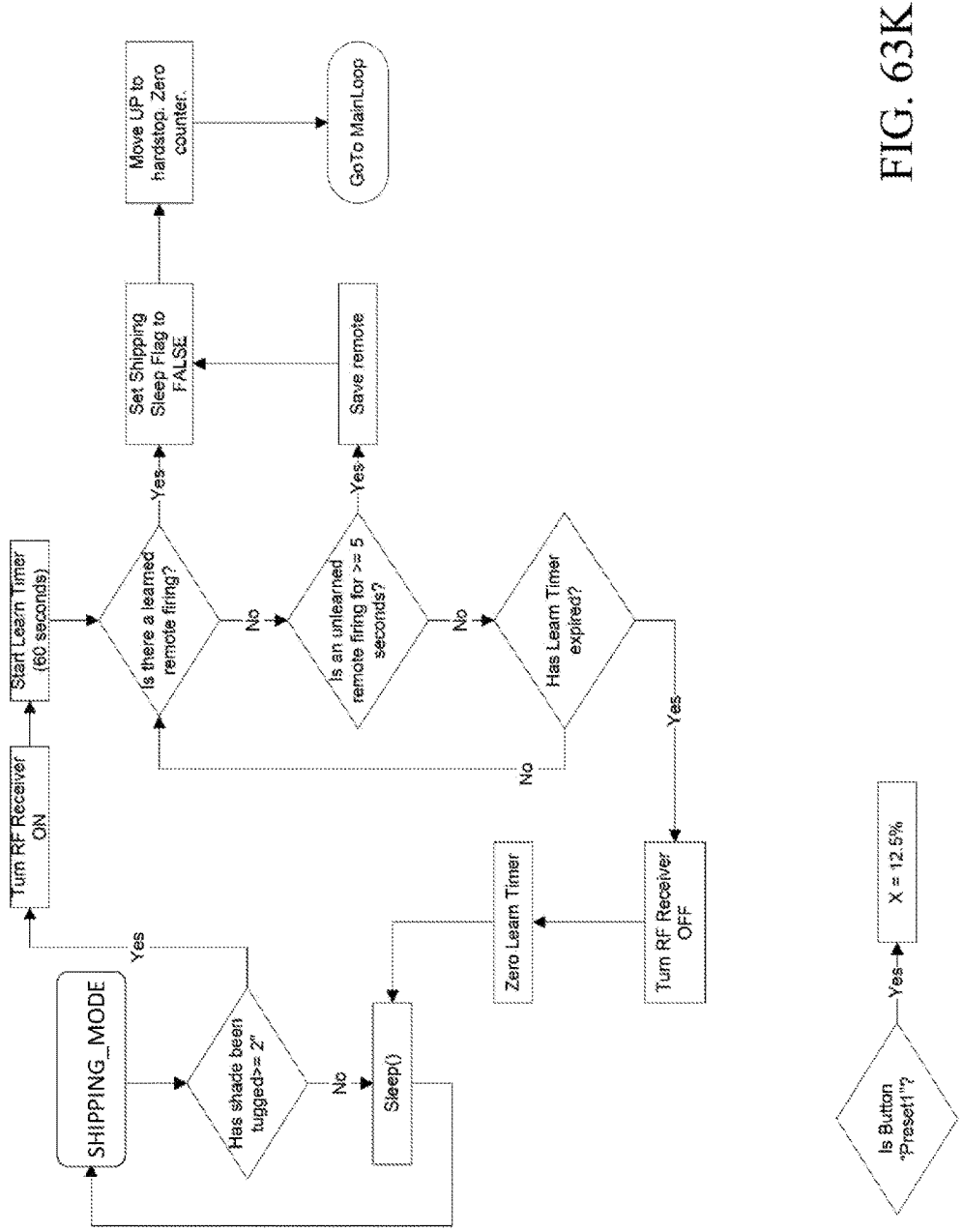
Figure 63L:
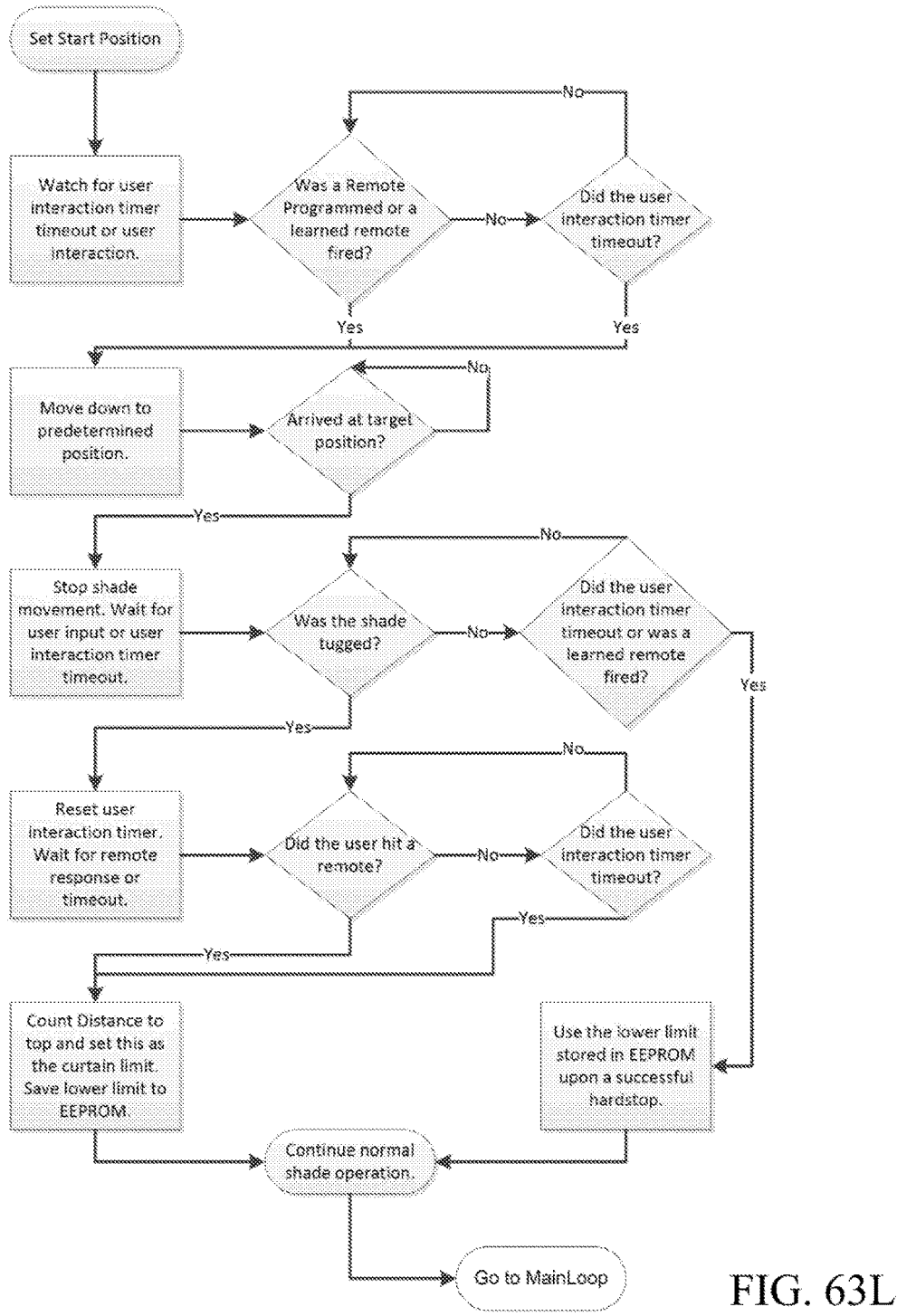

FIG. 62 shows four views of the inter-curtain engager.

FIGS. 63A-63L shows flowcharts for the control system for specific embodiments of the disclosure.

Figure 64:
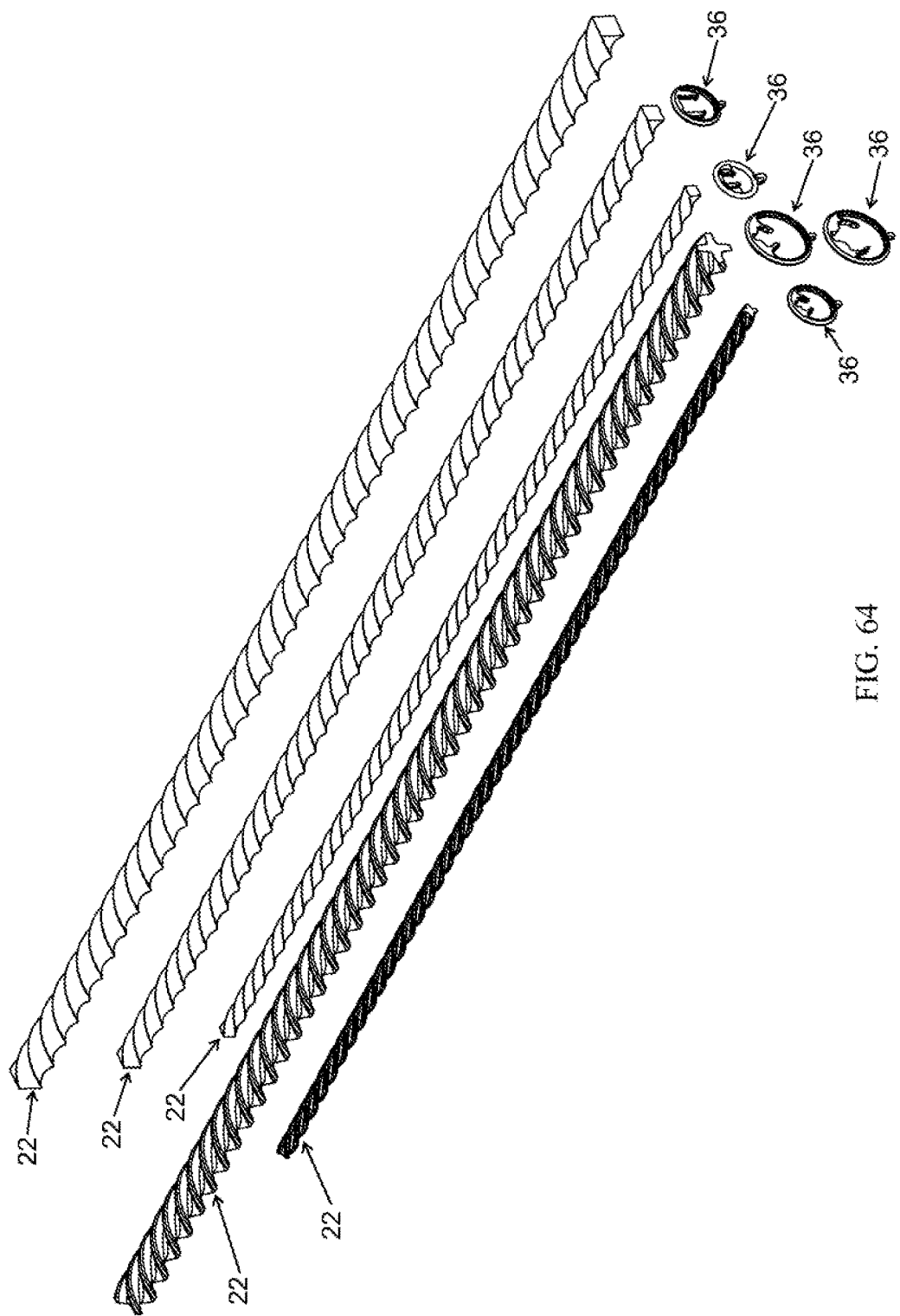

FIG. 64 is a perspective view of a plurality of drive elements having a continuous non-circular cross-sectional shape that extends the entire length of the drive element between opposing ends; the view shows the drive element is twisted in a single direction along the entire length of the drive element between opposing ends; the view shows three drive elements having a square or rectangular, four-sided, cross-sectional shape and two drive elements having a cross-shaped cross-sectional shape; the view also shows corresponding driver rings for each drive element; this arrangement provides a side-opening or side-closing drive element unless the drive element is connected at its center to an oppositely rotating drive element.

Figure 65:
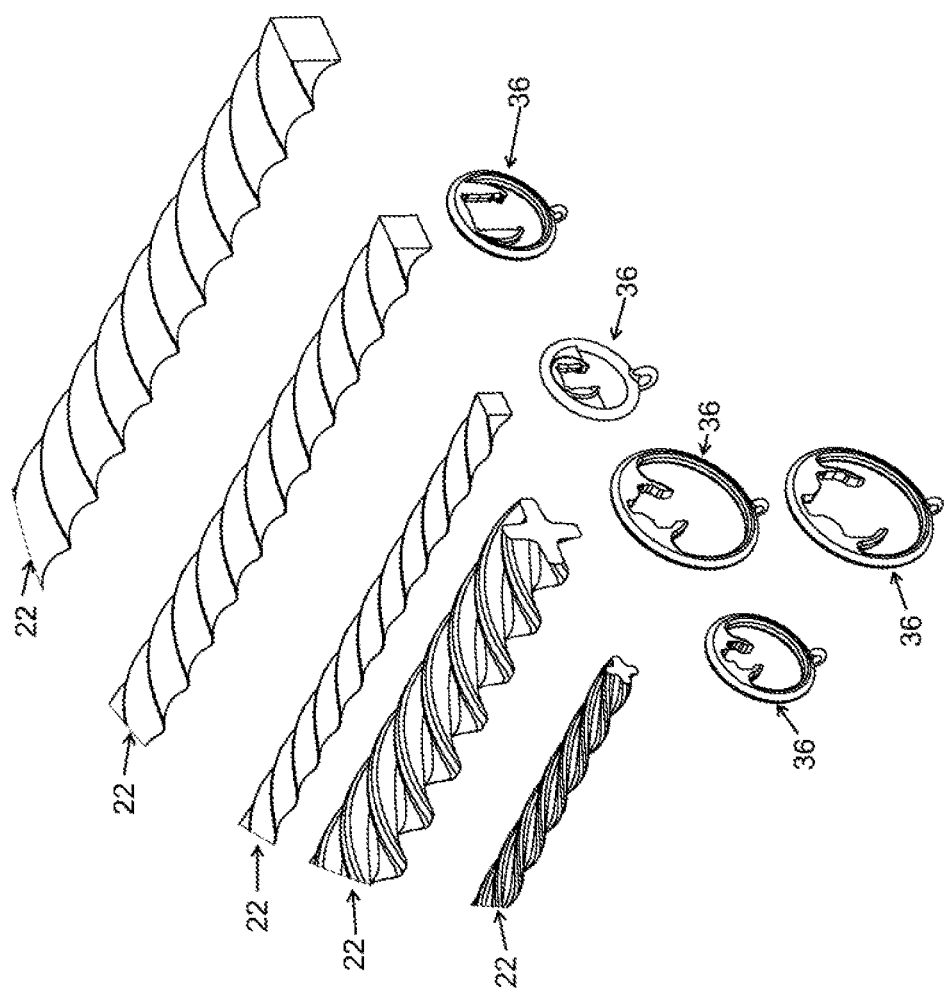

FIG. 65 is a close-up view of the view shown in FIG. 64, the view showing an end of the drive elements which shows the square or rectangular, four-sided, cross-sectional shape of three drive elements and the cross-shaped cross-sectional shape of two drive elements; the view showing the corresponding driver rings for each drive element in greater detail; this arrangement provides a side-opening or side-closing drive element unless the drive element is connected at its center to an oppositely rotating drive element.

Figure 66:
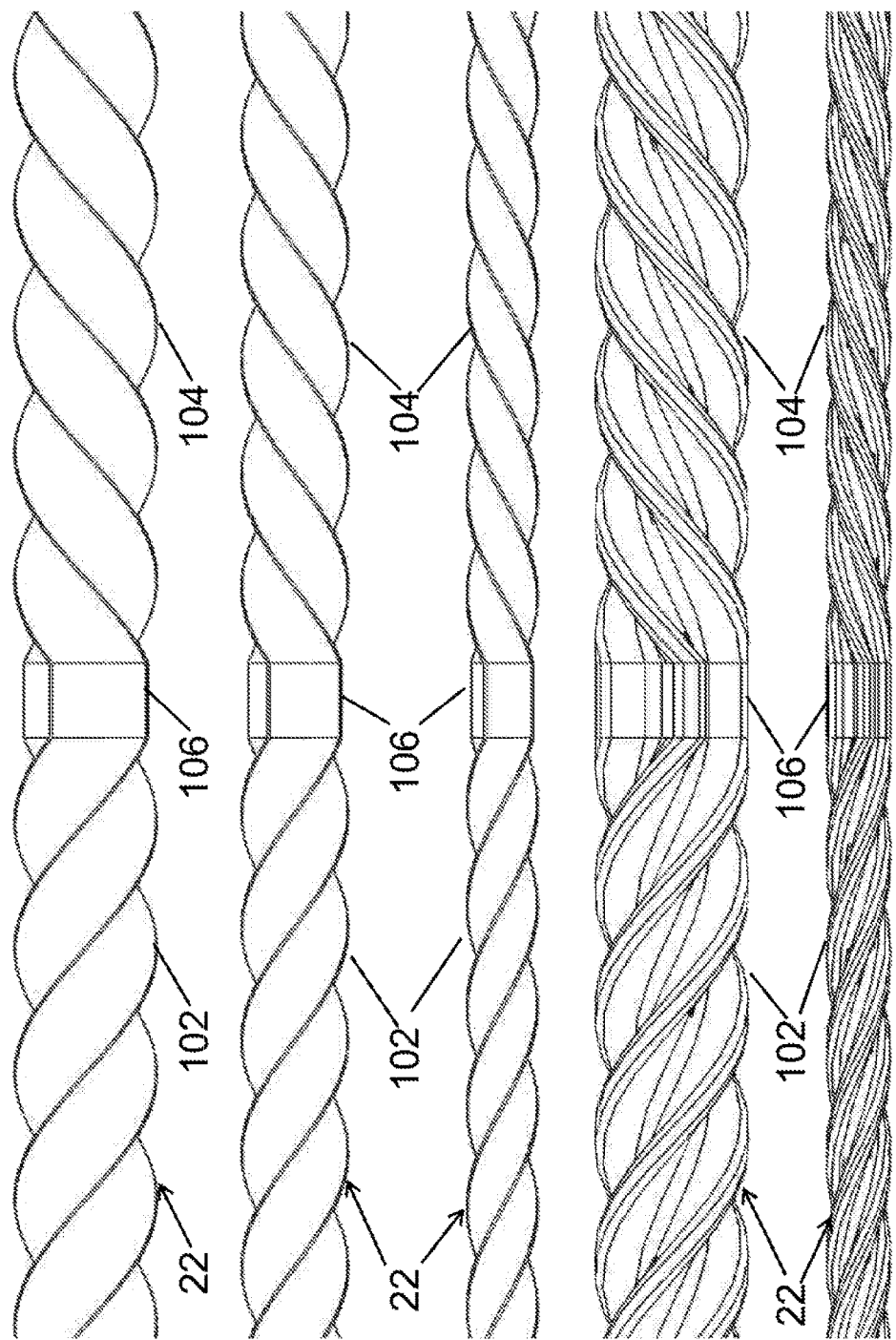

FIG. 66 is a side elevation view of the plurality of drive elements having a continuous non-circular cross-sectional shape that extends the entire length of the drive element between opposing ends; the view shows the drive elements having a first section, a second section and a center section, wherein the drive element is twisted in a first rotational direction in the first section, wherein the drive element is twisted in a second rotational direction in a second section, and wherein the drive element is not twisted in the center section and/or the drive element transitions from rotating in the first rotational direction to rotating in the second rotational direction in the second section at the center section; the view showing the top three drive elements having a square or rectangular, four-sided, cross-sectional shape and the bottom two drive elements having a cross-shaped cross-sectional shape; this arrangement provides a center-opening or center-closing drive element.

Figure 67:
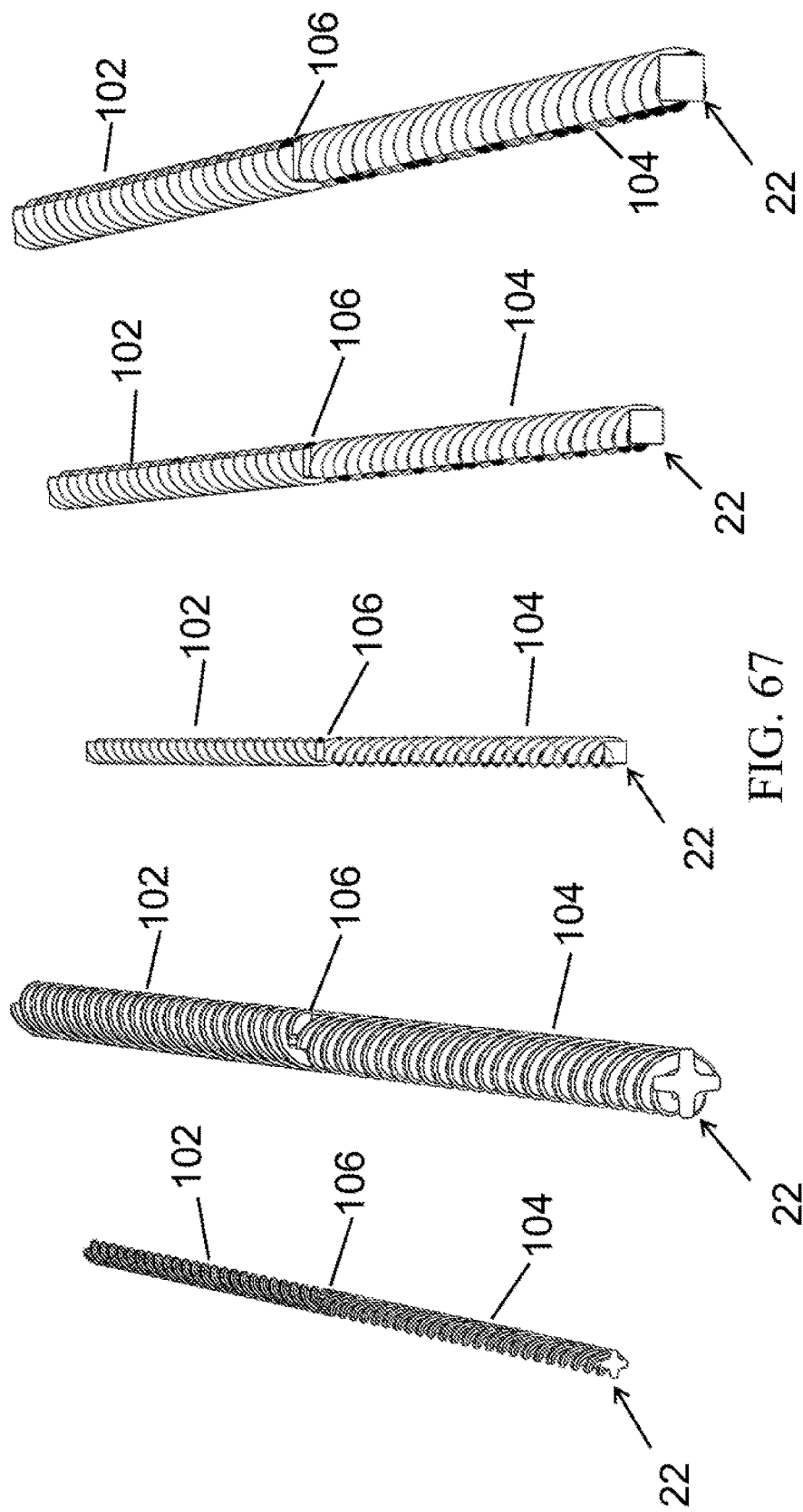

FIG. 67 is an end perspective view of the plurality of drive elements shown in FIG. 66, the view showing the drive elements having a continuous non-circular cross-sectional shape that extends the entire length of the drive element between opposing ends; the view shows the drive elements having a first section, a second section and a center section, wherein the drive element is twisted in a first rotational direction in the first section, wherein the drive element is twisted in a second rotational direction in a second section, and wherein the drive element is not twisted in the center section and/or the drive element transitions from rotating in the first rotational direction to rotating in the second rotational direction in the second section at the center section; the view showing the three drive elements to the right having a square or rectangular, four-sided, cross-sectional shape and two drive elements to the left having a cross-shaped cross-sectional shape; this arrangement provides a center-opening or center-closing drive element.

Figure 68:
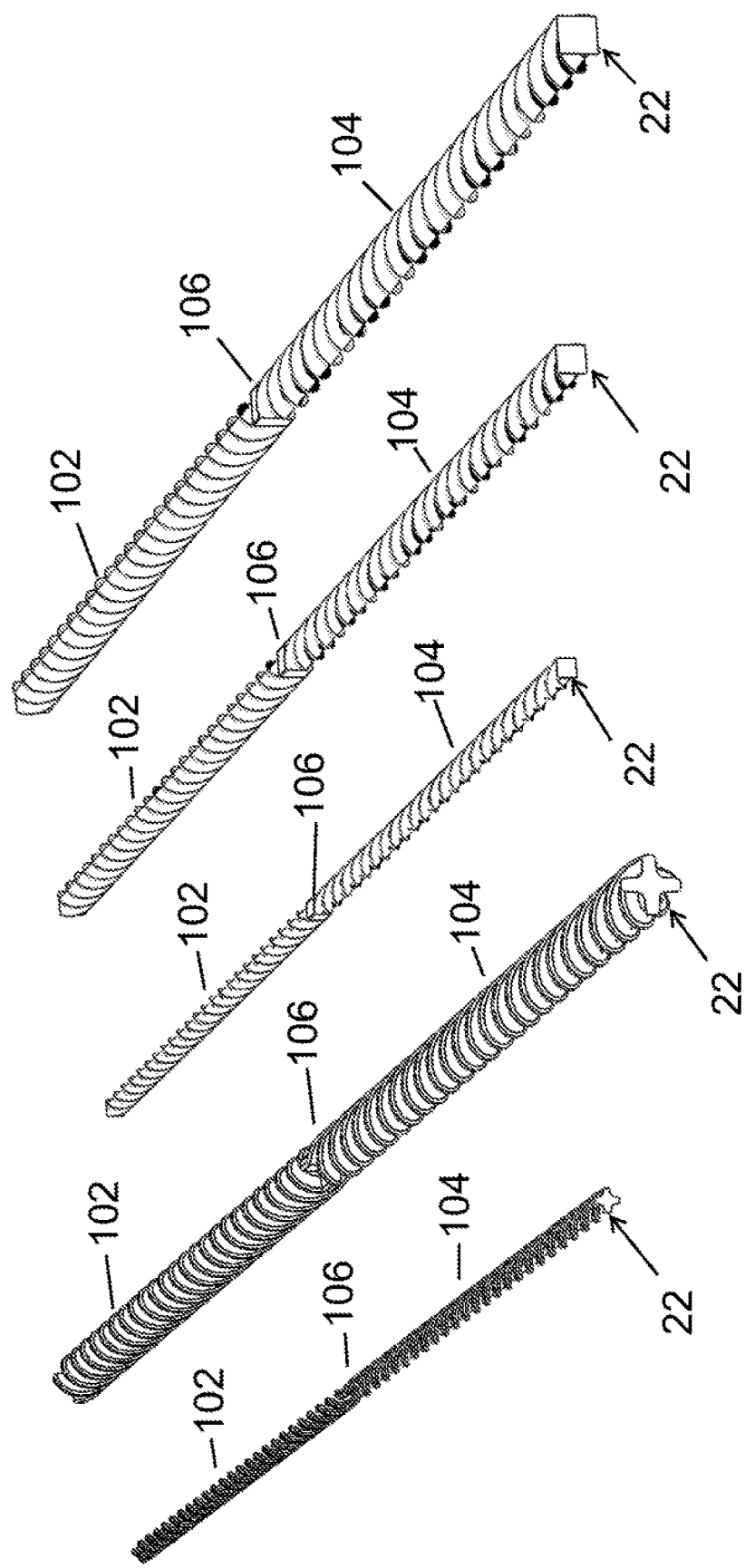

FIG. 68 is a perspective view of the plurality of drive elements shown in FIG. 66 and FIG. 67, the view showing the drive elements having a continuous non-circular cross-sectional shape that extends the entire length of the drive element between opposing ends; the view shows the drive elements having a first section, a second section and a center section, wherein the drive element is twisted in a first rotational direction in the first section, wherein the drive element is twisted in a second rotational direction in a second section, and wherein the drive element is not twisted in the center section and/or the drive element transitions from rotating in the first rotational direction to rotating in the second rotational direction in the second section at the center section; the view showing the three drive elements to the right having a square or rectangular, four-sided, cross-sectional shape and two drive elements to the left having a cross-shaped cross-sectional shape; this arrangement provides a center-opening or center-closing drive element.

Figure 69:
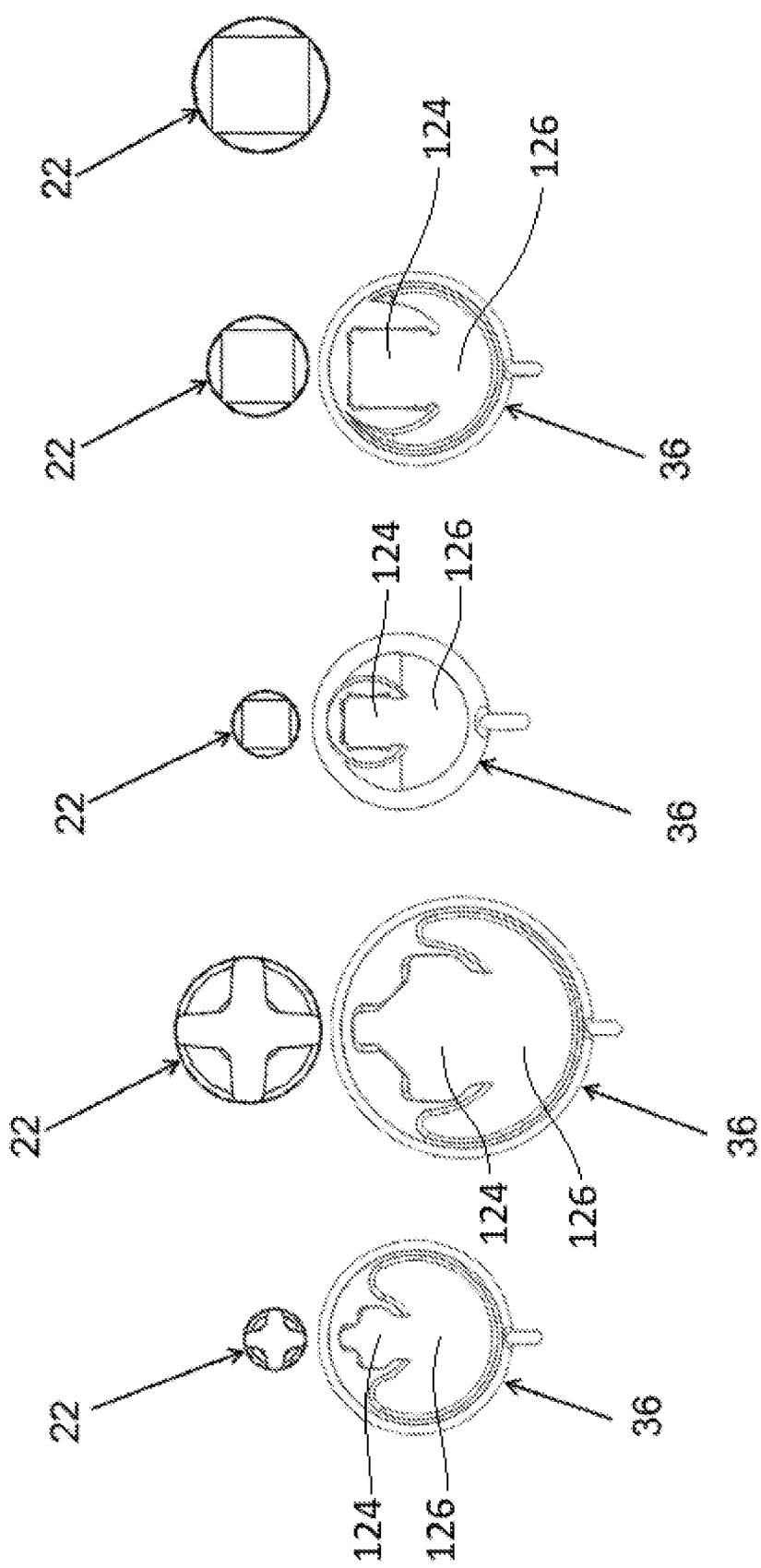

FIG. 69 is an end elevation view of the plurality of drive elements shown in FIGS. 66-68, the view showing the drive elements having a continuous non-circular cross-sectional shape that extends the entire length of the drive element between opposing ends; the view showing the three drive elements to the right having a square or rectangular, four-sided, cross-sectional shape and the two drive elements to the left having a cross-shaped cross-sectional shape; the view showing the corresponding driver rings for each drive element with the view showing the feature that is configured to engage the exterior surface of the drive element so as to facilitate lateral movement along the length of the drive element as the drive element is rotated; the view showing the drive elements positioned above the driver rings.

Figure 70:
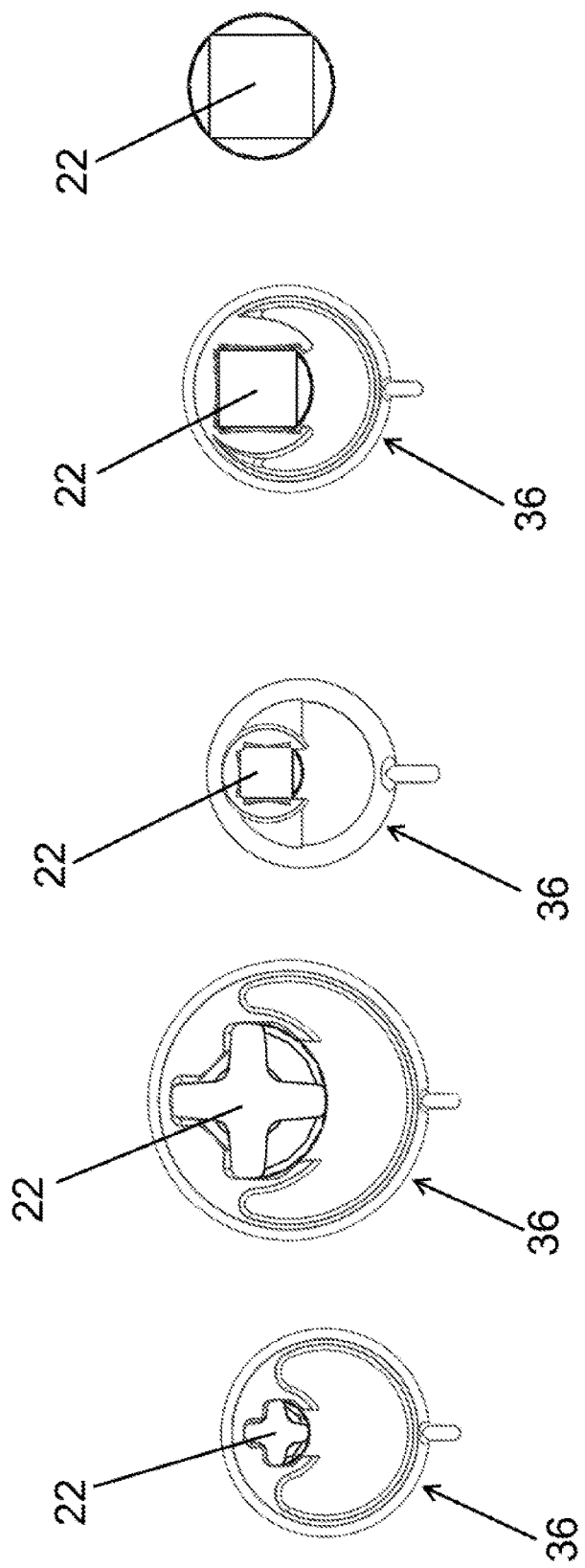

FIG. 70 is an end elevation view of the plurality of drive elements shown in FIGS. 66-69, the view showing the drive elements having a continuous non-circular cross-sectional shape that extends the entire length of the drive element between opposing ends; the view showing the three drive elements to the right having a square or rectangular, four-sided, cross-sectional shape and the two drive elements to the left having a cross-shaped cross-sectional shape; the view showing the corresponding driver rings for each drive element with the view showing the feature that is configured to engage the exterior surface of the drive element so as to facilitate lateral movement along the length of the drive element as the drive element is rotated; the view showing the drive elements positioned within the feature of the driver rings.

FIG. 71 is a close up elevation view of a drive element of FIG. 69.

DETAILED DESCRIPTION

Figure 1:
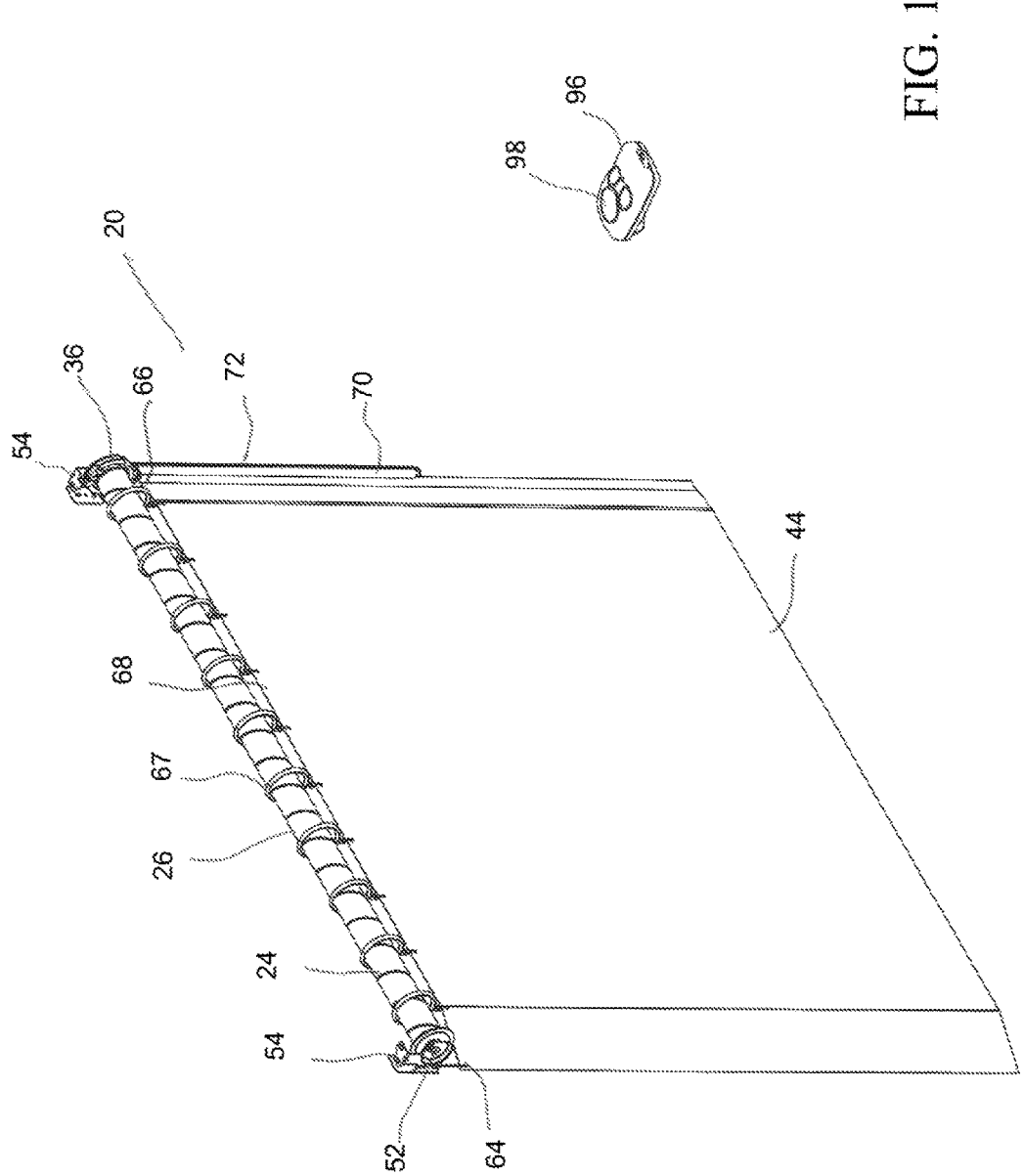
FIG. 1 is a perspective view of one embodiment of the curtain assembly showing a curtain in the deployed position and the window is covered.
Figure 2:
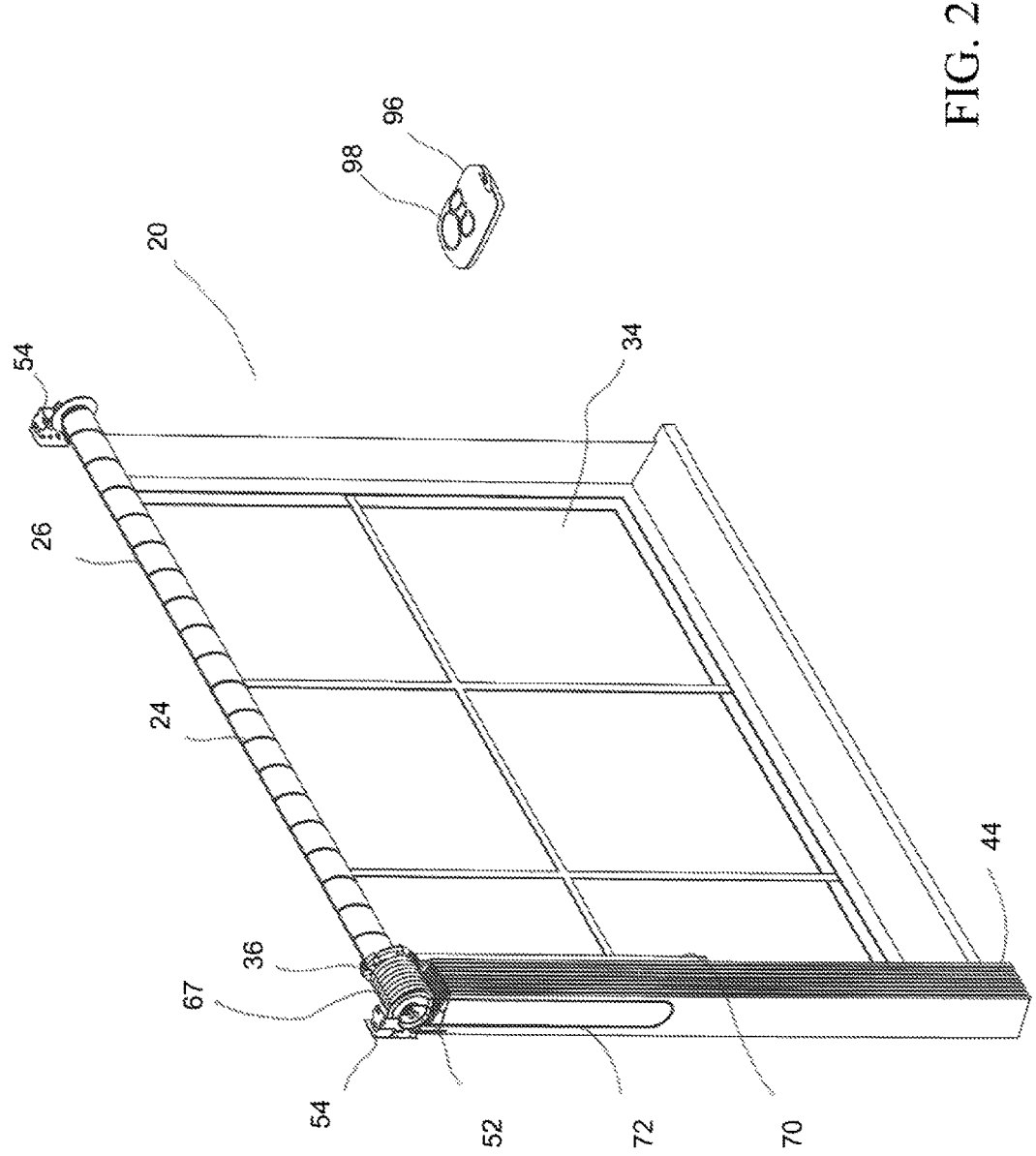
FIG. 2 is a perspective view of one embodiment of the curtain assembly showing the curtain in the stored position and the window is not covered.
Figure 3:
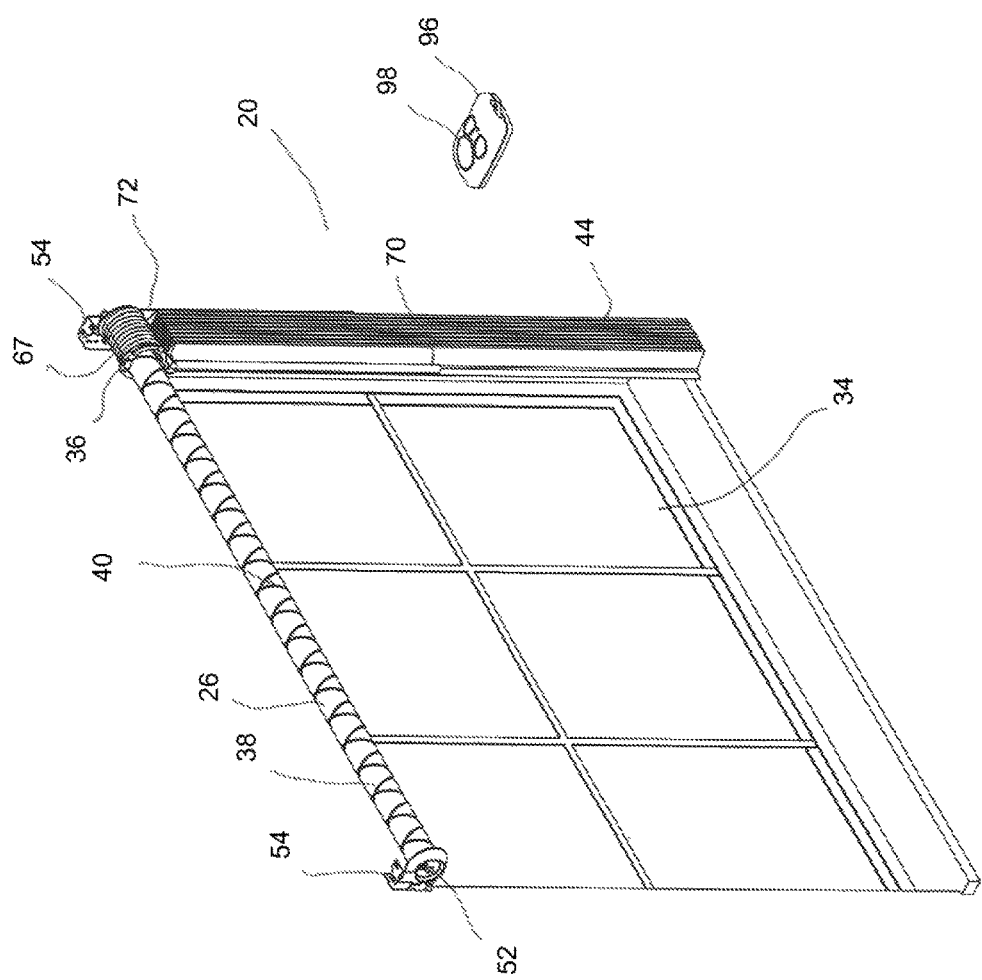
FIG. 3 is a perspective view of one embodiment of the curtain assembly showing a left hand curtain in the stored position.

Referring to FIG. 1, a curtain assembly 20 according to one embodiment of the disclosure is shown. The curtain assembly 20 comprises a rotatable drive element 22 wherein a helical guide structure 24 is formed into the outer surface 26 of the drive element 22, a drive attachment element 36 having a corresponding structure 62 that communicates with the helical guide structure 24 to move the drive attachment element 36 axially along the drive element 22 when the drive element 22 is rotated and a rotation assembly 32 (not shown) for rotating the drive element 22. In some embodiments of the disclosure, the helical guide structure 24 is a helical groove 24 and the corresponding structure 62 is a tooth. While the helical guide structure 24 is shown in FIGS. 1-3 as a helical groove, the helical guide structure 24 is not limited to a groove. Similarly, the corresponding structure 36 discussed in the embodiments below is a tooth 62 but is not limited to being a tooth. In some embodiments, one or more curtain supports 67 supported by the rotatable drive element 22 can also be utilized to support the curtain. The drive attachment element 36, as shown in FIGS. 1-3 will be explained further below.

Description of Curtains:

As shown in FIG. 1, the curtain 44 used is composed of a single continuous panel of fabric that moves back and forth across the drive element 22 to the deployed position (covering the window) and to the stored position (not covering the window 34). The curtain 44 may extend to the right to the deployed position (covering the window 34) and then gather to the left to the stored position, uncovering the window 34. This is shown in FIGS. 1 and 2. For example, FIG. 1 shows that a curtain 44 extended to the right (deployed position) to cover the window 34 and FIG. 2 shows the curtain 44 gathered to the left (stored position) to uncover the window 34. In other embodiments, the curtain 44 may extend to the left to the deployed position (covering the window 34) and then gather to the right to the stored position (uncovering the window 34). For example, FIG. 3 shows a curtain assembly 20 wherein the curtain 44 is gathered to the right (stored position) to uncover the window 34. Although not shown, the curtain 44 in FIG. 3 would extend to the left to the deployed position to cover the window 34.

Again, although curtain is used to describe a preferred embodiment of the disclosure, other embodiments utilize other window coverings, such as verticals and draperies.

Figure 4:
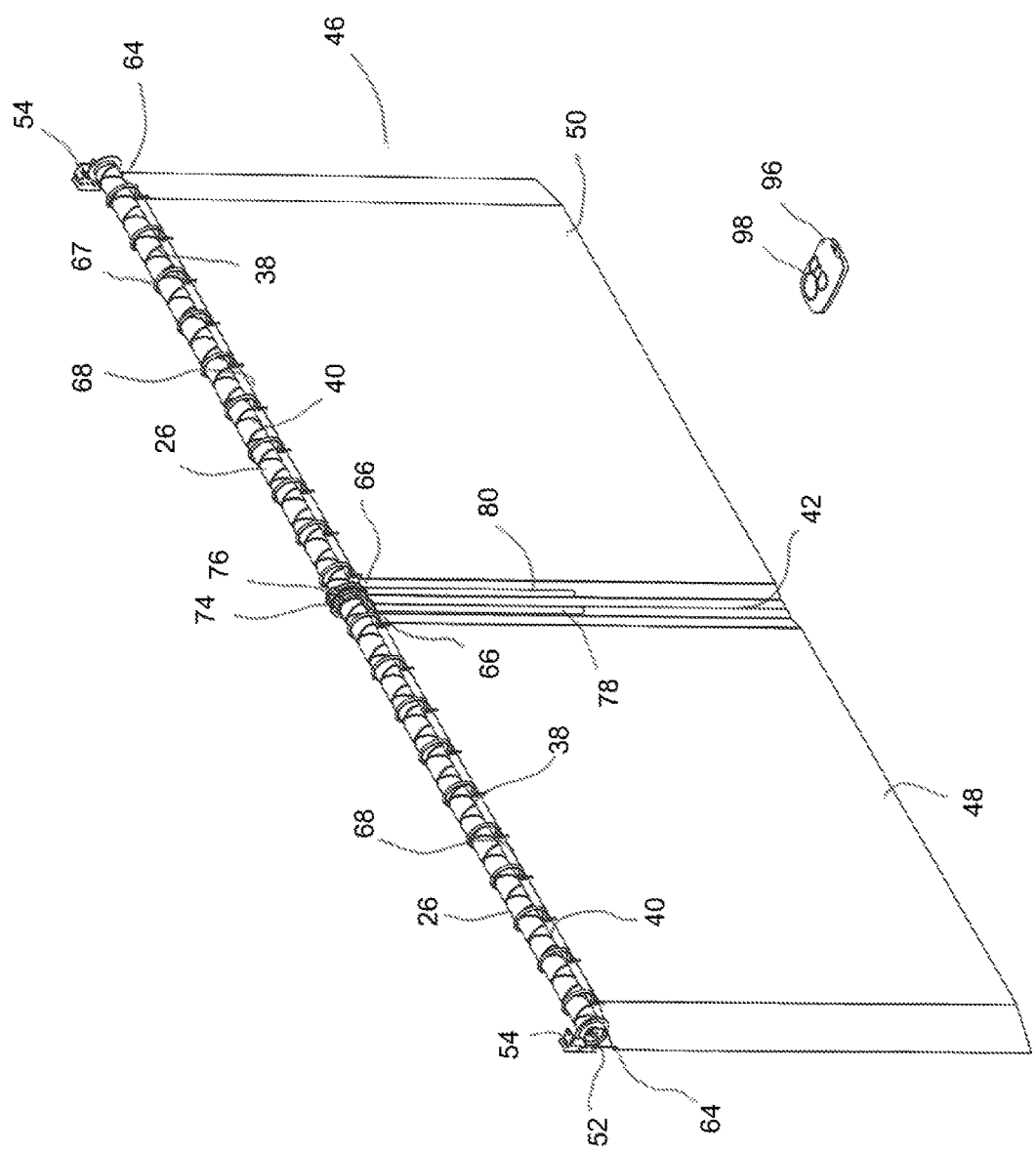
FIG. 4 is an enlarged perspective view of one embodiment of the curtain assembly showing a center closing curtain in the deployed position covering the window.

In some embodiments, the curtain 44 may be a center closing curtain 46. A center closing curtain 46 is composed of two fabric panels, a right panel 50 and a left panel 48 that meet in the center 42 of the window 34 to close and cover the window 34. FIG. 4 shows a curtain assembly 20 where a center closing curtain 46 is used and is in the deployed position. The window 34 is covered in this instance. For example, the right panel 50 extends to the left to the center of the window 42. The left panel 48 extends to the right to the center of the window 42.

Figure 5:
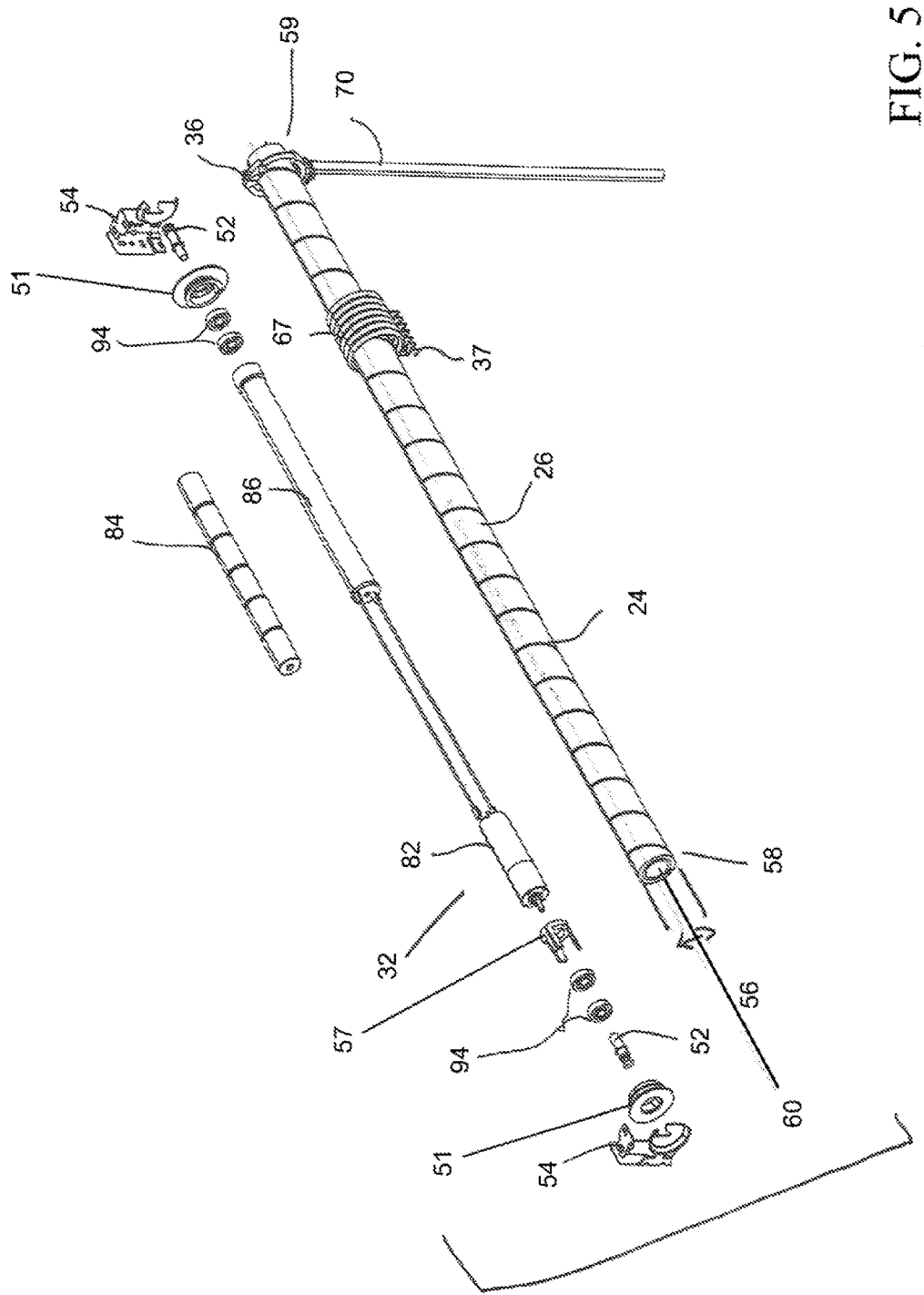
FIG. 5 is an enlarged perspective view of the components of the rotatable drive element according to one embodiment of the curtain assembly in which the rotation of the drive element is powered by a battery operated motor.

Drive Element:

The curtain assembly 20 includes a drive element 22. FIGS. 5 and 6 show one embodiment of the drive element 22 in detail. A curtain 44 can be connected to the drive element 22 by one or more curtain supports 36 and 67 as explained below. Alternatively, at least a portion of the curtain can be supported by another structure adjacent to the rotatable drive element 22, such as a support guide (not shown).

The rotatable drive element 22 is designed to be installed above a window 34, or near the top of the window 34, similar to a traditional curtain rod. For example, as shown in FIG. 1, drive element 22 is mounted on axles 52 that are located and secured in the end brackets 54. The end brackets 54 are adapted for connection with, for example, a window frame, sash, or wall. The end brackets 54 may also include a rubber mounting disk 13, not shown, that is compressed, and, optionally, inserted into a finial 95 or other structure to create friction, when the drive element 22 is installed, to hold the drive element 22 firmly in place and minimize noise.

The drive element 22 may vary in size. For example, the drive element 22 may be the width of the window 34, narrower than the window 34, or wider than the window 34. The outer diameter 56 of the drive element 22 may similarly vary. In specific embodiments, the drive element has an outer diameter of the drive element that is 1 inch, 1¼ inches, 1½ inches, 2 inches, 1-2 inches, 1-1½ inches, 1½-2 inches, less than 1 inch, and/or greater than 2 inches. In some embodiments, the drive element 22 has a hollow portion that is sized to mount a motor 82 inside the hollow portion of the drive element 22 rather than mounting the motor 82 outside the drive element 22. Using the inside of the drive element 22 to conceal the motor 82 may give a more aesthetically pleasing design for a curtain assembly 20. Any number of materials, such as aluminum, other metals or alloys, plastics, wood. and ceramics, may be used to fabricate the drive element 22 provided the drive element 22 can support the weight of the curtain 44.

Although the FIGS. 5 and 6 show the outer surface of the drive element 22 as cylindrical in shape, the cross-sectional shape of the drive element 22 is not limited and may be non-circular. In an alternative embodiment, as shown in FIGS. 20 and 21, the rotatable drive element 22 may be tri-lobed.

Guide Structure:

The drive element 22 has at least one guide structure 24 formed, for example, on, or into, the outer surface 26 of the drive element 22. For convenience, as a preferred embodiment employs a one or more helical guide structure, it is understood that descriptions of embodiments of the disclosure having helical guide structures also applies to embodiments having guide structures with other patterns. A preferred guide structure 24 is a helical guide structure 24. Such a guide structure may be a groove in some embodiments, as shown in FIGS. 7-9. The helical guide structure 24, however, is not limited to being a helical groove. For example, the guide structure 24 may be a ridge, protrusion, or other structure that can communicate with the corresponding structure of the drive attachment element to axially move the drive attachment element along the drive element when the drive element is rotated.

The helical groove 24 can extend along a portion of, or the entirety of, the drive element 22. In a preferred embodiment, the helical groove extends from one distal end portion, referred to as the motor end 58, to the opposing distal end portion, referred to as the bearings end 59, of the drive element 22. Alternatively, the helical guide structure 24 can begin and end at any desired point along the longitudinal axis of the drive element 22, and/or stop and start over various portions of the drive element, depending on the application. The length of the helical groove 24 is a factor in determining how far a curtain 44 will travel across the drive element, i.e., the entire length of the drive element 22 as opposed to some shorter section of the drive element 22. The angle of the helical groove determines how far the drive attachment element will move along the drive element for a given amount of rotation of the drive element.

In an embodiment, the helical groove 24 is formed in either a clockwise direction or a counterclockwise direction. FIG. 7 illustrates a drive element 22 having a counterclockwise helical groove 38. FIG. 8 illustrates a drive element 22 having a clockwise helical groove 40.

In one embodiment, the drive element 22 has two helical grooves 24, one formed in the clockwise direction and one formed in the counterclockwise direction. FIG. 9 illustrates a drive element 22 in which there are a counter clockwise helical groove 38 and a clockwise helical groove 40. In yet other embodiments, the drive element 22 may have four helical grooves, two clockwise helical grooves 38 and two counter clockwise helical grooves 40 as shown in FIGS. 22-24.

When two clockwise helical grooves 38 or two counterclockwise helical grooves 40 are utilized, the two clockwise helical grooves 38, or the two counter-clockwise helical grooves 40 are preferably spaced approximately 180 degrees apart. Other spacings can also be utilized. The clockwise helical grooves 38 and the counterclockwise helical grooves 40 preferably form the same angle with the longitudinal axis. The profile of the helical grooves 38, 40 can be self-centering to allow the drive tooth 62 to traverse the intersection of the clockwise helical groove 38 and the counter clockwise helical groove 40 without binding. A beveled groove, which allows such self-centering, is shown in FIG. 17.

The helical grooves 24 may be formed by forming grooves into the outer surface 26 of the drive element 22 such that the grooves 24 are recessed from the outer surface 26 of the drive element 22. Alternatively, the helical guide structures 24 may be formed as one or more protrusions that project or bulge from the outer surface 26 of the drive element 22. The protrusions may be formed in a variety of manners, for example, by winding material around the outer surface 26 of the drive element 22, forming, e.g., extruding the drive element in a manner that creates indentations in and/or projections from the outer surface of the drive element, or forming the drive element so as to have an outer surface able to apply a force in the longitudinal direction to a structure 62 of the corresponding drive attachment element 36 when the corresponding structure is engaged with the structure 24 upon rotation of the drive element about the longitudinal axis.

In an alternative embodiment, a sleeve, or outer tube 63, having helical guide structure 24 and sized to fit around a portion of the drive element 22 may be used. In this case, the drive sleeve has at least one helical groove 24 in a clockwise or counter clockwise direction formed on the outer surface of the sleeve. The sleeve/outer tube can be interconnected to an inner tube 61, or other inner drive element 9 (e.g., rod), that is rotated so as to cause the rotation of the sleeve/outer tube. The inner drive element 9 can provide sufficient stiffness to keep the sleeve from bending too much along the longitudinal axis of the sleeve from the weight of the curtains, so that the sleeve need not be sufficiently stiff to keep from bending too much along the longitudinal axis of the sleeve from the weight of the curtains. The drive element 22, which then comprises the inner drive element 9 and the outer tube or sleeve, again translates the torque from the rotation assembly to axially movement of the curtain support 67 or drive attachment element 36 across the drive element 22. In an embodiment, the drive sleeve is secured to the inner drive element to form the drive element 22 such that the sleeve does not slide up or down the inner drive element or rotate around the inner drive element 9. It may also be desired to remove the sleeve from the inner drive element 9 and replace it with another sleeve. Using a drive sleeve has the advantage that the geometry of the helical groove 24 including its length may be easily changed by removing the sleeve and replacing it without fabricating a new drive element 22.

The helical grooves 24 may also vary in angle and therefore, may differ in the amount of time (rotations of the drive element) that it takes to travel across the drive element 22. For example, a helical groove 24 with a larger angle, with respect to a plane through a cross-section of the drive element, may create a shorter path for the structure to travel and lead to a faster moving curtain 44 for a certain rotation speed of the drive element. In some embodiments, the angle of the helical grooves 24, with respect to a cross-sectional plane of the drive element, may vary along the drive element in the direction of the longitudinal axis 60 of the drive element 22 such that the curtain 44 may move at different speeds along the drive element 22, for a given rotational speed of the drive element, if desired. The angle of the helical groove 24, with respect to a cross-sectional plane of the drive element, varies from greater than 0 degrees and less than 90 degrees, preferably varies from 10 degrees to 80 degrees, more preferably varies from 20 degrees to 70 degrees, even more preferably varies from 30 degrees to 60 degrees, and is most preferably 45 degrees.

Rotation Assembly:

The drive element 22 can be connected to a rotation assembly 33 for rotating the drive element 22, where the rotation of the drive element 22 moves the drive attachment element 36 along the drive element via the helical groove 24 of the drive element 22.

The rotation assembly 33 may be a pull cord 72 connected to the drive element 22 or a motor assembly 32. The drive element 22 may be rotated manually. For example, a pull cord 72 as shown in FIGS. 1-3 may be connected to the drive element 22 such that the drive element 22 can be manipulated manually to rotate when it is desired to deploy or store the curtain 44. The use of pull cords 72 is well known in the art.

A motor assembly 32 may be used to rotate the drive element 22. The motor 82 may be mounted either inside or outside the drive element 22. In one embodiment, the motor 82 is mounted inside the drive element 22 and generally concealed from plain view. Components including axles 52 and bearings 94 may also be located inside the rotatable drive element 22.

A slip ring 28 may be used to transfer current from the power supply external to the drive element 22 to the motor 82 in the drive element 22 as shown in FIG. 6. Alternatively, batteries 84 in a battery tube 86 may be used as shown in FIG. 5 to power the motor 82. The batteries 84 in the battery tube 86 may be in a spring loaded sleeve to assist with loading and unloading the batteries 84 from the battery tube. In some embodiments, a motor drive adapter 92 as shown in FIG. 6 may also be used to securely attach or connect the motor 82 to the drive element 22. In other embodiments, the motor housing fits tightly against the drive element 22 and turns the drive element 22 when the motor output shaft is held in end bracket 54 to prevent it from turning. FIG. 5 shows the interconnection of end caps 51, axles 52, bearings 94, bearing housings 57 (note the bearing housing 57 is shown on the motor end in FIG. 5, but the bearing housing 57 on the battery end is not shown), motor 82, and battery tube 86. FIG. 6 shows a slip ring 28, which is optional, and allows the circuit to be completed while rotating.

In a motorized operation, the user may push a button 98 on a remote control 96 to turn on the motor 82 to rotate the drive element 22 such that the curtain 44 moves across the drive element 22 between a stored position and a deployed position depending on the user's preference. The remote control 96 and button 98 are shown in FIGS. 1-3. In other embodiments, the motor 82 may respond to a signal from the remote control 96 that is initiated by a voice command to the remote control, which then causes the motor 82 to rotate the drive element 22.

The curtain assembly 20 may also include a remote control 96 having a control board that generates a signal when the user makes a selection on the remote control 96. The control board has a transmitter that can wirelessly communicate with a receiver that is remotely located from the transmitter. For example, the receiver may be located in the motor 82 in the drive element 22. The receiver receives the transmitted signal from the transmitter and transmits it to the motor 82, which will cause the motor 16 to turn on, rotate the drive element 22, and moves the curtain 44.

As the drive element rotates, either manually or by a motor 82, the curtain 44 is engaged on the drive element 22 and moves axially along the drive element 22 to either a deployed or stored position.

Curtain Support, Drive Attachment Element and Structure:

The curtain assembly 20 can include a drive attachment element 36 having a structure 62 that communicates with the guide structure 24 to move the drive attachment element 36 axially along the drive element 22 when the drive element 22 is rotated. The curtain assembly can also include one or more idler attachment elements 67 that interconnect with the drive element to support the window covering, e.g. curtain. In specific embodiments, the drive attachment element 36 has a corresponding feature 62 that is a tooth 62 as described below.

Figure 12:
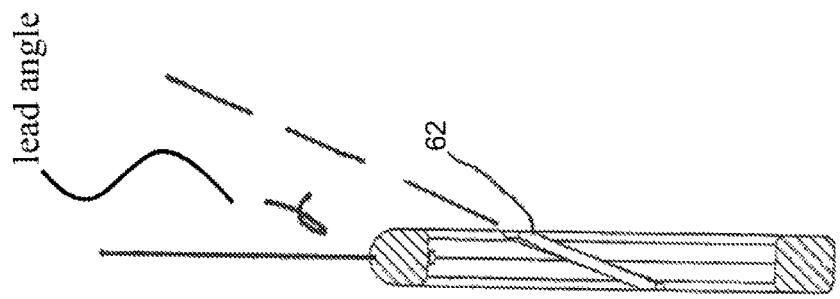
FIG. 12 is an enlarged cross-sectional view of the drive attachment element 36 showing the angle of the drive tooth 62 according to one embodiment.
Figure 10:
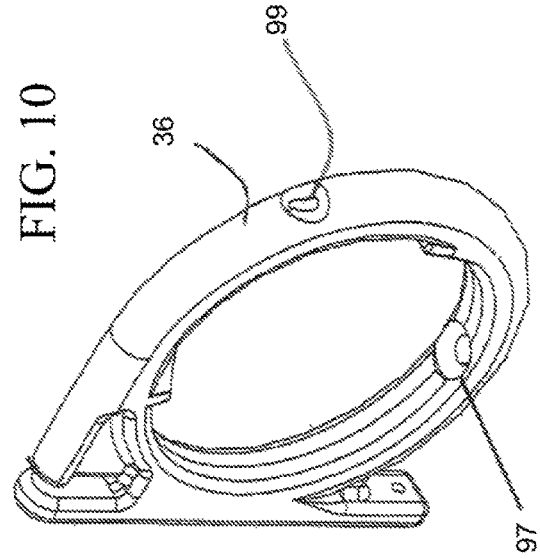
FIG. 10 is an enlarged perspective view of the drive attachment element according to one embodiment.
Figure 11:
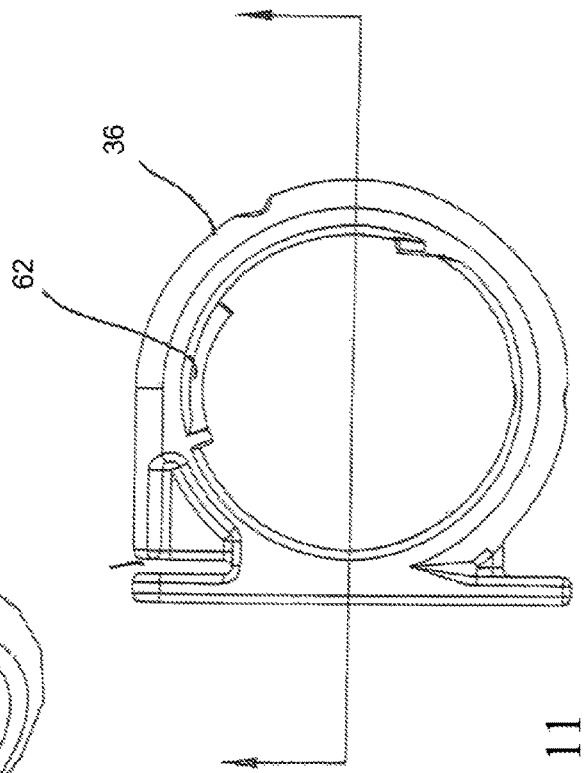
FIG. 11 is an enlarged side view of the drive attachment element 36 showing the structure 62 as a tooth according to one embodiment.

The curtain assembly 20 of the present disclosure may include in some embodiments at least one drive attachment element 36 having a feature 62 that communicates with a helical guide structure 24 to move the drive attachment element 36 axially along the drive element 22 when the drive element 22 is rotated. The helical guide structure may be a helical groove 24 and the feature 62 may be a tooth. Referring to FIG. 1, one end, such as the motor end, of the curtain can be fixed 64 and the adjacent opposing end, such as the bearings end, of the curtain 66 can be attached to the drive attachment element 36. The feature 62 as a tooth is shown in FIGS. 10-12. FIG. 10 shows an enlarged perspective view of the drive attachment element 36. FIG. 11 is an enlarged side view of the drive attachment element 36 showing the drive tooth 62 according to one embodiment. FIG. 12 is an enlarged cross-sectional view of the drive attachment element 36 showing the angle alpha (approximately 30 degrees) of the drive tooth 67. This angle alpha is the same angle as the helical groove makes with respect to a cross-sectional plane of the drive element.

As shown in FIGS. 10-12, the drive attachment element 36 can be ring-shaped and slides over the drive element 22. A different construction, however, may be used for the drive attachment element 36. As an example, the drive attachment element may have one or more additional structures 62, which may follow a corresponding one or more additional grooves, and/or one or more of the structures 62 can be located at a different rotational position with respect to the longitudinal axis of the drive element when the structure is mounted onto the drive element. The drive attachment element 36 is preferably provided with a slot 99 into which a traditional curtain hook 37 can be used to connect the end of the curtain to the drive attachment element 36. Curtain pins and curtain rings that are well known in the art to hang curtains may be used.

The structure 62 is designed to communicate with or engage the helical groove 24 of the drive element to move the drive attachment element 36 axially along the drive element, thereby moving the curtain. In one embodiment, the feature is a tooth formed on an angle on the inner surface of the body of the drive attachment element. The angle alpha of the drive tooth 62 is specifically designed to engage the helical groove on the drive element 22. In an embodiment, a design consideration is to maximize the amount of contact between the rotating drive element 22 and the drive attachment element 36 to move the weight of the curtain. The location of the tooth 62 with respect to the drive attachment element 36, in some embodiments of the present disclosure, are adjustable such that the angle the location of the tooth makes with respect to the drive element when the drive attachment element is interconnected to the drive element is adjustable. This adjustability allows the user of the curtain assembly to set the correct location of the drive attachment element(s) 36 in relationship to the axial position along the drive element for a particular rotational position of the drive element, as where the tooth is positioned and where the helical groove is located for a particular angular position of the drive element determines the axial position of the drive attachment element and, therefore, the axial position of the point of the curtain attached to the drive attachment element. In this way, if it is desired for a distal end of the curtain to reach the distal end of the drive element at a particular degree of rotation of the drive element (e.g., 720.degree., or 3600.degree.), then the relative rotational position of the tooth to the drive attachment element can be adjusted.

Figure 16:
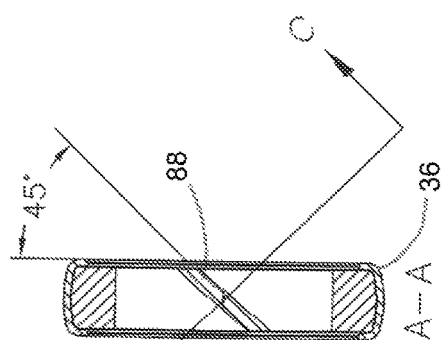
FIG. 16 is an enlarged cross-sectional view of the drive attachment element 36 showing the angle of the first drive tooth 88 according to one embodiment.
Figure 15:
FIG. 15 is an enlarged cross-sectional view of the drive attachment element 36 showing the angle of the second drive tooth 90 according to one embodiment.
Figure 13:
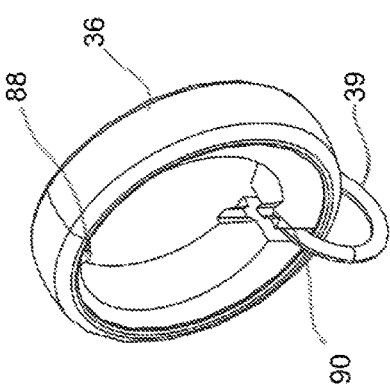
FIG. 13 is an enlarged perspective view of the drive attachment element having a first drive tooth and a second drive tooth according to one embodiment.
Figure 14:
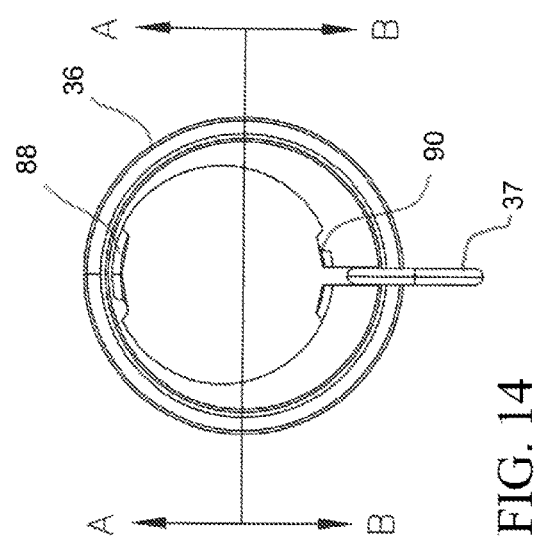
FIG. 14 is an enlarged side view of the drive attachment element 36 having a first drive tooth and a second drive tooth according to one embodiment.

In some embodiments, the drive attachment element 36 has a first drive tooth 88 and a second drive tooth 90 as shown in FIGS. 13-16. Both the first drive tooth 88 and the second drive tooth 90 are configured to communicate with different helical grooves 24 of the drive element 22. The first drive tooth 88 and the second drive tooth 90 are positioned inside the drive attachment element 36 at the top and the bottom of the drive attachment element 36, respectively. FIGS. 15 and 16 show cross-sectional views of the top and the bottom of the drive attachment element 36 which show the angle alpha of the first drive tooth and the angle of the second drive tooth alpha. The angles alpha are both 45 degrees. The angles alpha of the first drive tooth 88 and the second drive tooth 90 are not limited to 45 degrees and are configured to communicate with the corresponding helical groove 24 of the drive element 22. In a preferred embodiment, also shown in FIGS. 22-26, there are four helical grooves 26. Two are clockwise spirals 38 and two are counter-clockwise 40.

One issue with this type of helical pattern on center closing curtains is keeping the timing of the drive attachment elements and the helical groove such that the two curtains always meet in the center of the opening when the drive element is drive (rotated to the close position. This issue is further complicated by being able to cut down the length of the tube to fit smaller windows. If a quad-helix drive element (two clockwise and two counterclockwise helixes) is cut down to a length that is not a multiple of ½ the pitch of the helixes, the drive attachment elements of the right curtain and the left curtain (for a dual curtain assembly) may not meet in the middle of the drive element. See FIG. 26. The adjustable drive attachment element can allow the teeth to be repositioned inside the drive attachment element such that the drive attachment element can start from a different axial position along the drive element and end at the desired axial position in the center, or other desired axial position. This adjustment of the position of the tooth with respect to the drive attachment element can correct the offset caused by the odd length of the drive element, e.g., from cutting an end off, and allows the right curtain drive attachment element and the left attachment element to meet in the middle.

The gear teeth between the "Clicker" and "Gear Ring" parts of the adjustable drive attachment element, in a specific embodiment, do not allow the "Clicker" to rotate when it is on the tube. In this case, removing the adjustable drive attachment element from the drive element allows the user to adjust the "Clicker" manually by disengaging it from the Gear Ring. The outward force of the drive element on the Clicker's gear teeth essentially locks it into the Gear Ring. Specific embodiments allow the tooth to be repositioned about one inch in either direction. For a drive element where ½ the pitch length is two inches, rotating the tube 180 degrees before installing the adjustable drive attachment element changes the starting position by ½ pitch length, which will correct the adjustable drive attachment element's starting position to an acceptable degree. Although the structure 62 described in the embodiments above is a tooth, other embodiments for the structure 62 may be used as well.

Simple Attachment Elements

The curtain assembly 20 may further comprise a plurality of idle attachment elements 67 connected to the drive element 22 for sliding movement along the drive element 22. The remaining attachment points 68 of the curtain 34 that are not connected to the drive attachment element 36 can then be suspended from the drive element 22 using one or more idler attachment elements 67.

Referring to FIG. 1, the curtain has one fixed end 64 and an adjacent opposing end 66 that is connected to the drive attachment element 36. The remaining ends (or attachment points) of the curtain 68 are positioned between the fixed end 64 and the adjacent opposing end 66 that is connected to the drive attachment element 36. These remaining attachment points 68 may be suspended from the drive element 22 using a plurality of idler attachment elements 67. The idler attachment elements 67 are interconnected to the rotatable drive element 22 as shown in FIGS. 1-4. Such interconnection of idler attachment elements 67 can be such that the idler attachment element surrounds a portion of, or all of, the circumference of the cross-section of the drive element and hangs freely on the drive element. In other embodiments, the idler attachment elements can be also interconnected with a structure external to the drive element.

The idler attachment elements 67 may be shaped similar to the drive attachment element 36. In some embodiments, the idler attachment elements 67 may have a smooth bore to allow free movement along the drive element 22 as the curtain moves. In other embodiments, the idler attachment elements 67 may have a tooth to assist in the movement of the curtain across the drive element. In embodiments having a tooth, the drive element can have a region that frees the tooth when the simple attachment element reaches a certain axial region of the drive element, such as an end of the drive element, going one axial direction, and re-engages the tooth as the idler attachment element is pulled in the other axial direction out of the same axial direction.

As shown in FIGS. 1-4, the idler attachment elements 67 may be rings that slide over the drive element 22. The idler attachment elements 67 may be provided with a slot or a hole (not shown) into which a traditional curtain hook (or loop) 37 is used to attach the remaining attachment points 68 of the curtain 44 to the idler attachment element 67 as shown in FIGS. 4-6. Curtain pins and curtain rings that are well known in the art to hang curtains may be used.

Pull Rods and Programming:

In some embodiments, the drive attachment element 36 has a single tooth 62 and is a loose fit on the drive element 22. In these cases, the curtain assembly 20 can include a draw rod 70 connected to the drive attachment element 36 wherein the drive tooth 62 is disengaged from the guide structure 24 of the drive element 22 by applying force on the draw rod 70. The draw rod 70 may be an elongated rod or any other mechanism that is configured to allow the user to manually disengage the drive attachment element 36 from the guide structure 24. The draw rod can then be used to axially move the drive attachment element along the drive element.

The motor 82 for the curtain assembly 20 may be programmed from the factory with a preset number (integer or fractional) of drive element 22 revolutions to move the curtain axially across the drive element 22. There are a variety of reasons, however, why this preset number of revolutions may change. For example, the drive element 22 may be shortened (e.g., cut) to accommodate a narrower window 34 or the curtain has been manually moved with the draw rod 70 and not moved by the pull cord 72.

Therefore, in an embodiment, the initial setup of the motor 82 is able to count the number of revolutions the drive element 22 makes to fully open and fully close the curtain 44. This setup may be accomplished by a setup routine in which a program button is pressed once on a remote control 96 to start the motor 82 moving the curtain 44 and then pressing the button a second time, either to stop the movement or after the movement has stopped, which stores the number of revolutions the curtain 44 has moved.

In a specific embodiment, the number of revolutions can be confirmed by pressing the program button a third time, which reverses the motor 82 and moves the curtain 44 in the opposite direction. Pressing the program button a fourth time, either to stop the curtain 44 or after the movement has stopped, can cause the number of counts to be compared, and set a new count in the memory to complete the set up routine. If the program button on the remote control 96 is not pressed the second time, the motor 82 can run until the preset count is reached, then shut off. Alternatively, the assembly can implement some sort of maximum axial distance detector or force detector, or clutch, such that the motor stops, or stops rotating the drive element, respectively, when a threshold force is encountered trying to move the drive attachment element.

If it is desired to automatically move the curtain after the curtain was manually moved, the user can press the program button twice on the remote control 96, which will cycle the curtain twice. This resynchronizes the curtain movement count by first moving the curtain to one distal end of the drive element followed by moving the curtain 44 to the opposite distal end of the drive section, i.e., two cycles.

When the curtain 44 is moved towards its fully deployed position, as shown in FIG. 1, the drive attachment element 36 is driven by the rotation of the helical groove 24 on the drive element 22 acting on the feature in the drive attachment element until the drive element 22 rotates a set number of revolutions and stops in the fully deployed position.

Center Closing Embodiments:

Referring to FIG. 4, a specific embodiment of the curtain assembly 20 is shown in which the curtain 44 used is a center closing curtain 46. As described above, a center closing curtain 46 is composed of two fabric panels, a right panel 50 and a left panel 48, which meet in the center of the window 42 to close and cover the window 34.

The center closing curtain 46 is in the deployed position and the window 34 is covered in FIG. 4. The drive element 22 has a clockwise helical groove 38 and a counter clockwise helical groove 40 formed on the outer surface 26 of the drive element 22. The clockwise helical groove 38 and counter clockwise helical groove 40 have the same angle and oppose each other to create the correct movement of the center closing curtain 46 when the drive element 22 rotates.

To accommodate a center closing curtain 46, the curtain assembly 20 has a left drive attachment element 74 and a right drive attachment element 76 as shown in FIG. 4. The left drive attachment element 74 is connected to the adjacent opposing end 66 of the left panel 48 and the right drive attachment element 76 is connected to adjacent opposing end 66 of the right panel 50. In other words, the left panel 48 has a fixed end 64 and an adjacent opposing end 66 that is connected to the left drive attachment element 74. The right panel 50 has a fixed end 64 and an adjacent opposing end 66 that is connected to the right drive attachment element 76. There may also be a left draw rod 78 and a right draw rod 80 attached to the left drive attachment element 74 and the right drive attachment element 76, respectively.

The tooth 62 of the right drive attachment element 76 can follow the counter-clockwise helical groove 40 and the tooth 62 of the left drive attachment element 74 can follow the clockwise helical groove 38, such that when the drive element is rotated in a first rotational direction the left panel 48 and right panel 50 both close and when the drive element is rotated in the opposite direction the left panel 48 and right panel 50 both open. In a specific embodiment, the drive element has only one or more clockwise helical grooves 24 on the left end of the drive element, on which the closed left panel 48 hangs, and the drive element has only one or more counter-clockwise helical grooves on the right end of the drive element, on which the closed right panel 50 hangs.

Dual Curtain:

Referring to FIGS. 27-30, a dual curtain assembly 1 is provided. The dual curtain assembly 1 comprises a rotatable drive element 22 wherein at least one helical structure 24 is formed on the outer surface 26 of the drive element 22; curtain drive elements 36A and 36B having a corresponding structure that communicates with the helical structure 24 to move the curtain supports axially along the drive element 22 when the drive element 22 is rotated and; a rotation assembly 33 for rotating the drive element 22.

In some embodiments of the disclosure, the helical structure 24 is a helical groove and the corresponding structure is a tooth. While the helical structure 24 is shown in FIGS. 27-30 as a helical groove, the helical structure is not limited to a groove. Similarly, the corresponding structure discussed below in some embodiments is a tooth but is not limited to being a tooth. In some embodiments, the curtain support includes an outer curtain outer curtain drive attachment element 36A and an inner curtain drive element 36B as shown in FIGS. 27-30 and explained further below.

The curtain assembly 1 may further comprise an outer curtain 44A and an inner curtain 44B; the outer curtain 44A is suspended from the rotatable drive element 22 while the inner curtain 44B is suspended from hooks 17 in carrier tracks 12 and 81 that move along the support guide 11. The rotatable drive element 22 comprises at least one drive element 22 having opposing distal end portions 35, 36, where the distal end having the motor can be referred to as the motor end 58 and the other distal end can be referred to as the bearing end 59, wherein at least one helical groove 24 is formed in either a clockwise direction or a counterclockwise direction on the outer surface 26 of the drive element 22 extending from one distal end portion 35, 36 of the drive element 22 to the opposing distal end portion 35, 36 of the drive element 22.

When the drive element 22 is rotated, either the outer curtain 44A or the inner curtain 44B will move along the drive element 22, while the other curtain is held in place in a non-driving or stall area. Once the moving driver attachment element 36A or 36B has reached a stall area at the end of the drive element 22, the non-moving driver attachment element will be tugged to engage the helical groove 24. This movement of the outer curtain 44A and the inner curtain 44B, along the helical groove 24 of the drive element 22 is explained in greater detail below. Whether the outer curtain 44A moves or the inner curtain 44B moves is determined by the sequence of the movement of the curtains. A system for selecting either the outer curtain 44A or the inner curtain 44B is explained below.

As shown in FIG. 27, the outer curtain 44A and inner curtain 44B may be composed of a single continuous panel of fabric that moves back and forth across the drive element 22 to the deployed position (covering the window 34) and to the stored position (not covering the window 34). Although, there is no limitation on the type of fabric used for the curtains 44A and 44B, in one embodiment, the outer curtain 44A is a blackout curtain and the inner curtain 44B is a sheer curtain. Using a blackout curtain with a sheer curtain to cover the same window 34 allows the user to use the sheer curtain when some light is desired and then also to use the blackout curtain when no light is desired. For example, the blackout curtain may be stored and the sheer curtain may be deployed, if some light is desired and privacy is needed. The blackout curtain may be deployed and the sheer curtain may be deployed when no light is desired. The blackout curtain may be stored and the sheer curtain may also be stored, when light is desired and privacy is not needed. The dual curtain assembly 1 disclosed herein allows for these combinations of positions for the outer curtain 44A (blackout curtain) and the inner curtain 44B (sheer curtain) as shown in FIGS. 27-30.

FIG. 27 illustrates a curtain assembly 1 when the outer curtain 44A is a blackout curtain in the deployed position and the inner curtain 44B is a sheer curtain in the deployed position. Therefore, in FIG. 27, the window 34 is covered by the outer curtain 44A or the blackout curtain and the inner curtain 44B. FIG. 28 illustrates a curtain assembly 1 when the outer curtain 44A is a blackout curtain in the stored position and the inner curtain 44B is a sheer curtain in the deployed position. The window 34 is covered by the sheer curtain and the blackout curtain is stored in this instance. FIG. 29 illustrates a curtain assembly 1 when the outer curtain 44A is a blackout curtain in the stored position and the inner curtain 44B is a sheer curtain in the stored position. The window 34 is left uncovered in this instance.

FIG. 30 illustrates the preferred embodiment curtain assembly 1 when the outer curtain 44A is a blackout curtain in the deployed position and the inner curtain 44B is a sheer curtain in the deployed position. Therefore, in FIG. 27, the window 34 is covered by the outer curtain 44A or the blackout curtain and the inner curtain 44B. Further, the outer curtain has the stationary end attached to the end bracket 54 and the movable end wrapped around the other end bracket 54 on the distal end. There is also a cut away area to show the position of an external power supply 43.

Drive Element and Drive Section:

The rotatable drive element 22 and drive element 22 will now be explained in detail below. The curtain assembly 1 includes a rotatable drive element 22. FIGS. 31 and 32 show the rotatable drive element 22 and its components in greater detail. Both the outer curtain 44A and the inner curtain 44B are connected to the rotatable drive element 22 by the outer curtain outer curtain drive attachment element 36A or the inner curtain attachment drive element 5 or various attachment and suspension elements as explained below. The rotation assembly 33 which rotates the drive element 22 moves these attachment drive elements which are connected to the curtains 44A and 44B separately across the drive element 22.

The rotatable drive element 22 is designed to be installed above a window 34 similar to a traditional curtain rod. For example, as shown in FIG. 27, drive element 22 is mounted on axles 52 that are located and secured in the end brackets 54. The end brackets 54 are adapted for connection with a window frame, sash or wall. The end brackets 54 may also include a rubber mounting disk 13 that is compressed when the drive element 22 is installed to hold the drive element 22 firmly in place and minimize noise.

The drive element 22 is connected to a rotation assembly 33 for rotating the drive element 22 wherein the rotation of the drive element 22 moves the outer curtain drive attachment element 36A and the inner curtain drive element 36B separately across the helical groove 24 of the drive element 22. The rotation assembly 33 may be a draw cord 72 connected to the drive element 22 or a motor 82. The drive element 22 may be rotated manually. For example, a draw cord 72 as shown in FIGS. 27-29 may be connected to the drive element 22 such that the drive element 22 can be manipulated manually to rotate when it is desired to deploy or store the curtains 44A or 44B. The use of pull cords 72 is well known in the art.

The drive element 22 may also be connected to a motor 82, which can be used to rotate the drive element 22. The motor 82 may be mounted either inside or outside the drive element 22. In one embodiment, the motor 82 is mounted inside the drive element 22 and generally concealed from plain view. Components including axles 52 and bearings 94 may also be located inside the rotatable drive element 22. A slip ring 28 may be used to transfer current from the power supply 43 external to the drive element 22 to the motor 82 in the drive element 22 as shown in FIG. 32. Alternatively, batteries 84 in a battery tube 86 may be used as shown in FIG. 31 to power the motor 82. The batteries 84 in the battery tube 86 may be in a spring loaded sleeve to assist with loading and unloading batteries 84 from the battery tube 86. In some embodiments, the motor drive adapter 27 as shown in FIG. 59 may also be used to securely attach or connect the motor 82 to the drive element 22. In other embodiments, the motor housing 53 fits tightly against the drive element 22 and turns the drive element 22 when the motor output shaft 87 is held in end bracket 54 to prevent it from turning.

In a motorized operation, the user may push a button 98 on a remote control 96 to turn on the motor 16 to rotate the drive element 22 such that the sequence selected curtain 44A or 44B moves across the drive element 22 between a stored position and a deployed position depending on the user's preference. The remote control 96 and button 98 are shown in FIGS. 27-29. In other embodiments, the remote control may respond to a voice command and send a signal to the motor controls, which then causes the motor 82 to rotate the drive element 22.

The curtain assembly 1 may also include a remote control 96 having a control board which generates a signal when the user makes a selection on the remote control 96. The control board has a transmitter which can wireless communicate with a receiver which is remotely located from the transmitter. For example, the receiver may be located in the drive element 22. The receiver receives the transmitted signal from the transmitter and transmits it to the motor 82, which will cause the motor 82 to turn on, rotate the drive element 22, and moves one of the curtains 44A or 44B.

As the drive element 22 rotates, either manually or by a motor 82, the outer curtain drive attachment element 36A or the inner curtain drive attachment element 36B is engaged on the drive element 22 and moves across the drive element 22 to either a deployed or stored position while the other curtain 44A or 44B remains in place. When the moving curtain 44A or 44B reaches the end of the drive element 22, the stationary curtain 44A or 44B will be pulled into engagement with the helical groove 24 and move across the drive element 22 to a new position.

The rotatable drive element 22 is preferably cylindrical in shape as shown in FIGS. 31, 32, 34, and 59, which shows the drive element 22 having an inner tube, referred to as an inner drive element 9, and an outer tube or sleeve 63. However, the shape of inner drive element 9 and an outer tube or sleeve 63 of the drive element 22 are not limited and can be non-circular. In an alternative embodiment, as shown in FIG. 60, the rotatable drive element 22 may be tri-lobed. In this case the drive element is a spiraled tube having creases that a ball bearing can ride in.

The drive element 22 may vary in size. For example, the drive element 22 may be the width of the window 34 or it may be wider than the window 34. There is no limitation on the diameter of the drive element 22 other than space needed inside a room. Preferably, the drive element 22 is configured to mount a motor 82 inside the drive element 22 rather than mounting the motor 82 outside the drive element 22. Using the inside of the drive element 22 to conceal the motor 82 may give a more aesthetically pleasing design for a curtain assembly 1 or 20. Any number of materials may be used to fabricate the drive element 22 provided the drive element 22 can support the weight of the outer and inner curtains 44A, 44B.

The drive element 22 comprises a guide structure 24, such as a helical groove, over at least one or more portions of the length of the drive element 22. The drive element 22 has opposing distal end portions 35, 59 and may be any length along the longitudinal axis 60 of the drive element 22. The longitudinal axis 60 of the drive element 22 is shown in FIGS. 27-30. The length of the guide structure along the drive element 22 is a factor in determining how far the curtain 44A or 44B will travel across the drive element 22, i.e., the entire length of the drive element 22 as opposed to some shorter section of the drive element 22.

In an embodiment, the drive element 22 has at least one helical groove 24 that is formed in either a clockwise direction or a counterclockwise direction on the outer surface 26 of the drive element 22 extending from one distal end portion 35, 59 of the drive element 22 to the opposing distal end portion 35, 59 of the drive element 22. FIG. 49 illustrates a left hand drive element 22 in which the helical groove 24 is in a clockwise direction and also illustrates a right hand drive element 22 in which the helical groove 24 is in a counterclockwise direction.

In some embodiments, the drive element 22 may have two helical grooves 24, one formed in the clockwise direction and one formed in the counterclockwise direction as shown in FIG. 59. A drive element 22 having a drive element 22 with helical grooves 24 in both directions is particularly useful for center closing curtains 46 as explained below.

In the preferred embodiment, the drive element 22 may have two helical grooves 24 in the same direction, where the inner drive attachment element 36B has two teeth 5a and 5b spaced 180 degrees apart and the outer drive attachment element 36A has two teeth 4a and 4b spaced 180 degrees apart, such that tooth 4a, and tooth 5a, engages one of the helical grooves and tooth 4b, and tooth 5b, engages the other helical groove at the same time, respectively, so as to add stability with respect to driving Drive attachment element 36A, and 36B, respectively.

In other embodiments, the drive element preferably has four helical grooves 24, two clockwise helical grooves 24 and two counterclockwise helical grooves 24 as shown in FIG. 59. A cross-sectional view of the rotatable drive element having four helical grooves 24, two clockwise helical grooves and two counterclockwise helical grooves is shown in FIG. 59. Helical grooves are preferably spaced approximately 180 degrees apart. The clockwise helical grooves 24 and the counterclockwise helical grooves 24 preferably opposed each other and are spaced 180 degrees apart. The profile of the helical grooves 24 is self-centering to allow the first outer drive tooth 4a and the first inner drive tooth 5a to traverse the intersection of the clockwise helical groove and the counter clockwise helical groove without binding.

The helical groove 24 forms a path through the drive element 22 of the drive element 22 as shown in FIGS. 27-30.

As the drive element 22 rotates, one of the curtains 44A or 44B is pulled along the helical groove 24 across the drive element 22 into a deployed or stored position. Both the clockwise and the counterclockwise helical grooves 24 will cause the curtain 44A or 44B to move axially across the drive element 22 when the drive element 22 rotates and the curtain drive elements 36A or 36B are engaged with the helical groove 24.

The helical grooves 24 may be formed by forming grooves into the outer surface 26 of the drive element 22 such that the grooves are recessed from the outer surface 26 of the drive element 22. Alternatively, the helical grooves 24 may be formed as protrusions that project or bulge from the outer surface 26 of the drive element 22. The protrusions may be formed any means, for example, by winding material around the outer surface 26 of the drive element 22.

The angle of the helical groove 24 may vary and therefore, may differ in the amount of time that it takes to travel across the drive element 22. For example, a helical groove 24 with a larger angle may create a shorter path for the curtain 44A, 44B to travel and result in a faster moving curtain 44A or 44B for a given rotational speed of the drive element. In some embodiments, the angle of the helical grooves 24 may vary along the drive element 22 such that the curtain 44A, 44B may move at different speeds along the drive element 22, for a given rotational speed of the drive element, if desired. The angle of the helical groove 24 preferably varies from 30 degrees to 60 degrees and is most preferably 45 degrees.

In an alternative embodiment, the drive element 22 may be formed from a drive sleeve or outer tube 63 that is sized to fit around a portion of an inner drive element 9, which can be, for example, an inner tube 61. In this case, the drive sleeve has at least one helical groove 24 in a clockwise or counter clockwise direction formed on the outer surface of the sleeve. The drive element 22 must be able to translate the torque from the rotation assembly to axially movement of the curtain support or attachment elements 36A, 36B across the drive element 22, and the drive sleeve may be made from a high lubricity material. Therefore, the drive sleeve can be secured to the inner drive element 9 such that the sleeve does not slide up or down the drive element 22 or rotate around the inner drive element 9. It may also be desired to remove the sleeve from the inner drive element 9 and replace it with another sleeve. Using a sleeve to form the drive element 22 has the advantage that the helical groove 24 or the length of the drive element 22 may be easily changed by removing the sleeve and replacing it without fabricating a new drive element 22.

Attachment Elements and Teeth:

In some embodiments, the curtain assembly 1 may include at least one outer curtain drive attachment element 36A connected to the drive element 22 and has a drive teeth 4a and 4b that communicates with the helical groove 24 to move the outer curtain drive attachment element 36A axially along the drive element 22 when the drive element 22 is rotated. The outer curtain drive attachment element 36A is connected one end of the outer curtain 44A. The curtain assembly 1 may include at least one inner drive attachment element 36B connected to the drive element 22 and has a drive teeth 5a and 5b that communicates with the helical groove 24 to move the inner drive attachment element 36B axially along the drive element 22 when the drive element 22 is rotated. The inner drive attachment element 36B is connected one end of the inner curtain 44B.

FIGS. 45-47 show the front and cross-sectional views of the outer curtain drive attachment element 36A as well as the drive teeth 5a and 5b. Both the first outer drive tooth 5a and the second outer drive tooth 5b are configured to communicate with the helical groove 24 of the drive element 22. The first outer drive tooth 5a and the second outer drive tooth 5b are positioned inside the outer drive attachment element 36A which shows the angle alpha of one drive tooth and both the angles are 45 degrees.

FIGS. 39-41 show the front and cross-sectional views of an embodiment of an inner drive attachment element as well as the drive teeth 4a and 4b. Both the inner drive tooth 4a and the inner drive tooth 4b are configured to communicate with the helical groove 24 of the drive element 22. The inner drive tooth 4a and the inner drive tooth 4b are positioned inside the drive attachment element which shows the angle alpha of one drive tooth and both the angles are 45 degrees. In this embodiment, the inner carrier attachment post 31 is located at a portion of the inner drive attachment element designed to interconnect with a carrier in the inner curtain carrier track 81.

FIGS. 36-38 show the front and cross-sectional views of an alternative inner drive attachment element 36B as well as the drive teeth 4a and 4b. Both the inner drive tooth 4a and the inner drive tooth 4b are configured to communicate with the helical groove 24 of the drive element 22. The inner drive tooth 4a and the inner drive tooth 4b are positioned inside the drive attachment element which shows the angle alpha of one drive tooth and both the angles are 45 degrees. In this embodiment, the inner carrier attachment post 31 can be the same as the outer carrier attachment post 6 of FIGS. 45-47 designed to interconnect with a carrier in the outer curtain carrier track 12, and the attachment points of the inner curtain can attach via hooks to the receiver for hooks 99.

As shown in various figures, the outer curtain outer curtain drive attachment element 36A and the inner curtain drive element 36B are ring-shaped and slide over the drive element 22. Although a different construction may be used for the outer curtain outer curtain drive attachment element 36A and the inner curtain drive element 36B, they are be able to connect to the appropriate ends of the outer curtain 44A and the inner curtain 44B and engage the helical groove 24 and move across the drive element 22.

The outer curtain outer curtain drive attachment element 36A is preferably provided with a slot or a hole 99 into which a traditional curtain hooks or pins can be used to connect the ends and upper edge of the outer curtain 44A to the appropriate attachment element. FIG. 34 illustrates an example of the hole 99 and a pin hook 14 on an outer curtain idler attachment element 67A. In another embodiment, as shown in FIG. 60, a traditional curtain ring is used. The inner curtain 44B is suspended by S-hooks 17 in inner curtain carrier track 81 in support guide 11. Curtain pins, hooks and rings are well known in the art to hang curtains 44A, 44B.

The drive tooth 5a on the outer drive attachment element 36A and the drive tooth 4a on the inner drive attachment element 36B may have the same construction. The outer drive tooth 5a and the inner drive tooth 4a are both designed to engage with the helical groove 24 of the drive element 22 to drive the curtain 44A or 44B across the drive element 22. In one embodiment, the drive tooth 5a is formed on an angle inside the body of the outer curtain drive attachment element 36A. The angle is specifically designed to engage the helical groove 24 on the drive element 22. A design consideration is to maximize the contact between the rotating drive element 22 and the outer drive attachment element 36A and/or inner drive attachment element 36B to carry the weight of the curtain 44A or 44B. The outer curtain outer curtain drive attachment element 36A and the drive teeth 5a and the inner curtain drive attachment element 36B teeth and the inner curtain teeth 4a, in some embodiments of the present disclosure, are adjustable. The adjustability of these components allow the user of the curtain assembly to set the correct timing on the location of the outer curtain drive attachment element(s) 36A and inner curtain drive attachment element(s) 36B in relationship to the helical grooves 24.

Although the curtain support described in the embodiments above is an outer curtain outer curtain drive attachment element 36A and an inner curtain drive attachment element 36B, other embodiments for the curtain support may be used as well.

Outer Curtain Idler Attachments:

The curtain assembly 1 may further comprise a plurality of outer curtain idler attachment 67A connected to the rotatable drive element 22 for sliding movement along the drive element 22 wherein the adjacent ends of the outer curtain 44A that are not connected to the outer curtain drive attachment element 36A are suspended from the drive element 22 using one or more outer idler attachment elements 67A.

The outer curtain 44A has the movable end connected to the outer drive attachment element 36A. The non-movable end of the outer curtain 44A can be attached to the end bracket 54. Outer idler attachment elements 67A may be used to suspend the remaining attachment points of outer curtain 44A to the drive element 22. The outer idler attachment elements 67A are connected to the rotatable drive element 22 as shown in FIGS. 31-32 and 34-35. An enlarged view of the outer idler attachment 67A is shown in FIGS. 42-44.

The outer idler attachment 67A may be shaped similar to the outer drive attachment element 36A and inner drive attachment element 36B. The outer idler attachment 67A can have a smooth bore to allow free movement along the drive element 22 of the tube as the curtain 44A is moved or may have a tooth on each outer idler attachment 67A to assist in the movement of the curtain 44A.

The outer idler attachments are also linked to the outer curtain carriers 69 by the insertion of the outer carrier attachment post 6 on the outer idler attachment elements 67A into the aperture 55 on outer curtain guide carrier 69. The outer current carriers are then positioned in the outer curtain carrier track 12 in the support guide 11. This prevents the outer curtain idler attachment 67A from rotating or binding the rotation of the element 22.

The outer curtain idler attachment 67A are preferably provided with a slot or a hole 99 into which a traditional curtain hook or pin can be used to attach the ends of the outer curtain 44A to the outer curtain idler attachment. FIG. 42 illustrates an example of this hole 99 and a pin hook 14 on an outer curtain idler attachment 67A.

The inner curtain 44B can have the stationary end connected to the end bracket 54 and other end attached to the inner drive attachment element 36B. The inner curtain carrier track 81 and hooks 17 may be used to suspend the remaining attachment points of the inner curtain 44B to the inner curtain carrier track 81 of the support guide 11 along the axis of the drive element 22.

The outer curtain 44A is connected to the outer drive attachment element 36A and the inner curtain 44B is attached to the inner drive attachment element 36B. This arrangement ensures that the outer curtain 44A and inner curtains 44B drive attachment elements 36A and 36B are linked together on the same drive element 22 and they are able to move in sequence across the drive element 22.

Outer Driver Stall Area and Inner Driver Stall Area:

The curtain assembly 1 preferably includes at least one outer driver stall area 100 positioned to one end of the drive element 22 to engage and disengage the outer drive attachment element 36A from the helical groove 24 of the drive element 22.

The curtain assembly 1 also preferably includes at least one inner driver stall area 15 positioned on the distal end of the drive element 22 that is configured to hold the inner curtain drive element 36B in place while the outer drive attachment element 36A moves through the drive element 22.

FIGS. 33-34 show an outer driver stall area 100 at one distal portion 35, 59 of the drive element 22. FIG. 51 shows the inner driver stall area 15 at the opposing distal end 35, 59 of the drive element 22. FIG. 49 shows a rotatable drive element 22 having an outer driver stall area 100 at each distal end portion of the drive element 22 and an inner driver stall area 15 positioned in between the two stall areas s 100. The rotatable drive element 22 shown in FIG. 49 will accommodate the outer curtains 44A and inner curtains 44B, as center closing curtains.

Enlarged views showing details of the outer driver stall area 100 are shown in FIG. 34. The outer driver stall area 100 is a section of the drive element 22 along the drive element 22 without a helical groove 24 formed on the outer surface 26 of the drive element 22. The outer driver stall area 100 interrupts the movement of the outer curtain 44A or the inner curtain 44B along the helical groove 24 therefore allowing the curtain assembly 1 to change which attachment element (either the outer curtain drive attachment element 36A or the inner curtain drive element 36B) is engaged with the helical groove 24.

The outer driver stall area 100 also serves to collect or provide a space for the outer curtain idler attachment elements 67A as well as the outer curtain drive attachment element 36A. For example, when the outer curtain drive attachment element 36A is engaged and moves through the drive element 22, it will reach the outer driver stall area 100 at the end of the drive section. The outer driver stall area 100 stops the movement of the outer curtain drive attachment element 36A in the helical groove 24 and temporarily stores the outer curtain drive attachment element 36A. The outer curtain idler attachment elements 67A that are holding the remaining adjacent end of the curtain 44A are pushed by the outer curtain drive attachment element 36A and ultimately stack up in the outer driver stall area 100 until the outer curtain drive attachment element 36A becomes disengaged with the helical groove 24 and will remain stalled until the drive element 22 rotates in the opposite direction. As this disengagement occurs, the outer curtain drive attachment element 36A pushes against the outer curtain idler attachment 67A in the outer driver stall area 100 which moves the inter-curtain engager 49 toward the end bracket 54. The inner curtain 44B, being the correct length, pulls the inner curtain drive element out of the inner driver stall area 15 and into engagement with the helical grooves 24.

In some embodiments, the inner driver stall area 15 is positioned at the distal end 59 of the drive element 22 opposite the outer driver stall area 100 and functions to hold the inner curtain drive element 36B stalled in place. In other embodiments, at least one inner driver stall area 15 is positioned between two outer driver stall areas 100, as shown in FIG. 49. The position of the inner driver stall area 15 on the drive element 22 defines the end of the portion of the drive element 22 where the inner curtain drive element 36B travels on the drive element 22.

As described above, FIG. 27 shows a curtain assembly 1 when the outer curtain 44A (blackout) is in the deployed position and the inner curtain 44B is also in the deployed position. At this moment, the outer curtain 44A is fully extended and the curtain drive attachment element 36A is in the helical groove 24 at one distal end of the drive element 22 and the inner curtain drive element 36B is in the inner driver stall area 15 at the same end of the drive element 22. To change the positions of the curtains such that the outer curtain 44A is in the stored position and the inner curtain 44B stays in the deployed position as shown in FIG. 28, the drive element 22 starts to rotate in the opposite direction. The rotation of the drive element 22 will move the outer curtain drive attachment element 36A. attached to outer curtain 44A, collapsing curtain 44A into the stored position until outer curtain drive attachment element 36A moves into the outer driver stall area 100 where it will push against the outer idler attachment elements 67A in the outer driver stall area and force the inter-curtain engager 49 toward the end bracket 54 creating a tug pressure on the inner curtain 44B and the inner curtain drive element 36B because the inner curtain 44B is the correct length and extended. This tug pressure pulls the inner curtain drive element 36B out of the inner driver stall area 15 and into engagement with the helical groove 24 positioning the curtains as shown in FIG. 28. When the inner curtain 44B is fully extended, the inner curtain drive element 36B will move into the inner driver stall area 15. Because the inner curtain is now extended, the outer curtain drive attachment element 36A will be pulled into the helical groove 24 prepared to deploy the outer curtain 44A. Because the inner driver stall area 15 does not have a helical groove 24, the inner curtain attachment 36B element is prevented from moving or stalled along the drive element 22.

As the outer drive attachment element 36A moves through the drive element 22, the outer curtain 44A will move from the stored position to the fully deployed position and the outer drive attachment element 36A moves up to and against the inner curtain drive element 36B in the inner driver stall area 15 and stops the drive element 22 from rotating The curtain assembly 1 will then be as shown in FIG. 27, with the outer curtain 44A in the deployed position and the inner curtain 44B in the deployed position.

To move the inner curtain 44B to the stored position as shown in FIG. 29, the drive element 22 will rotate and the outer drive attachment element 36A moving into the outer driver stall area 100 will pull the inner curtain drive element 36B from the inner driver stall area 15 thereby engaging the inner curtain drive element 3613 with the helical groove 24. The inner curtain drive element 36B will move the curtain 3 through the drive element 22 from the deployed position to the stored position at the other distal end of the drive element 22 until the inner curtain drive element 36B pushes against the outer drive attachment element 36A and stops the drive element 22 from rotating. At this point, the inner drive attachment element 36B is engaged with the helical groove 24.

Guide Mechanism:

The curtain assembly 1 preferably includes a support guide 11 wherein the guide means facilitates the movement of the outer and inner curtains 44A, 44B along the drive element 22 without misalignment. The support guide 11 may also assist with the spacing of the curtain panels when the outer curtain 44A or the inner curtain 44B is fully extended in the deployed position.

In one embodiment, the support guide 11 is an elongated pair of channels positioned parallel to the rotatable drive element 22. The support guide 11 is shown in several of the figures, including an end view in FIG. 48. The inner curtain carrier track 81 and the outer curtain carrier track 12 are the same part but are numbered differently and discussed differently because their functions are different. The inner curtain carriers 93 have apertures 55 where an inner carrier attachment post 31 on the inner curtain drive element 36B is inserted at one end of the inner curtain and an inner carrier attachment post 31 on the inter-curtain engager 49 is inserted on the other end. The remaining inner curtain carriers 93 have S-hooks 17 inserted into the aperture 55 as known in the art.

The outer drive attachment element 36A and the outer curtain idler attachment 67A preferably have a hanger pin hole 99 wherein the pin hooks 14 are connected to the attachment elements and support the outer curtain 44A. Further, these attachment elements 36A and 67A to the outer curtain 44A are guided and held from rotation by the insertion of the outer carrier attachment posts 6 into the apertures 55 in curtain carriers 69 riding in the outer curtain carrier track 12 in support guide 11.

This arrangement provides the user with the option of manually operating the movement of the curtains 44A or 44B across the drive element 22. For example, the user may decide to manually operate the curtain assembly 1. The user could turn off the motor 82 and rotate the drive element 22 manually by using the pull cord 72.

The motor 82 for the curtain assembly 1 may be programmed from the factory with a preset number of drive element 22 revolutions to move the curtain the width of the window 34 opening. However, there are a variety of reasons why this preset number of revolutions may change. For example, the drive element 22 may be shortened to accommodate a narrower window 34.

Therefore, the initial setup of the motor 82 may be able to count the number of revolutions the drive element 22 makes to fully open and fully close the curtains 44A or 44B. This may be accomplished by a setup routine where pressing a program button 98 on a remote control 96 once to start the motor 82 moving the curtain 44A, 44B and then pressing the button 98 another time to stop the movement which will store the number of revolutions the curtain 44A, 44B has moved.

The number of revolutions can be confirmed by pressing the program button 98 a third time, which will reverse the motor 16 and move the curtain 44A, 44B in the opposite direction. Pressing the program button 98 a fourth time will stop the curtain 44A, 44B, compare the counts, and set a new count in the memory to complete the set up routine. If the program button 98 on the remote control 96 is not pressed the inner time, the motor 82 will run until the preset count is reached, then the motor 82 will shut off If the number of revolutions is ever lost, the controls can reset a zero position when the outer curtain drive attachment element 36A stops the drive element 22 from rotating when the outer curtain 44A is fully deployed, as shown in FIG. 52 or when the outer curtain 44A and the inner curtain 44B are fully stored and the inner curtain drive element 36B stops the drive element 22 from rotating, as shown in FIG. 54.

In specific embodiments, the drive element 22 stops rotating when the inner driver attachment element 36B and the outer driver attachment element 36A are brought into contact at either end of the drive element. When the inner driver attachment element 36B and the outer driver attachment element 36A are brought into contact, the inner driver attachment element 36B and the outer driver attachment element 36A bind together and their teeth bind in the drive element's grooves. The interconnection of the inner driver attachment element 36B and the outer driver attachment element 36A to the support guide 11 in opposite orientations helps to cause this binding. Once the inner driver attachment element 36B and the outer driver attachment element 36A bind together, the drive element is bound, and the controller board senses that the driver element is no longer rotating and stops running the motor.

In specific embodiments, the stall area 100 and/or 15 prevents one of the inner driver attachment element 36B and the outer driver attachment element 36A from moving down the drive element 22. When the inner driver attachment element 36B and the outer driver attachment element 36 meet each other, the axial force (down the rotational axis of the rotating drive element) binds the stalled driver to the still-driving driver. This, coupled with the weight of the curtain hanging from the outer driver and the interconnection of the inner driver attachment element 36B and the outer driver attachment element 36A to the support guide, causes the driver whose teeth are still engaged to the tube to bind up with the rotational drive element. At that point, this driver is being torqued so as to try and rotate around the axis of rotation and prevented from such rotation by the support guide, which stalls the motor and signals the controller board to stop running the motor.

The dual curtain assembly mounted in rubber mounting disk 13 increases the sensitivity of motion such that a person can pull on the stored or deployed curtain and activate the motor to move the curtain in the opposite direction from the last movement. The motor controls will count the number of revolutions and when the predetermined count is matched it will shut the motor down.

Center Closing Embodiments:

An alternative embodiment of the dual curtain assembly 1 is shown in FIGS. 49 and 50 in which the outer curtain 44A and the inner curtain 44B are center closing curtains. A center closing curtain is composed of two fabric panels, a right panel and a left panel, that meet in the center of the window 34 to close and cover the window 34. In FIG. 50, the outer curtain 44A is a center closing blackout curtain that is in the deployed position and the inner curtain 44B is a center closing sheer curtain that is also in the deployed position. In FIG. 49, the outer curtain 44A is a center closing blackout curtain that is in the stored position and the inner curtain 44B is a center closing sheer curtain that is in the deployed position. In this embodiment, the drive element 22 of the drive element 22 preferably has four helical grooves 24, two formed in the clockwise direction and two formed in the counterclockwise direction. For example, the opposing helical grooves 24 shown in FIG. 59 create the correct movement of the center closing curtains with one motor 82 turning the drive element 22 in one direction. FIG. 59 shows an enlarged cross-sectional view of the rotatable drive element according to one embodiment of the curtain assembly showing the four helical grooves formed on the outer surface of the drive element. FIG. 59 also shows an enlarged perspective view of the rotatable drive element according to one embodiment of the curtain assembly showing the four helical grooves formed on the outer surface of the drive element.

To accommodate center closing curtains, the curtain assembly 1 has a left outer drive attachment element 36A, a right outer drive attachment element 36A, a left inner drive element 36B and a right inner drive attachment element 36B as shown in FIGS. 49 and 50. The left outer drive attachment element 36A is connected to one end of the left panel of the outer curtain 44A. The right outer drive attachment element 36A is connected to one end of the right panel of the outer curtain 44A. The left inner drive element 36B is connected to an adjacent end of the left panel of the inner curtain 44B and the opposite end of the inner curtain is attached to the end bracket 54. The right inner drive attachment element 36B is connected to adjacent end of the right panel of the inner curtain 44B and the opposite end of the inner curtain is attached to the end bracket 54.

FIG. 49 shows an embodiment of a rotatable drive element 22 in which the outer curtain 44A and the inner curtain 44B are both center closing curtains. There is an outer driver stall area 100 positioned at each distal end of the rotating drive element 22 and an inner driver stall area 15 positioned between the outer driver stall area s 100. For example, there is a left outer driver stall area 100 positioned along the drive element 22 to engage and disengage the left outer drive attachment element 36A from the helical groove 24 of the drive element 22 and a right outer driver stall area 100 positioned along the drive element 22 to engage and disengage the right outer drive attachment element 36A from the helical groove 24 of the drive element 22. The inner driver stall area 15 is configured to hold the left inner n drive element 36B in place while the left drive attachment element 36B moves through the drive element 22. The same inner driver stall area 15 is also configured to hold the right inner drive attachment element 36B in place while the right inner drive attachment element 36B moves through the drive element 22. Alternative embodiments can have two separate inner driver stall area 15. FIG. 49 illustrates that the left and right inner drive attachment elements 36B will meet in the center 42 of the window 34 when the outer curtain 44A is deployed and the inner curtain 44B is stored to minimize light leakage. Therefore, the single inner driver stall area 15 in some embodiments is wide enough to fit both the left inner curtain drive element 36B and the right inner curtain drive attachment element 36B.

FIGS. 63A-63L show flowcharts implemented by the control system for specific embodiments of the disclosure.

Decorative Rotating Drive Element Having a Twisted Non-Circular Cross-Sectional Shape:

With reference to FIGS. 64-71, an alternative embodiment is presented wherein the drive element 22 has a non-circular cross-sectional shape that extends a portion of the length, or the entire length, of the drive element 22 from end-to-end. Twisted drive elements 22 are formed of any size, shape and design and are configured to open and close a curtain 44 in a unique manner with a unique ornamental appearance.

In the arrangement shown in FIG. 64, as one example, the non-circular shape is twisted around the center axis of the drive element 22 such that when the drive element 22 is rotated, the driver rings 36 are driven along a length of the drive element 22. These twisted non-circular cross-sectional drive elements 22 may be used in place of the previously presented drive elements 22 presented herein that have a generally circular cross-sectional shape. That is, these twisted non-circular cross-sectional drive elements 22 may be used with the end brackets 54, curtains 44, rings 67, 74, 76, motor 82, motor assembly 32 and any other components, systems, methods or processes presented herein in like fashion. As such, all of the teaching and disclosure presented previously herein applies equally to the drive elements 22 having a twisted non-circular cross-sectional shape.

More specifically, with reference to FIG. 64 five drive elements 22 having a twisted non-circular cross-sectional shape are presented, the three upper positioned drive elements 22 have a square or rectangular, or four-sided, cross-sectional shape whereas the two lower positioned drive elements 22 have a cross-shaped cross-sectional shape. However, these square or rectangular and cross-shaped drive elements 22 serve only as examples. Any other non-circular cross-sectional shape is hereby contemplated such as rectangular, triangular, pentagonal, hexagonal, octagonal, diamond, trapezoidal, oval, parallelogram, cross-shaped, heart shaped, non-circular curved shape, or any other non-circular shape. While the drive elements shown in FIG. 64 are shown as having a solid cross-section, a hollow interior is also hereby contemplated for use.

FIG. 66 shows a close-up view of the end of the drive elements 22 as is shown in FIG. 64, the view showing greater detail as is further described herein.

In the arrangement shown in FIG. 64, the non-circular cross-sectional shape extends in a generally continuous manner from end-to-end of the drive element 22. That is, prior to twisting or if the drive element 22 was not twisted, the three drive elements 22 having a square or rectangular cross-sectional shape form a generally straight square or rectangular bar or rod; similarly, the two drive elements 22 having a cross-shaped cross-sectional shape form a generally straight cross-shaped bar or rod. Again any other non-circular cross-sectional shape is hereby contemplated for use.

In the arrangement shown in FIG. 64 and FIG. 65, as one example, the drive elements 22 are twisted in a single rotational direction in a generally continuous and constant manner along the entire length of the drive element 22 from end to end. This arrangement provides a side-opening motorized drapery device where the curtain 44 moves from one side of the drive element 22 to the other side of the drive element 22. However, two of these single-twist drive elements 22 can be joined together, one rotating one direction and the other rotating in the opposite direction, to form a center-opening or center-closing motorized drapery device.

Alternatively, with reference to FIG. 66, FIG. 67 and FIG. 68 the drive elements 22 have a first section 102, a second section 104 and a center section 106. The first section 102 extends from an end of the drive element 22 to the center section 106. The second section 104 extends from an opposite end to the center section 106. The first section 102 and second section 104 are essentially mirror images of one another or opposites of one another. That is, if the twisted non-circular cross-sectional shape of the first section 102 rotates in a clockwise manner, the twisted non-circular cross-sectional shape of the second section 104 rotates in a counterclockwise manner. If, on the other hand, the twisted non-circular cross-sectional shape of the first section 102 rotates in a counterclockwise manner, the twisted non-circular cross-sectional shape of the second section 104 rotates in a clockwise manner. Center section 106 serves to join the opposing first section 102 and second section 104 and serves to transition the direction of twist from clockwise travel to counterclockwise travel, or from counterclockwise travel to clockwise travel. This arrangement facilitates a single drive element 22 that allows for a center-opening or center-closing drapery. In the arrangement shown in FIG. 66, FIG. 67 and FIG. 68 the length of the first section 102 and second section 104 are the same length, however it is contemplated that varying lengths may be used as well. To be clear, when drive element includes first section 102 and second section 104 which are connected together in a non-rotational manner, when drive element 22 rotates so rotates both the first section 102 and second section 104 in unison and in the same rotational direction. However, when it is stated that the twisted non-circular cross-sectional shape of the first section 102 or second section 104 rotates in a clockwise or counterclockwise manner this is intended to mean that the direction of rotation of the twisted feature twists or rotates in that direction. In another manner of speaking, the first section 102 and second section 104 have opposite "handedness." By having first section 102 and second section 104 twist or rotate oppositely from one another, this facilitates curtains 44 connected to each end of the drive element to open or close, towards or away from one another depending on the direction of rotation of the drive element 22.

Center section 106 is essentially a non-twisted portion of the drive element 22. The center section 106 has the exterior shape of the cross-sectional shape of the drive element 22. That is, when drive element 22 is a twisted square or rectangular shaped bar or rod, the center section 106 has a generally square or rectangular shape; when drive element 22 is a twisted cross-shaped bar or rod, the center section 106 has a cross-shape. Center section 106 is as wide or as narrow as is necessary. In the arrangement shown in FIG. 66, FIG. 67 and FIG. 68 center section 106 has a length to it that is approximately the width of the drive element 22, as one example. However, center section 106 may be substantially longer or substantially narrower, or center section may have no length to it and instead can be a direct connection from one direction of twist to the opposite direction of twist. In an alternative arrangement, center section 106 may have a different shape than the non-circular shape of the other portions of drive element 22, such as round or circular or any other shape. Providing a round center section 106 may allow for support of the drive element 22 by a center positioned bracket 54 that holds the center of the drive element 22 and provides support to the center of the drive element 22 while allowing the drive element 22 to rotate therein. Alternatively, center section may have a bearing member 94 around the exterior surface of the center section 106 that converts the non-circular cross-sectional shape to a circular shape and further facilitates connection of the center section 106 to a center positioned bracket 54 that provides support as well as facilitates rotation of the drive element.

Multiple Drive Elements: Any number of drive elements 22 may be joined together in end-to-end relation to form an elongated drive element 22 that may support a number of curtains 44. These joined drive elements 22 may be joined to one another in a rigid manner such that the joined drive elements 22 rotate in unison with one another. In an alternative joined drive elements 22 may be joined to one another in a rotational manner such that the drive elements 22 may rotate separately from one another. This is accomplished by connecting drive elements 22 using a bearing 94 or other device or member that facilitates connection while also supporting independent rotation. A bracket 54 is positional between the joined drive elements 22 to facilitate support as well as rotation of the drive elements 22.

Adjacent drive elements 22 may be joined by any manner, method or system. In one arrangement, adjacent drive elements 22 may be joined by threading the two drive elements 22 either directly to one another. Alternatively, the adjacent drive elements 22 may be joined by threading the drive elements 22 to a connecting member or threaded collar member that threadably connects to each drive element 22 thereby connecting the adjacent drive elements 22 to one another in a threaded manner. In an alternative arrangement, the adjacent drive elements 22 may be joined to one another by welding the adjacent drive elements 22 to one another. In an alternative arrangement, the adjacent drive elements 22 may be adhered to one another. In an alternative arrangement, the adjacent drive elements 22 may be joined to one another by friction fitting or snap-fitting the adjacent drive elements directly to one another. In an alternative arrangement, the adjacent drive elements 22 may be joined to one another by friction fitting or snap-fitting the adjacent drive elements 22 to a connecting member or collar member positioned between the two drive elements 22. In an alternative arrangement, the adjacent drive elements 22 may be joined to one another by connecting the two drive elements 22 to a centrally positioned bracket 54. Any other manner or method of connecting the two drive elements together is hereby contemplated for use.

Varying Pitch: With reference to FIG. 64 and FIG. 65, the drive elements 22 twist in one direction at a generally constant pitch along their entire length. With reference to FIG. 66, FIG. 67 and FIG. 68 the drive elements 22 twist in one direction at a generally constant pitch on either side of the center section 106. However, it is hereby contemplated that the pitch, or angle of twist, or density of the twists, may vary along the length of the drive element 22, such as a faster pitch at one end as opposed to the other end for drive elements 22 that rotate in only a single rotational direction. Or, alternatively, for center opening or closing drive elements 22 that have a first section 102 that rotates in a first rotational direction and a second section 104 that rotates in a second rotational direction, which is opposite the first rotational direction, which are separated by a center section 106 that facilitates transition of the twist of the drive element 22 from a first rotational direction to a second rotational direction (as is shown in FIGS. 66, 67 and 68) it is hereby contemplated that the pitch may change from an end to the center section 106. This varying pitch of the twist facilitates varying speed of opening or closing and allows improved torque or speed when and where needed due to the weight of the curtain 44 and the opening characteristics of the curtain 44. The pitch of the twist essentially acts as a gear ratio for movement of the curtain along the length of the drive element 22. Varying the pitch of the twist of the drive element 22 allows for optimization of the opening and closing process.

Driver Rings: With reference to FIGS. 64, 65, 69, 70 and 71 a driver ring 36 is presented for use with the drive elements 22. Driver rings 36 are formed of any suitable size, shape and design and are configured to engage the non-circular cross-sectional shape of the drive element 22 as well as serve as a connection point for curtain 44 and facilitates lateral movement along the drive element 22 as the drive element 22 rotates.

In the arrangement shown, as one example, driver ring 36 includes an exterior ring member 108 that houses a holder 110 therein. Ring member 108 is formed of any suitable size, shape and design and is configured to fit around drive element 22 as well as provide support to holder 110. In the arrangement shown, as one example, ring member 108 is generally circular in shape and has a hollow interior, however any other shape is hereby contemplated for use, such as square, rectangular, oval, teardrop, or any other shape. In the arrangement shown a connection member 112 is positioned at the lower end of the ring member 110 which facilitates connection to the curtain 44. In the arrangement shown, connection member 112 is a generally circular opening positioned at the lower end of the ring member 110. In the arrangement shown, the circular member that forms the connection member 112 is positioned at approximately a right angle to the circular member that forms the ring member 108 so as to facilitate ease of connection to curtain 44. In one arrangement, to provide an appealing aesthetic appearance, ring member 108 is formed of approximately the same material that drive element 22 is formed of and has the same or similar exterior finish. As an example, when drive element 22 is formed of aluminum that has a brushed nickel finish, ring members 108 are formed of aluminum and have a brushed nickel finish.

Holder 110 is formed of any suitable size, shape and design and is configured to be held by ring member 108 and fit around drive element 22 and engage the non-circular cross-sectional shape that drive element 22 is formed of in a mating and non-rotational manner. In the arrangement shown, as one example, in FIG. 71, holder 110 has a generally circular member that fits within the hollow interior of ring member 108. Holder 110 itself has a hollow interior with an opening 114 therein that is sized and shaped to receive the exterior surface of drive element 22 in mating engagement. As an example, in the arrangement shown in FIG. 71, where drive element 22 is formed of a cross-shape, the opening 114 of holder 110 is similarly sized and shaped to receive the cross-shape of the drive element 22 such that the drive element 22 is prevented from rotating within the opening 114 while allowing the drive element 22 to slide through the opening 114. This mating engagement between the non-circular cross-sectional shape of drive element 22 and the shape of the opening 114 of holder 110 causes the driver ring 36 to move laterally along the length of the drive element 22 as the drive element 22 is rotated.

In one arrangement, to provide smooth and quiet operation, holder 110 is formed of a plastic material. This plastic material provides some give and flexion when drive element 22 is formed of a metallic material. Also, a plastic may be used that has a low coefficient of friction as well as is self-lubricating and therefore provides smooth, quiet and efficient functionality.

More specifically, with reference to FIG. 71, as one example, when the exterior non-circular cross-sectional shape of drive element 22 is cross-shaped, holder 110 includes an upper pocket 116 that is sized and shaped to receive an upper-positioned lobe of the cross-shaped drive element 22 within close but sliding tolerances. Holder 110 also includes a pair of opposing side pockets 118 positioned on either side of the upper pocket 116. Side pockets 118 are sized and shaped to receive the side-positioned lobes of the cross-shaped drive element 22 within close but sliding tolerances. Opening 114 is further defined by a pair of opposing arms 120 that extend downward and toward one another thereby partially enclosing the lower end of opening 114. The lower ends of arms 120 terminate before connecting to one another thereby leaving an open slot at the bottom of opening 114. Arms 120 provide an amount of flexibility and give to holder 110 that helps to smooth the operation of drive element 22 and provides for smoother sliding of drive ring 36 over drive element 22. Also, by providing an open lower end to opening 114 this allows for easy repositioning of the driver ring 36 along the length of the drive element 22 when necessary without the need to completely remove all of the idler rings 67 and drive ring 36. Stated another way, opening 114 may be thought of as being comprised of a first open area 124 having a shape that corresponds to at least a portion of the non-circular cross-sectional shape of the drive element 22 and a second open area 126 configured to receive the drive element 22. With such a configuration, the drive ring 36 may be moved relative to the drive element 22 (for example, perpendicular to the drive element 22) so that the drive element 22 is in the second open area 126 rather than the first open area 124. When the drive element 22 is in the second open area 126 the drive ring 36 may be moved along the drive element 22 without having to rotate the drive ring 36 relative to the drive element 22.

Also shown in FIG. 71, upper pocket 116 and side pockets 118 are connected to one another by an angled wall 122. Connecting upper pocket 116 to side pockets 118 using an angled wall also helps to provide smooth the operation of drive element 22 and provides for smoother sliding of drive ring 36 over drive element 22. By connecting upper pocket 116 to side pockets 118 using angled wall 122 this avoids holder 110 from getting hung up on any burrs or aberrations in the exterior surface of drive elements which can cause hang-ups, clicking noises, jumpy operation or in the worst case scenario they can stop operation of the drive element 22 altogether.

As can be seen in FIGS. 64, 65, 69 and 70 a similar arrangement is presented for driver ring 36 and holder 110 when the drive element is square or rectangular in shape.

In one arrangement, features, such as teeth 62, are positioned within the opening 114 of holder 110. More specifically, in one arrangement, features, such as teeth 62, are positioned within the upper pocket 116 and/or the side pockets 118 of opening 114 of holder 110. These features, or teeth 62, protrude outward and engage the exterior surface of the drive element 22. These features, or teeth 62 reduce the surface area of contact between the holder 110 and the drive element 22 and as such they reduce the amount of friction between holder 110 and drive element 22. In this way, the use of features, such as teeth 62, smooths the operation of the apparatus, extends battery life, reduces power needs, and facilitates quieter operation.

Idler Rings: Idler rings 67 are formed of any suitable size, shape and design and are configured to fit around the non-circular cross-sectional shape of the drive element 22 and slide along its length as the driver ring 36 moves. In one arrangement, idler rings 67 have the same or a similar exterior appearance to driver ring 36 and include a holder 110 within the ring member 108 but the holder 110 does not include the features that engage the non-circular cross-sectional shape of the drive element 22. Instead holder 110 is simply a smooth lining within the ring member 108 that smooths the sliding of the idler ring 67 over the drive element 22.

Method of Assembly: A motorized drapery apparatus 1 having a drive element 22 having a non-circular cross-sectional shape is assembled in a similar manner to the other embodiments disclosed herein. That is, drive element 22 is connected to brackets 54 at each end of the drive element 22 so as to provide support to the drive element 22 while also allowing the drive element 22 to rotate thereon. In some embodiments, one or more centrally positioned brackets 54 are connected to drive element 22 that provide support for the center of drive element 22 while still facilitating rotation of drive element 22.

When drive element having a non-circular cross-sectional shape has a hollow interior, the motor 82, motor controller (which is the device which controls operation of the motor 82 and is formed of one or more microprocessors and other electrical components that facilitate and control operation of the motor 82) are be positioned within the hollow interior of the drive element 22. In one arrangement the batteries 84, and other electrical components are also positioned in the hollow interior of the drive element 22. In one arrangement, the antenna 65 is also positioned within the hollow interior of the drive element 22, or, as is shown, at the outside end of the drive element 22 where the antenna 65 is able to receive over the air control signals from remote control 96.

Alternatively, when the drive element 22 is solid, or when the drive element 22 is too narrow in size to receive, house or hold the motor 82, motor controller, batteries 84 and antenna 65, among other components, these electrical components are positioned exterior to the drive element 22, such as in a bracket 54 or connected to another member that houses and holds these components, such as a battery tube that is connected to the motor 82. In one arrangement, the motor 82 is connected to an end of the drive element 22 on a side opposite a bracket 54. In this arrangement, motor 82 may be positioned in rotational alignment with the drive element 22. That is, the axis of rotation of the drive element 22 is in alignment with the axis of rotation of the motor 82. As one example of this arrangement, the motor 82 extends straight out of the end of the drive element 22 opposite the bracket 54. This arrangement is beneficial as the gearing arrangement and connection between the motor 82 and the drive element 22 is simple, relatively direct, quiet and energy efficient. This arrangement has the disadvantage of extending the length of the drive element 22 which may not be desirable in many applications, such as where a window terminates at a wall. Said another way, motor 82 is conscentric or positioned in a concentric manner with the drive element 22, meaning that the axis of rotation of the motor 82 is in alignment with the axis of rotation of the drive element 22. This concentric positioning is accomplished by either placing the motor 82 within the hollow interior of the drive element 22 or exterior to the drive element 22.

In an alternative arrangement, the axis of rotation of the motor 82 is positioned in an unaligned manner and a connection member, such as a U-joint or 90-degree gear or bevel gear, is used to transfer the rotation of the misaligned motor 82 to the axis of rotation of the drive element 22. As one example of this arrangement, the motor 82 is vertically aligned on a side of the bracket 54 opposite the drive element 22 and the motor 82 is connected to the connection member. As the motor 82 rotates so the connection member (such as a bevel gear) which transfers the rotation to the drive element 22. This arrangement is beneficial as it allows for the drive element 22 to be installed next to a wall instead of having the length of the motor 82 extend outward from the end of the drive element 22. This arrangement has the disadvantage of having the connection member transfer the rotation from the motor 82 to the drive element 22 which can cause loss of power and additional noise.

In a side-closing, side-opening arrangement where the non-circular cross-sectional shape of the drive element 22 only twists in a single direction a single driver ring 36 is positioned around the drive element 22 and a plurality of idler rings 67 are positioned around the drive element 22. The driver ring 36 may be positioned as the inward most ring, or alternatively, the driver ring 22 may be positioned just inward of one idler ring 67. Positioning one idler ring 67 just inward of the driver ring 36 allows the driver ring 36 to crush the inward positioned idler ring 67 at the fully closed position which can help reduce light gaps. This is especially true for center closing drive elements 22.

In a center-closing, center-opening arrangement where the non-circular cross-sectional shape of the drive element 22 twists in two directions on each end of the drive element 22 a single driver ring 36 is positioned around the drive element 22 and a plurality of idler rings 67 are positioned around the drive element 22 on each side of the center section 106. The driver ring 36 may be positioned as the inward most ring, or alternatively, the driver ring 22 may be positioned just inward of one idler ring 67. Positioning one idler ring 67 just inward of the driver ring 36 allows the driver ring 36 to crush the inward positioned idler ring 67 at the fully closed position which can help reduce light gaps. This is especially true for center closing drive elements 22.

Once the drive element 22 is connected to the brackets 54 and the idler rings 67 and driver rings 36 are installed the curtain 44 is installed on the rings 36, 67. Adding the curtain 44 to the rings 36, 67 adds weight to the rings 36, 67 which helps to keep the rings 36, 67 upright as the drive element 22 rotates which causes the driver ring 36 to slide along the length of the drive element 22 as the drive element 22 rotates.

Method of Operation: Once the drive element 22, rings 36, 67, curtain 44, brackets 54 and other components are assembled the system operates in the following manner. When the curtain assembly 1 is in a fully opened position, as the drive element 22 begins rotating, the rings 36, 67 begin to move from the fully opened position toward the fully closed position. This movement is caused by two factors.

First, due to twisting of the non-circular cross sectional shape of the drive element 22, when viewed from the side, drive element 22 forms a series of peaks and valleys. Due to the force of gravity, the rings 36, 67 try to ride in the valleys of drive element 22 as the drive element 22 is rotated. This is known as the augering effect as the drive element 22 acts as an auger. As such, all rings 36, 67 are naturally encouraged to move laterally as the drive element 22 rotates to that the drive rings 36, 67 remain in the valleys of the drive element. This helps all drive elements 36, 67 to move as the drive element 22 is rotated in unison.

Second, the mating engagement between the features of the holder 110 of the drive ring 36 with the shape of the drive element 22 prevents the drive element 22 from rotating within the drive ring 36. To allow the drive element 22 to rotate, while the weight of the curtain 44 keeps the driver ring 36 in an upright orientation, the driver ring 36 moves laterally along the length of the drive element 22. When the driver ring 36 is the inward most positioned ring, this inward movement continues until the drive element 22 stops rotating, until the drive element 36 reaches the center section 36, or until the curtain 44 is fully stretched out thereby preventing the drive element 36 from further inward movement.

The augering effect of the twisted non-circular cross-sectional shape of the drive element 22 helps all rings 36, 67 to move in unison as the drive element 22 is rotated. As the drive element 22 rotates the idler rings 67 move inward until the curtain 44 connected to each idler ring 67 or a string connected between adjacent idler rings 67 is fully stretched which defines the inward most position for that idler ring 67. Once each idler ring 67 reaches its furthest inward position, where the curtain 44 or string attaching adjacent idler rings 67 is fully stretched, the idler ring 67 rides over the passing peaks in the drive element 22 as the drive element 22 continues to rotate. This process continues until each idler ring 67 reaches its inward most position.

When an idler ring 67 is positioned inward of the driver ring 36 this inward positioned idler ring 67 is pushed by the driver ring 36. As the driver ring 36 reaches its inward most position it is pushing against, in engagement with or in close proximity to the inward-most idler ring 67. This causes an increased amount of the curtain 44 to be present at the end of the drive element 22 in side opening/closing drive elements 22 or at the center of center opening/closing drive elements 22. This extra material can help fill or reduce a light gap at the end or center of the drive element 22.

Movement of the drive element 22 may be initiated by any manner or method. In one arrangement a control signal is transmitted by pressing a button on remote control 94 which transmits a control signal over the air that is received by antenna 65 which is transmitted to a motor controller that controls operation of motor 82. In another arrangement, the drive element may be controlled by pulling, tugging, tapping or otherwise physically engaging the curtain 44 of the drive element 22. In another arrangement, the drive element 22 may be controlled by tugging or lifting or pressing a button on an attached wand or battery holding device that is electrically connected to the motor controller and motor 82. Any other manner, method or means of controlling the drive element 22 is hereby contemplated for use.

In one arrangement, a sensor is operatively connected to the drive element, motor, or another component of the system. This sensor senses the force or energy required to move the drive element 22. When forces exceed a predetermined threshold, the sensor transmits a signal and the motor controller stops operation of the drive element 22. This may occur when an obstruction is encountered by the drive element 22 or curtain 44, when a hard stop occurs, or when the drive element 22 reaches its full open or full closed positions.

Method of Manufacture—Drive Element Having A Twisted Non-Circular Cross-Sectional Shape: The drive elements 22 having a twisted non-circular cross-sectional shape may be formed by any manufacturing method. In one arrangement, the drive elements 22 having a twisted non-circular cross-sectional shape are formed by machining the shape out of a single solid piece of material, wherein the exterior twisted non-circular cross-sectional shape of the drive element 22 is wholly or partially cut out of a piece of material using machining processes. In another arrangement, the drive elements 22 having a twisted non-circular cross-sectional are formed by casting the drive element, wherein the exterior twisted non-circular cross-sectional shape is formed through a casting process by pouring or injecting flowable material into a cast which is later removed. In another arrangement, the drive elements 22 having a twisted non-circular cross-sectional shape are formed by extruding the drive element through an extruding process; wherein the exterior twisted non-circular cross-sectional shape is formed through an extruding process wherein flowable or malleable material is forced through an extruder to form the desired shape. In another arrangement, the drive elements 22 having a twisted non-circular cross-sectional shape are formed by printing the drive element 22 using a 3D printing process, wherein the exterior twisted non-circular cross-sectional shape is formed through a printing process wherein the shape of the drive element 22 is formed through a printing or deposition process. In another arrangement, the drive elements 22 having a twisted non-circular cross-sectional shape are formed by molding the drive element 22 using a molding process, such as injection molding, blow molding, rotational molding, or any other molding process or method. Any other manufacturing process is hereby contemplated for use to form the shape of drive element 22, as is any combination of these manufacturing explicitly listed manufacturing processes as well as others.

Twisting—One End Held Method: In another arrangement, the drive elements 22 having a twisted non-circular cross-sectional shape are formed by starting with a straight rod or bar of the desired shape. Next, the straight bar or rod is placed in a machine, such as a lathe, or other twisting machine and one end of the bar or rod is held in a stationary manner and a collar is placed around the bar or rod. Next, the collar is rotated as the collar moves along the length of the bar or rod thereby imparting the twisted shape on the drive element 22. In an alternative arrangement, the collar is held in a non-rotational manner and the held end of the drive element 22 is rotated as the collar moves along the length of the bar or rod. This arrangement may be used to manufacture a drive element 22 having a twisted non-circular cross-sectional shape that twists in a single direction. Or, this arrangement may be used to manufacture a drive element 22 that twists in two directions, however only one direction may be formed at a time.

Twisting—Both Ends Held Method: In another arrangement, the drive elements 22 having a twisted non-circular cross-sectional shape are formed by starting with a straight rod or bar of the desired shape. Next, the straight bar or rod is placed in a machine, such as a lathe, or other twisting machine and both ends of the bar or rod are held in a stationary manner and two collars are placed around the bar or rod. Next, the collars are rotated as the collars move toward or away from one another along the length of the bar or rod thereby imparting the twisted shape on the drive element 22. In an alternative arrangement, the collars are held in a non-rotational manner and the held ends of the drive element 22 are rotated as the collars move along the length of the bar or rod. This arrangement may be used to manufacture a drive element 22 having a twisted non-circular cross-sectional shape that twists in two directions at the same time.

Twisting—Any Other Method: In another arrangement, the drive elements 22 having a twisted non-circular cross-sectional are formed by starting with a straight rod or bar of the desired shape. This straight bar or rod is then twisted using any other method or system causing the straight bar or rod to be twisted.

It has been tested with success that "fresh" bar stock is beneficial during use of this process. That is, due to the material properties of aluminum and other materials, "fresh" bar stock twists easier and in a more-consistent manner as compared to old or "stale" bar stock. That is the sooner the bar stock can be twisted after the bar stock is formed (which is usually through an extrusion process) the better. Once the bar stock becomes "stale" it is more difficult to twist the bar stock thereby providing a less consistency and more variability to the elongated drive element 22 having a twisted non-circular cross-sectional shape. What is "fresh" and what is "stale" bar stock depends upon many factors, but in many cases "fresh" bar stock is twisted within before two weeks, three weeks, four weeks, five weeks, six weeks, seven weeks, eight weeks, nine weeks, ten weeks eleven weeks or twelve weeks from the time the bar stock itself was formed, or any range therein.

Substantially Non-Circular Cross-Sectional Shape: As is described herein, drive element 22 has a non-circular cross sectional shape. Motorized drapery systems have been produced in the past that have generally circular rotating drive elements, including the product that is the subject of Applicant's parent application from which this application depends. However, these prior-art systems have a generally circular drive element having a threaded feature therein or one or more grooves therein. In contrast, the drive element 22 presented herein has a substantially non-circular cross-sectional shape. One of ordinary skill in the art would understand what is substantially circular and what is substantially non-circular in shape. Another distinguishing feature is that the exterior surface of the drive element 22 having a substantially non-circular cross-sectional shape has a generally smooth surface that is free of grooves or threads or other features thereby making the device and system presented herein substantially novel and unique with a never-before-seen look and appearance. To be clear, cross-sectional shapes that are more-similar to square, rectangular, triangular, pentagonal, hexagonal, octagonal, diamond, trapezoidal, oval, parallelogram, cross-shaped or heart shaped, among others, than they are to circular in shape are "substantially non-circular" in shape.

Another test that to determine whether a cross-sectional shape is substantially non-circular in shape, is when the cross-section has generally flat or non-circular walls. As an example, a drive element 22 having a square or rectangular cross-sectional shape has four generally straight and flat walls. As another example, a drive element 22 having a cross-shaped cross-sectional shape has twelve generally straight and flat walls (which are connected to a center member. In contrast, a drive element having a generally circularly shaped cross-sectional shape has a single exterior wall that generally extends around in a smooth and continuous manner to form a circle, albeit perhaps with one or more threads or grooves therein. The presence of one or more threads or grooves in the surface of a drive element 22 does no remove the drive element 22 from being generally circular in shape if the drive element is generally circular in shape.

Relative Size of the Groove To The Pitch: In drive elements 22, such as the arrangements shown in FIGS. 1-59, the grooves are approximately 0.25" wide and approximately 0.050" deep on a 2" rod. That results in a ratio of 8:1 and 40:1, respectively, when compared to the diameter and even more when compared to the pitch of the groove. In the arrangements presented in FIGS. 64-71 the size of the features that facilitate the movement of the rings along the drive element 22 are substantially larger in comparison. These features are quantifiable. In one arrangement, the size of the features that facilitate rotation of the rings on the twisted square, rectangular or cross-shaped drive elements 22, as examples, which is the twisted square shape, twisted rectangular shape, twisted cross-shape, are on the order of two times or more, three times or more, four times or more, five times or more, six times or more, seven times or more, or eight times or more, or even greater. The prior art does not show such large features that are used to move the rings.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A motorized drapery system, comprising:
a drive element;
the drive element extending a length between opposing ends;
the drive element formed of a twisted non-circular cross-sectional shape; and
a driver ring;
the driver ring having a holder;
the holder having a first open area and a second open area;
the first open area having a shape that corresponds to at least a portion of the non-circular cross-sectional shape of the drive element;

the second open area configured to receive the drive element to allow the driver ring to disengage from the drive element and move along the drive element without rotating;

a shade material;

the shade material operatively connected to the driver ring and supported by the driver ring;

wherein when the drive element rotates, the engagement between the non-circular cross-sectional shape of the drive element drives the driver ring along a length of the drive element thereby moving the shade material along the length of the drive element between an open position and a closed position.

2. The system of claim 1, further comprising:

a motor operatively connected to the drive element, wherein the motor is configured to rotate the drive element.

3. The system of claim 1, wherein the drive element has a square or rectangular cross-sectional shape and the first open area has a square or rectangular shape enclosing three sides of the square or rectangular cross-sectional shape.

4. The system of claim 1, wherein the drive element has a cross shaped cross-sectional shape and the first open area has a first pocket receiving a first area of the cross shaped cross-sectional shape, a second pocket receiving a second area of the cross shaped cross-sectional shape, and a third pocket receiving a third area of the cross shaped cross-sectional shape.

5. The system of claim 1, wherein the drive element has a triangular, pentagonal, hexagonal, octagonal, diamond, trapezoidal, oval or parallelogram cross-sectional shape.

6. The system of claim 1, wherein the drive element's twisted non-circular cross-sectional shape extends in a generally continuous manner across the length of the drive element between the opposing ends.

7. The system of claim 1, wherein the drive element includes a first section wherein the twisted non-circular cross-sectional shape rotates in a first rotational direction, and a second section wherein the twisted non-circular cross-sectional shape rotates in a second rotational direction, wherein the first rotational direction is opposite the second rotational direction.

8. The system of claim 1, wherein the drive element includes a center section, wherein the drive element is not twisted at the center section.

9. The system of claim 1, wherein the drive element includes a center section, wherein at the center section the drive element transitions from twisting in a first rotational direction to twisting in a second rotational direction, wherein the first rotational direction is opposite the second rotational direction.

10. The system of claim 1, wherein the drive element is hollow.

11. The system of claim 1, further comprising a motor, wherein the motor is positioned within the drive element.

12. The system of claim 1, wherein the drive element has an axis of rotation and a motor has an axis of rotation, wherein the motor is operatively connected to the drive element such that the axis of rotation of the motor is in alignment with the axis of rotation of the drive element.

13. The system of claim 1, wherein the motorized drapery system is powered by one or more batteries electrically connected to a motor and motor controller.

14. The system of claim 1, further comprising:

a motor operatively connected to the drive element, a motor controller operatively connected to the motor, an antenna operatively connected to the motor controller, and a remote control wirelessly connected to antenna, wherein the motorized drapery system is configured to operate in response to signals transmitted by the remote control device.

15. The system of claim 1, further comprising:

end brackets adjacent the ends of the drive element.

16. The system of claim 1, wherein the driver ring includes a feature that is configured to engage the drive element and is configured to move laterally along the length of the drive element.

17. The system of claim 1, further comprising:

a plurality of idler rings positioned around the drive element, wherein the plurality of idler rings are configured to slide along the length of the drive element.

18. The system of claim 1, further comprising:

a plurality of rings positioned around the drive element and a curtain connected to the plurality of rings.

19. The system of claim 1, wherein rotation of the drive element in a first rotational direction moves the shade material in a first lateral direction and wherein rotation of the drive element in a second rotational direction moves the shade material in a second lateral direction.

20. The system of claim 1, wherein the drive element is formed by a process selected from the group consisting of: twisting, machining, casting, extruding, printing and molding.

21. The system of claim 1, wherein a motor is positioned in a concentric manner with the drive element.

22. A motorized drapery system, comprising:

a rotating drive element having a twisted non-circular cross-sectional shape;

a shade material; and a driver ring engaging the rotating drive element, the driver ring having an opening comprising a first open area receiving the rotating drive element and a second open area below the rotating drive element, the second open area being configured to receive the rotating drive element and allow the driver ring to move along the rotating drive element without rotating about the rotating drive element, the driver ring further including a connection member supporting the shade material.

23. The system of claim 22, wherein the drive element is formed by a process selected from the group consisting of: twisting, machining, casting, extruding, printing and molding.

24. A method of operating a motorized drapery system, the step method comprising:

providing a drive element having a twisted non-circular cross-sectional shape;

operatively connecting a curtain to the drive element using a plurality of rings;

closing the curtain by rotating the drive element in a first rotational direction;

opening the curtain by rotating the drive element in a second rotational direction, wherein the plurality of rings includes at least one driver ring having a first open area having a shape that corresponds to at least a portion of the twisted non-circular cross-sectional shape of the drive element and a second open area configured to receive the drive element to allow the driver ring to disengage from the drive element and move along the drive element without rotating.

25. The method of claim 24, wherein the drive element is formed by a process selected from the group consisting of: twisting, machining, casting, extruding, printing and molding.

26. The method of claim 24, wherein operation of the drive element is controlled by a remote control wirelessly connected to an antenna which is electrically connected to a motor controller which is electrically connected to a motor which is operatively connected to the drive element.

27. The method of claim 24, wherein the driver ring includes a feature that is configured to engage the drive element and is configured to move laterally along a length of the drive element.

28. The method of claim 24, wherein the plurality of rings include a plurality of idler rings wherein the plurality of idler rings are configured to slide along a length of the drive element.

29. A method of manufacturing a motorized drapery system, the method comprising:
providing a drive element extending a length between opposing ends, the drive element having a non-circular cross-sectional shape that is generally constant along the length of the drive element;
twisting a first section of the drive element in a first rotational direction thereby forming a drive element having a twisted non-circular cross-sectional shape; and
providing a driver ring having an opening with a first open area having a shape that corresponds to at least a portion of the non-circular cross-sectional shape of the drive element and a second open area configured to receive the drive element to allow the driver ring to disengage from the drive element and move along the drive element without rotating with respect to the drive element; and
providing a shade and attaching the shade to the driver ring.

30. The method of claim 29, further comprising:
the step of twisting a second section of the drive element in a second rotational direction, opposite the first rotational direction.

31. The method of claim 29, further comprising:
wherein the drive element is hollow.

32. The method of claim 29, wherein the drive element is formed by a process selected from the group consisting of: twisting, machining, casting, extruding, printing and molding.

33. A motorized drapery system, comprising:
a rotating drive element having a substantially non-circular cross-sectional shape;
a shade material; and
a driver ring engaging the rotating drive element;
the driver ring having a connection member supporting the shade material;
the driver ring having a holder;
the holder having a shape that corresponds to the non-circular cross-sectional shape of the drive element;
the holder having an opening comprising a first open area receiving the rotating drive element and a second open area below the rotating drive element, the second open area being configured to receive the rotating drive element and allow the driver ring to move along the rotating drive element without rotating about the rotating drive element, the driver ring further including a connection member configured to facilitate a connection to the shade material;
wherein when the drive element rotates, the engagement between the non-circular cross-sectional shape of the drive element drives the ring along a length of the drive element thereby moving the shade material along the rotating drive element.

34. The system of claim 33 wherein the drive element extends a length, wherein all or a portion of the length of the drive element is twisted.

35. A motorized drapery system, comprising:
a rotating drive element having a non-circular cross-sectional shape having a plurality of flat sides; and
a driver ring having a holder with flat sides engaging at least some of the flat sides of the plurality of flat sides of the rotating drive element;
the driver ring having a connection member connected to a curtain so that as the rotating drive element rotates the connection member translates in a direction parallel to the rotating drive element, the driver ring having an open area configured to receive the rotating drive element and allow the driver ring to move along the rotating drive element without having to rotate relative to the rotating drive element.

36. The system of claim 35 wherein the drive element extends a length, wherein all or a portion of the length of the drive element is twisted.

* * * * *